United States Patent
Hayamizu et al.

(10) Patent No.: US 12,077,673 B2
(45) Date of Patent: Sep. 3, 2024

(54) RECORDING LIQUID SET, PRINTED MATTER PRODUCING METHOD, AND PRINTED MATTER

(71) Applicants: artience Co., Ltd., Tokyo (JP); TOYOCOLOR CO., LTD., Tokyo (JP)

(72) Inventors: Mayuko Hayamizu, Tokyo (JP); Yuki Sasaki, Tokyo (JP); Shunsuke Nakamura, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 18/289,154

(22) PCT Filed: Mar. 1, 2023

(86) PCT No.: PCT/JP2023/007624
§ 371 (c)(1),
(2) Date: Nov. 1, 2023

(87) PCT Pub. No.: WO2023/195274
PCT Pub. Date: Oct. 12, 2023

(65) Prior Publication Data
US 2024/0218198 A1    Jul. 4, 2024

(30) Foreign Application Priority Data

Apr. 6, 2022    (JP) .................. 2022-063223

(51) Int. Cl.
| | | |
|---|---|---|
| *C09D 11/40* | (2014.01) | |
| *B41M 5/00* | (2006.01) | |
| *C09D 11/033* | (2014.01) | |
| *C09D 11/108* | (2014.01) | |
| *C09D 11/322* | (2014.01) | |
| *C09D 11/54* | (2014.01) | |

(52) U.S. Cl.
CPC ........... *C09D 11/40* (2013.01); *B41M 5/0017* (2013.01); *C09D 11/033* (2013.01); *C09D 11/108* (2013.01); *C09D 11/322* (2013.01); *C09D 11/54* (2013.01)

(58) Field of Classification Search
CPC ...... C09D 5/033; C09D 11/322; C09D 11/40; C09D 11/38; C09D 11/54; A61K 2800/43; A61K 2800/5424; A61K 8/29; A61K 8/14; B41J 2/2114; B41J 2/2107; B41J 2/17; D21H 23/48; D06P 5/03
See application file for complete search history.

(56) References Cited

U.S. PATENT DOCUMENTS

| | | | |
|---|---|---|---|
| 11,124,666 B2 | 9/2021 | Okuda et al. | |
| 2002/0041854 A1* | 4/2002 | Hadasch | A61Q 1/12 424/63 |
| 2003/0100646 A1* | 5/2003 | Anchor | C09D 5/033 524/323 |
| 2004/0196351 A1* | 10/2004 | Kida | B41M 5/0011 347/105 |
| 2007/0197684 A1 | 8/2007 | Yamashita et al. | |
| 2011/0001779 A1* | 1/2011 | Kida | B41J 2/515 347/42 |
| 2013/0076369 A1 | 3/2013 | Niederberger et al. | |
| 2014/0118449 A1* | 5/2014 | Sarkisian | B41J 2/2107 524/436 |
| 2015/0114246 A1* | 4/2015 | Chopra | C08K 5/45 101/483 |
| 2016/0194824 A1 | 7/2016 | Ohashi et al. | |
| 2019/0234015 A1 | 8/2019 | Chidate et al. | |
| 2020/0010708 A1 | 1/2020 | Sugihara et al. | |
| 2020/0270473 A1 | 8/2020 | Matsuzaki | |
| 2021/0017414 A1 | 1/2021 | Asakawa et al. | |
| 2021/0155816 A1* | 5/2021 | Nasu | A61K 8/29 |
| 2022/0195223 A1 | 6/2022 | Sunaoshi et al. | |
| 2022/0298373 A1 | 9/2022 | Gotou et al. | |
| 2022/0411999 A1* | 12/2022 | Shiraishi | B41M 5/0047 |

FOREIGN PATENT DOCUMENTS

| | | |
|---|---|---|
| JP | 2007-223112 A | 9/2007 |
| JP | 2009-190379 A | 8/2009 |
| JP | 2013-163370 A | 8/2013 |
| JP | 2013-188958 A | 9/2013 |
| JP | 2015-227003 A | 12/2015 |
| JP | 2016-124213 A | 7/2016 |
| JP | 2018-203905 A | 12/2018 |
| JP | 2019-131919 A | 8/2019 |
| JP | 2019-167518 A | 10/2019 |
| JP | 2020-132802 A | 8/2020 |
| JP | 2020-180178 A | 11/2020 |
| JP | 2021-16972 A | 2/2021 |
| JP | 2021-155556 A | 10/2021 |
| JP | 2021-188028 A | 12/2021 |
| JP | 2022-16794 A | 1/2022 |
| JP | 2022-146841 A | 10/2022 |
| JP | 2023-7500 A | 1/2023 |
| WO | 2018/142726 A1 | 8/2019 |
| WO | 2021/229975 A1 | 11/2021 |

OTHER PUBLICATIONS

International Search Report issued May 16, 2023 in Application No. PCT/JP2023/007624.
Japanese Office Action issued Oct. 25, 2022 in Application No. 2022-063223.
Written Opinion issued May 16, 2023 in Application No. PCT/JP2023/007624.

* cited by examiner

*Primary Examiner* — John Zimmermann
(74) *Attorney, Agent, or Firm* — Sughrue Mion, PLLC

(57) ABSTRACT

Provided is a recording liquid set including: a pretreatment liquid containing a cationic component, a resin, and water; and an aqueous white inkjet ink containing a white-colored colorant, an organic solvent, and water, wherein the aqueous white inkjet ink has a static surface tension of 20 to 40 mN/m at 25° C., the aqueous white inkjet ink has a static surface tension at 25° C. that is greater than a static surface tension at 25° C. of the pretreatment liquid, and an amount of the white-colored colorant in the aqueous white inkjet ink is 15 to 100 times an amount of the cationic component in the pretreatment liquid.

10 Claims, No Drawings

RECORDING LIQUID SET, PRINTED MATTER PRODUCING METHOD, AND PRINTED MATTER

CROSS REFERENCE TO RELATED APPLICATIONS

This application is a National Stage of International Application No. PCT/JP2023/007624 filed Mar. 1, 2023, claiming priority based on Japanese Patent Application No. 2022-063223 filed Apr. 6, 2022.

TECHNICAL FIELD

Embodiments of the present invention relate to a recording liquid set including a pretreatment liquid and an aqueous white inkjet ink, a method for producing a printed matter using the recording liquid set, and a printed matter produced using the method for producing a printed matter.

BACKGROUND ART

Unlike plate printing, digital printing does not require printing plates. Thus, with the adoption of digital printing, reduction in printing device size, reduction in costs, and the like become possible. In digital printing, inkjet printing in which ink droplets are jetted from fine nozzles onto a substrate and adhered to obtain printed matters on which text and/or images are recorded has advantages of low noise from printing devices and easy colorization in addition to the above-described properties, and has been increasingly used not only for office and home applications but also for industrial applications.

In industrial applications, inkjet printing has been performed using solvent inks and ultraviolet curable inks. However, in recent years, from the viewpoint of safety, health, and environmental considerations, there has been an increasing demand for aqueous inks (hereinafter also referred to as "aqueous inkjet ink") used in the inkjet printing method (also referred to as "inkjet method" in the present disclosure).

Aqueous inkjet inks have been conventionally used for highly permeable substrates such as plain paper or special paper (e.g., photo glossy paper), and have been fixed through permeation drying on the substrate. However, in recent years, the use of not only the above-described highly permeable substrates but also low-permeable substrates such as coated paper and art paper or non-permeable substrates such as film substrates and metal substrates is beginning to be investigated. Nevertheless, for low-permeable substrates, it has become possible to produce practically usable printed matters using aqueous inkjet inks. In contrast, when an aqueous inkjet ink is printed on a non-permeable substrate, drying due to penetration of liquid components into the substrate does not occur and thus droplets of the aqueous inkjet ink coalesce to form a mottled pattern (beading), and the shape of dots formed by the above droplets becomes uneven and thus fine line reproducibility and precision deteriorate, thereby deteriorating the image quality (quality of image) of the resulting printed matters. In particular, when printed matters are used for soft packaging or labeling applications, high visibility is required and thus such a deterioration in image quality becomes a serious issue.

In addition, when an aqueous inkjet ink is printed on non-permeable substrates, deterioration of adhesion to the substrates is also an issue. Furthermore, the lack of adhesion also leads to peeling of the layer of the aqueous inkjet ink (printing layer) due to rubbing (deterioration of rubbing resistance), and this becomes a practical issue. However, in the case of printed matters visible from the opposite side of the printing surface, such as back printing in soft packaging applications, since the topmost layer is a transparent film, adhesion and rubbing resistance of the aqueous inkjet ink layer rarely become an issue. In contrast, in surface printing (printing from the surface of the substrate) in soft packaging applications and printing in labeling applications, high adhesion and high rubbing resistance are generally required because the printing layer is the topmost layer of the printed matter.

In addition, many non-permeable substrates are transparent or non-white. Thus, when printing on non-permeable substrates, it is common to use a white-colored aqueous inkjet ink (also simply referred to in the present disclosure as "aqueous white inkjet ink" or "aqueous white ink") from the viewpoint of enhancing visibility of printed matters and making color development clearer. At this time, aqueous white inks are used for producing both solid printed matters (printed matters on which a target composition is applied to completely cover the surface of the substrate) and/or printed matters on which white text and patterns are printed (hereinafter simply referred to as "white text/image printed matters"). Thus, an aqueous white ink used for soft packaging surface-printing applications and labeling applications requires both of the absence of voids (a phenomenon in which an aqueous white ink is not present at the original position in the printing layer and the substrate or the layer of the pretreatment liquid is exposed) during production of solid printed matters, and high fine line reproducibility and high precision during production of white text/image printed matters.

Note that in the present disclosure, the suppression of voids in solid printed matters and the fine line reproducibility and precision in white text/image printed matters are collectively referred to as "image quality of aqueous white ink".

As the above-described method for improving the image quality of aqueous white ink, it is known to apply a pretreatment liquid to a substrate before the aqueous white ink is printed thereon. In particular, it becomes possible to improve the image quality of printed matters by applying to the substrate a pretreatment liquid containing a component (hereinafter also referred to as "coagulant") that intentionally causes aggregation of solid components (pigment and resin) in the aqueous white ink and/or thickening of the aqueous white ink (see, for example, Patent Document 1).

Note that in the present disclosure, "application of a pretreatment liquid (or an aqueous white ink)" is used to collectively refer to the application of a pretreatment liquid (or an aqueous white ink) in a state where a pretreatment liquid (or an aqueous white ink) application member is not in contact with a substrate, and the application of a pretreatment liquid (or an aqueous white ink) in a state where a pretreatment liquid (or aqueous white ink) application member is in contact with a substrate.

However, the fact is that there have not been many studies on the formation of printed matters on non-permeable substrates using a pretreatment liquid and an aqueous white ink in view of expansion into the above-described soft packaging surface-printing applications and labeling applications.

As an example of the above studies, in the embodiment of Patent Document 2, a polyester film heated to 35 to 50° C. is printed sequentially with a treatment liquid, a white ink, and a non-white ink using the inkjet method. In addition, in examples 9 to 14, 16, 17, 20, and the like of Patent Document 3, a printed matter is produced using a method in which a processing liquid composition is inkjet-printed on a polypropylene film and subjected to primary drying, a white ink composition is inkjet-printed and subjected to primary drying, and a non-white ink composition is further inkjet-printed thereon.

However, as evaluated by the inventors of the present invention, it was found that the combinations of pretreatment liquids and aqueous white inks specifically disclosed in Patent Documents 2 and 3 were likely to produce printed matters having poor adhesion and poor image quality.

Note that in order to improve rubbing resistance and the like, there is also a method to provide a topcoat layer on the topmost surface of printed matters. However, the production of the topcoat layer needs the installation of additional equipment. This becomes a considerable issue in the use of an aqueous white ink, which requires large drying equipment, compared with the case of printing a solvent ink or ultraviolet-curable ink.

As described above, there is still no set of a pretreatment liquid and an aqueous white ink that is capable of producing a printed matter that has all of excellent adhesion to substrates, rubbing resistance, and image quality and that can be preferably used especially for soft packaging surface-printing applications and labeling applications.

PRIOR ART DOCUMENTS

Patent Documents

Patent Document 1: JP 2009-190379 A
Patent Document 2: JP 2019-167518 A
Patent Document 3: JP 2021-155556 A

SUMMARY OF INVENTION

Problems Invention Aims to Solve

Embodiments of the present invention have been developed in light of the above issues, and an object thereof is to provide a set including a pretreatment liquid and an aqueous white ink capable of producing a printed matter excellent in all of adhesion to substrates, rubbing resistance, and image quality. Another object of embodiments of the present invention is to provide a set including a pretreatment liquid and an aqueous white ink capable of producing a printed matter having high concealability with high productivity in addition to the above-described properties, and capable of obtaining a high-density printed matter when used together with an aqueous inkjet ink exhibiting a color other than a white color.

Means for Solution of the Problems

As a result of intensive research aimed at achieving the above objects, the inventors of the present invention discovered that the above issues can be addressed by using a pretreatment liquid containing a specific cationic component and a resin together with an aqueous white ink (aqueous white inkjet ink) having a specific static surface tension, and defining the ratio between the amount of the specific cationic component contained in the above pretreatment liquid and the amount of a white-colored colorant contained in the above aqueous white ink, thus completing the present invention.

The present invention includes the following embodiments. The present invention is not limited to the following embodiments.

An embodiment relates to a recording liquid set including a pretreatment liquid and an aqueous white ink, wherein
the pretreatment liquid contains a cationic component, a resin (excluding water-soluble cationic polymers) (PP), and water,
the cationic component is a polyvalent metal ion and/or a water-soluble cationic polymer,
the aqueous white ink contains a white-colored colorant, an organic solvent (WS), and water,
the aqueous white ink has a static surface tension of 20 to 40 mN/m at 25° C.,
the aqueous white ink has a static surface tension at 25° C. that is greater than a static surface tension at 25° C. of the pretreatment liquid, and
when an amount of the white-colored colorant in the aqueous white ink is MWC (% by mass) and an amount of the cationic component in the pretreatment liquid is MPC (% by mass), a value represented by MWC/MPC is 15 to 100.

Another embodiment is a method for producing a printed matter using the recording liquid set, the method including, in this order:
step (1) of applying the pretreatment liquid on a substrate; and
step (2) of printing the aqueous white ink using an inkjet method on a surface of the substrate obtained in step (1) on which the pretreatment liquid is applied.

Still another embodiment relates to a printed matter produced using the method for producing a printed matter.

Effects of the Invention

Embodiments of the present invention are able to provide a set including a pretreatment liquid and an aqueous white ink capable of producing a printed matter excellent in all of adhesion to a substrate, rubbing resistance, and image quality. Embodiments of the present invention are also able to provide a set including a pretreatment liquid and an aqueous white ink capable of producing with high productivity a printed matter having a high density in addition to the above-described properties and capable of producing a high-density printed matter when used together with an aqueous inkjet ink exhibiting a color other than a white color.

Embodiments for Performing the Invention

Preferred embodiments of the present invention will be described in detail below. Note that the embodiments described below describe an example of the present invention. The present invention is not limited to the following embodiments and includes various modifications implemented within a scope not altering the gist of the invention. Note that unless otherwise stated, "parts" represents "parts by mass" and "%" represents "% by mass".

[Recording Liquid Set]

In an embodiment of the present invention, a recording liquid set includes a pretreatment liquid and an aqueous white ink (aqueous white inkjet ink). The recording liquid set, which is an embodiment of the present invention, may further include an optional component, such as an aqueous coloring ink, as necessary. The pretreatment liquid is applied to a substrate prior to printing of the aqueous white ink on the substrate.

As described above, when the aqueous white ink is printed on a non-permeable substrate, by applying the pretreatment liquid containing a coagulant such as a cationic component to the non-permeable substrate in advance, when the aqueous white ink lands on the non-permeable substrate, a solid component in the aqueous white ink aggregates instantaneously and/or the aqueous white ink thickens, and thus it becomes possible to obtain a printed matter excellent in fine line reproducibility and precision. In addition, adhesion to the substrate is improved by adding a resin to the component (the pretreatment liquid and/or the aqueous inkjet ink) in contact with the substrate. This is due to: an interaction between a functional group present in molecules of the resin present in contact with the substrate and a functional group present on the surface of the substrate; an affinity effect based on the structural similarity between molecules of the resin present in contact with the substrate and molecules of the resin constituting the substrate; and the like.

Since high visibility is required for printed matters produced for soft packaging surface-printing applications and labeling applications, the use of the above pretreatment liquid is said to be indispensable. In contrast, in consideration of the conditions and environment of use, it is desirable that these printed matters have: good adhesion, more specifically, adhesion between the pretreatment liquid layer or the aqueous white ink layer and the substrate, and adhesion between the pretreatment liquid layer and the aqueous inkjet ink layer in contact with the pretreatment liquid layer; and rubbing resistance of a certain level or higher.

As described above, in the above applications, an aqueous white ink is used to form a printed matter having high visibility and high design quality for a transparent substrate and a non-white substrate. Here, when the above-described pretreatment liquid and aqueous white ink are simply used together, it is relatively easy to obtain a printed matter excellent in fine line reproducibility and precision. In contrast, when a solid printed matter is produced, aggregation of a solid component in the aqueous white ink and/or thickening of the aqueous white ink occurs before the aqueous white ink is sufficiently wet-spread on the pretreatment liquid layer, which tends to result in a printed matter having voids.

Thus, in the embodiment of the present invention, the static surface tension of the above pretreatment liquid at 25° C. is made smaller than the static surface tension of the above aqueous white ink at 25° C., and further the ratio of the amount of the white-colored colorant contained in the aqueous white ink (MWC (% by mass)) to the amount of the cationic component contained in the pretreatment liquid (MPC (% by mass)) is defined to achieve all of image quality (suppression of voids in solid printed matters, and fine line reproducibility and precision in white text/image printed matters), adhesion, and rubbing resistance of printed matters.

First, in the embodiment of the present invention, a cationic component is selected as a component contained in the pretreatment liquid. As the cationic component, a polyvalent metal ion and/or a water-soluble cationic polymer is used. These cationic components have a high ability to cause a solid component in the aqueous white ink to aggregate and/or to thicken the aqueous white ink. These cationic components may function as a coagulant and/or a thickener. In addition, even when the aqueous white ink is printed on the pretreatment liquid in a dry state, the cationic component can elute into the aqueous white ink and exhibit an aggregation function and/or thickening function. Thus, regardless of the dry state of the pretreatment liquid layer, it becomes possible to easily improve the fine line reproducibility and precision of the aqueous white ink.

In addition, since the static surface tension of the pretreatment liquid used is sufficiently small, the pretreatment liquid can be wet-spread sufficiently on the surface of the substrate to form a uniform layer.

In contrast, the effect of the difference in static surface tensions between the pretreatment liquid and the aqueous white ink varies depending on the drying state of the pretreatment liquid layer when droplets of the aqueous white ink land. When the aqueous white ink is printed on the pretreatment liquid layer in a dry state, it is thought that it takes a certain amount of time for the cationic component to be redissolved and released into droplets of the aqueous white ink and to be distributed inside the droplets. In general, it is known that when droplets having a large static surface tension (surface energy) are applied on a solid layer having a small static surface tension, it is difficult for the droplets to be wet-spread. However, in the embodiment of the present invention, it is preferable to have a balance between the rate of elution of the above-described cationic component into droplets and the rate of diffusion of the cationic component into the entirety of the droplets after the elution, and it is presumed that it is possible to achieve both of the above-described fine line reproducibility and precision, and wet spreadability and void suppression.

In addition, the resin (PP) in the pretreatment liquid forms the above-described interaction with the substrate, and adhesion between the pretreatment liquid layer and the substrate is improved. Furthermore, an interaction also occurs between the resin (PP) in the above pretreatment liquid and a component (for example, a solid component such as an aggregating white-colored colorant, and/or a component such as a resin causing thickening of the aqueous white ink) in the aqueous white ink through the cationic component, and thus the adhesion between the above pretreatment liquid layer and the above aqueous white ink layer in contact with the pretreatment liquid layer is also improved. In addition, the combination of the various interactions described above improves film strength of a printed matter as a whole, and this is thought to lead to improvement in the rubbing resistance.

Meanwhile, when the aqueous white ink is printed on the pretreatment liquid layer in a wet (non-dry) state, droplets of the aqueous white ink, which is printed later, penetrate into the above pretreatment liquid layer in the wet state without remaining on the layer. When a solid printed matter is produced, the aqueous white ink is wet-spread inside the pretreatment liquid layer or at a lower part of the pretreatment liquid layer, and a layer of the aqueous white ink without voids is formed. This penetration of aqueous white ink droplets into the pretreatment liquid layer naturally improves also the adhesion between the aqueous white ink layer and the pretreatment liquid layer. Even when the aqueous white ink layer is formed at a lower part of the pretreatment liquid layer, when the aqueous white ink droplets penetrate into the pretreatment liquid layer, at least part of the resin (PP) in the pretreatment liquid becomes caught in the penetration of the droplets, and thus the resin (PP) reaches the interface with the substrate. Consequently, an interaction occurs between the above-described resin (PP) and substrate, and the adhesion of the aqueous white ink layer and/or the pretreatment liquid layer relative to the substrate is improved.

Note that the white-colored colorant contained in the aqueous white ink aggregates due to the cationic component in the pretreatment liquid during the period from the landing of aqueous white ink droplets to the formation of the above aqueous white ink layer. Thus, even when the aqueous white ink is used to print a white text/image printed matter on a pretreatment liquid layer in a wet state, the printed matter is excellent in fine line reproducibility and precision.

In addition, when the aqueous white ink is printed on a pretreatment liquid layer in a wet (non-dry) state, since the outermost layer is considered to be the pretreatment liquid layer, the rubbing resistance of the printed matter is also improved by the resin (PP) which is not involved in the interaction with the substrate. Furthermore, as in the case of printing the aqueous white ink on a pretreatment liquid layer in a dry state, an interaction between the resin (PP) in the above pretreatment liquid and the components in the aqueous white ink through the cationic component is also thought to occur, thereby making the strength of each layer even better.

In addition, as a result of intensive investigation, the inventors of the present invention discovered that the above-described effect most preferably exhibits when the ratio (MWC/MPC) between the amount of the white-colored colorant (MWC (% by mass)) and the amount of the cationic component (MPC (% by mass)) contained in the pretreatment liquid is 15 to 100. That is, when the value represented by MWC/MPC is 15 or more, the amount of the cationic component is not excessive for the white-colored colorant. Consequently, the elution of the cationic component from the pretreatment liquid layer in a dry state is moderately suppressed, and voids in solid printed matters can be prevented. In addition, also in the case of printing the aqueous white ink on a pretreatment liquid layer in a wet state, with the aggregation of the solid component in the aqueous white ink and/or the thickening of the aqueous white ink, the penetration and wet-spreading of droplets of the aqueous white ink are not inhibited. Meanwhile, since the value represented by MWC/MPC is 100 or less, the fine line reproducibility and precision of the aqueous white ink do not deteriorate, and improvement of adhesion and rubbing resistance due to the above-described interaction through the cationic component can be also achieved.

As described above, in order to obtain a printed matter having excellent adhesion, rubbing resistance, and image quality relative to a non-permeable substrate, it is indispensable to have a recording liquid set having the above-described composition. Note that the above-described mechanism is only a presumption and does not limit the present invention.

<<Pretreatment Liquid (P)>>

Next, regarding the pretreatment liquid (also referred to in the present disclosure as "pretreatment liquid (P)") included in the recording liquid set, which is the embodiment of the present invention, constituent materials and the like will be described in detail.

<Cationic Component>

The pretreatment liquid (P) contains a cationic component. The cationic component causes aggregation of a solid component in the aqueous white ink and/or thickening of the aqueous white ink. Consequently, mixed color bleeding and the like are prevented, and it is possible to obtain a printed matter excellent in fine line reproducibility and precision and having high image quality. In addition, as described above, it is thought that aggregated components such as a colorant cause an interaction through the cationic component and thus the strength of the aqueous white ink layer is increased, thereby improving rubbing resistance.

Generally, the solid component contained in the aqueous ink is stabilized by charge repulsion due to an anionic component such as an acid group. Thus, by using the cationic component as a coagulant and/or a thickener, the above charge repulsion is impaired, and the aggregation and thickening of the solid component occur. In the embodiment of the present invention, a polyvalent metal ion and/or a water-soluble cationic polymer excellent in reducing the charge repulsion is used as such a cationic component. In particular, a polyvalent metal ion can be preferably used in terms of: having low corrosiveness relative to members for applying the pretreatment liquid to substrates, such as inkjet heads, gravure coaters, and roll coaters, and providing printed matters that are stable over a long period of time; enhancing the productivity of printed matters with high charge repulsion-reduction ability; and reducing the tackiness on the surface of printed matters and improving rubbing resistance.

(Polyvalent Metal Ion)

For the above polyvalent metal ion, one kind thereof may be used alone, or two or more kinds thereof may be used in combination. There are no particular limitations on the ion usable as the polyvalent metal ion, but a divalent metal ion is preferably used in the pretreatment liquid (P). A divalent metal ion can quickly reduce the charge repulsion of the solid component when the aqueous white ink comes into contact therewith. In addition, compared with a trivalent or higher metal ion, the rate of reduction of the charge repulsion does not become too large, and the wet-spreading of the aqueous white ink is not excessively suppressed. As a result of the foregoing, a printed matter having particularly excellent image quality can be obtained.

Examples of a divalent metal ion that can be particularly preferably used in the pretreatment liquid (P) include a calcium ion, a magnesium ion, a zinc (II) ion, and an iron (II) ion. Among these, a calcium ion can be particularly preferably used in terms of obtaining a printed matter excellent in the above-described effect and particularly excellent in image quality.

Generally, a polyvalent metal ion is added to the pretreatment liquid in the form of a polyvalent metal salt. There are no particular limitations on the anion component making up the above polyvalent metal salt, but in the case of a salt with calcium, for example, the following anions can be used: a chloride ion (75 g), a nitrate ion (121 g), a permanganate ion (338 g), a formate ion (17 g), an acetate ion (28 g), a propionate ion (38 g), a butyrate ion (17 g), a benzoate ion (2 g), a lactate ion (9 g), a malate ion (0.8 g), a gluconate ion (3 g), a pantothenate ion (35 g), a hydroxide ion (0.1 g), and the like. Note that the value in parentheses is the solubility of a calcium salt anhydride containing the anion in 100 g of water at 20° C.

In the embodiment of the present invention, relative to 100 g of water at 20° C., a salt having a solubility of 1 to 70 g is preferable, a salt having a solubility of 2 to 55 g is more preferable, a salt having a solubility of 4 to 40 g is even more preferable, and a salt having a solubility of 8 to 25 g is particularly preferable, in terms of obtaining a printed matter having an excellent balance among image quality, rubbing resistance, and adhesion of printed matters, improving the image quality because the rate of redissolution and release into droplets of the aqueous white ink does not increase excessively when the aqueous white ink is printed on a pretreatment liquid layer in a dry state, and obtaining a pretreatment liquid without precipitates having excellent storage stability. However, for the above solubility, the value in a salt anhydride is used.

From the above viewpoints, when, in the pretreatment liquid (P), a polyvalent metal ion is supplied from the polyvalent metal salt, a calcium carboxylate salt such as calcium formate, calcium acetate, calcium propionate, calcium butyrate, calcium benzoate, calcium lactate, calcium gluconate, and calcium pantothenate can be preferably used as the polyvalent metal salt. In addition, in that image quality is easily enhanced due to having a certain solubility or more and being able to be added by a certain amount or more into the pretreatment liquid, and in that adhesion and rubbing resistance are easily improved, one or more selected from the group consisting of calcium formate, calcium acetate, calcium propionate, calcium butyrate, calcium lactate, and calcium pantothenate can be preferably selected, and one or more selected from the group consisting of calcium formate, calcium butyrate, and calcium lactate can be particularly preferably selected.

In addition, calcium carboxylate salt is also preferable in that excessive dissolution into the ink can be suppressed and printed matters having excellent image quality can be obtained without voids and beading even during solid printing and printing at a high coverage rate, and in that a carboxyl group forms a hydrogen bond with a functional group present on the surface of the substrate, resulting in printed matters having excellent adhesion. At this time, it is preferable to use multiple kinds of calcium carboxylate salts in that due to an effect similar to the effect of different ions, blending more than the above-described solubility in the pretreatment liquid becomes possible and further improvement in the image quality becomes possible.

Furthermore, in the case of using a calcium carboxylate salt as a polyvalent metal salt, when a calcium hydroxycarboxylate salt including calcium lactate, calcium gluconate, and calcium pantothenate is used, while the details are unclear, a change in aggregation that accompanies a change in the system is less likely to occur, and it becomes possible to stably obtain printed matters having excellent image quality even when productivity is increased. Furthermore, when the aqueous white ink is printed on a pretreatment liquid layer in a dry state, the rate of redissolution and release into droplets of the aqueous white ink does not increase excessively, thereby improving image quality. Furthermore, the use of a calcium hydroxycarboxylate salt is preferable in that a hydroxyl group in addition to a carboxyl group form a hydrogen bond with a functional group present on the surface of the substrate, thereby causing printed matters to be particularly excellent in adhesion and rubbing resistance.

When the total millimolar amount of the cationic component making up the polyvalent metal salt contained in 100 g of the pretreatment liquid is CP, CP is preferably 5 to 60 mmol, more preferably 7.5 to 50 mmol, and particularly preferably 10 to 40 mmol. Within these ranges, a charge repulsion reduction effect can be sufficiently exhibited, and printed matters having excellent image quality can be obtained. In addition, since the action of the resin (PP) present in the pretreatment liquid is not inhibited, which will be described below, the adhesion and rubbing resistance of printed matters are also excellent.

Further, when the total millimolar equivalent of the anionic component making up the polyvalent metal salt contained in 100 g of the pretreatment liquid is AP, AP is preferably 10 to 120 millimolar equivalent, more preferably 15 to 100 millimolar equivalent, and particularly preferably 20 to 80 millimolar equivalent. Within these ranges, the image quality of printed matters can be improved.

The millimolar equivalent of the anionic component is the value obtained by multiplying the millimolar amount of the anionic component and the valence of the anionic component. When only one kind of anionic component is contained in the pretreatment liquid, "total millimolar equivalent" represents the millimolar equivalent of the anionic component. In contrast, when the pretreatment liquid contains two or more kinds of anionic components, "total millimolar equivalent" represents the sum of the millimolar equivalents of respective anionic components contained in the pretreatment liquid.

(Water-Soluble Cationic Polymer)

As a water-soluble cationic polymer used as a cationic component, a water-soluble polymer having a cationic group, such as an amino group, an ammonium group, an amide group, or a ureide group, and capable of causing aggregation of a solid component in the aqueous white ink and/or thickening of the aqueous white ink can be optionally used. A water-soluble cationic polymer synthesized using a conventional method may be used, or a commercial product may be used. Furthermore, one kind of water-soluble cationic polymer may be used alone, two or more kinds of water-soluble cationic polymers may be used in combination, or one or more kinds of water-soluble cationic polymers may be used together with one or more kinds of the above-described polyvalent metal ions.

Note that "water-soluble resin (polymer)" in the present disclosure represents a resin (polymer) in which a 1% by mass aqueous solution of the target resin at 20° C. is transparent to the naked eye. A resin that does not fall under "water-soluble resin (polymer)" is also referred to as "water-insoluble resin (polymer)" in the present disclosure.

When the pretreatment liquid (P) contains a water-soluble cationic polymer, it is preferable to select a water-soluble cationic polymer in which a 5% by mass aqueous solution of the target water-soluble cationic polymer at 20° C. is transparent to the naked eye in that it is possible to obtain printed matters having excellent image quality, rubbing resistance, and adhesion of printed matters and to obtain a pretreatment liquid having good storage stability.

For the pretreatment liquid (P), a polymer containing a diallylamine structural unit and/or a diallylammonium structural unit can be preferably used in that the image quality of printed matters is improved and printed matters have also excellent rubbing resistance and adhesion. In particular, a water-soluble polymer containing a diallylammonium structural unit is particularly preferably selected in that it has a high ability to cause aggregation of a solid component in the aqueous white ink and/or thickening of the aqueous white ink and thus it is possible to easily obtain printed matters having particularly excellent image quality, and that a quaternary ammonium structure interacts with a functional group present on the surface of the substrate, resulting in printed matters having excellent adhesion. Note that a structural unit derived from a hydrochloride salt or an ethyl sulfate salt of diallyldimethylammonium and/or diallylmethylethylammonium is preferably selected as the diallylammonium structural unit in terms of case of availability and the like.

Example commercial products of a water-soluble cationic polymer containing a diallylammonium structural unit include: PAS-H-1L, PAS-H-5L, PAS-24, PAS-84, PAS-J-81L, PAS-J-81, PAS-J-41, PAS-880, PAS-2351, and PAS-2451 (manufactured by NITTOBO MEDICAL CO., LTD.); and UNISENCE FPA100L, FPA101L, FPA102L, FPA1000L, FPA1001L, FCA1000L, FCA1001L, FCA1002L, FCA1003L, FCA5000L, ZCA1000L, ZCA1001L, and ZCA1002L (manufactured by SENKA corporation).

The weight average molecular weight of the water-soluble cationic polymer is preferably 1,000 to 30,000, more preferably 2,500 to 45,000, and even more preferably 5,000 to 20,000. By setting the weight average molecular weight of the water-soluble cationic polymer to 1,000 or more, the water-soluble cationic polymer can preferably cause aggregation of a solid component in the aqueous white ink and/or thickening of the aqueous white ink, thereby improving image quality and improving rubbing resistance of printed matters. In contrast, by setting the weight average molecular weight to 30,000 or less, the pretreatment liquid can be stably applied to substrates.

Note that the weight average molecular weight of the resin (polymer) in the present disclosure can be measured using a GPC (gel permeation chromatography) method. Specifically, the weight average molecular weight is a value obtained by performing a measurement using a GPC device (e.g., HLC-8120GPC manufactured by Tosoh Corporation) equipped with a TSKgel column (manufactured by Tosoh Corporation) and an RI detector, using THF as a developing solvent, and setting the flow rate to 1.0 ml/min, and then by calculating as a converted molecular weight using polystyrene as a standard sample.

(Amount of Cationic Component)

As described above, the amount of the cationic component (MPC) in the pretreatment liquid has a specific ratio relative to the amount of the white-colored colorant (MWC) contained in the aqueous white ink used in combination. Meanwhile, the above MPC is preferably 0.5 to 10 (% by mass) and more preferably 0.8 to 8 (% by mass), from the viewpoints of obtaining printed matters having excellent image quality by preferably exhibiting effects as a coagulant and/or a thickener, and producing printed matters having excellent adhesion and rubbing resistance by causing an interaction through the cationic component.

<Resin (PP)>

The pretreatment liquid (P) contains the resin (PP). The resin (PP) is a material particularly responsible for the adhesion of the pretreatment liquid layer to substrates and rubbing resistance. Note that the water-soluble cationic polymer described above is not included in the resin (PP). In contrast, cationic resin particles (resin particles having a cationic group, such as an amino group, an ammonium group, an amide group, or a ureide group) are included in the above resin (PP). This is because cationic resin particles form a film during the drying step and can participate in improving the adhesion and rubbing resistance of the pretreatment liquid layer, and because the cationic resin particles are not easily redissolved once they form a film, and it is extremely difficult for the cationic resin particles to be released and diffused into the aqueous white ink when the aqueous white ink is printed on a pretreatment liquid layer in a dry state.

Note that "resin particles" in the present disclosure refers to a water-insoluble resin having a 50% diameter of 5 to 1,000 nm measured using a method described below.

In the pretreatment liquid (P), resin particles are preferably used as the resin (PP). This is because the viscosity of the pretreatment liquid is unlikely to increase even when a large amount of resin particles are mixed and it is easy to improve adhesion and rubbing resistance. In addition, since resin particles generally have high hydrophobicity and are unlikely to cause dissolution and/or swelling with water once they form a film, it is easy to obtain printed matters having excellent adhesion, rubbing resistance, and water resistance by using a pretreatment liquid using resin particles instead of a water-soluble resin.

(Resin Particles)

When resin particles are used as the resin (PP), the types thereof are not particularly limited, and examples used thereof include a urethane (urea) resin, urethane-(meth) acrylic resin, (meth)acrylic resin, styrene-(anhydrous)maleic acid resin, olefin-(anhydrous)maleic acid resin, rosin ester resin, rosin phenolic resin, terpene phenolic resin, amine resin, amide resin, amine-amide resin, amine-epihalohydrin resin, amine-amide-epihalohydrin resin, polyolefin resin, and polyester resin. Among these, from the viewpoint of adhesion and rubbing resistance, it is preferable to use particles of a resin selected from the group consisting of a urethane (urea) resin, urethane-(meth)acrylic resin, (meth) acrylic resin, and polyolefin resin, it is even more preferable to use particles of a resin selected from the group consisting of a urethane (urea) resin, urethane-(meth)acrylic resin, and (meth)acrylic resin, and it is particularly preferable to use at least a (meth)acrylic resin.

Note that in the present disclosure, "urethane (urea)" means urethane or urethane-urea, "(meth)acrylic" means acrylic or methacrylic, and "(anhydrous)maleic acid" means maleic acid or maleic anhydride. The (meth)acrylic resin may contain a structure derived from a styrene-based monomer, such as styrene, methoxystyrene, vinyltoluene, or divinylbenzene, as a structural unit.

The pretreatment liquid (P) may contain one kind of a resin (PP) alone, or two or more kinds of reins (PP) may be used in combination. In one embodiment, the above pretreatment liquid preferably contains two or more kinds of resins selected from the group consisting of a urethane (urea) resin, (meth)acrylic resin, urethane-(meth)acrylic resin, and polyolefin resin. By using a combination of resins having different properties and kinds, it becomes possible to obtain printed matters which not only preferably achieve all of adhesion, rubbing resistance, and image quality together, but also are excellent in water resistance and the like. For example, combinations of a urethane (urea) resin and (meth) acrylic resin, (meth)acrylic resin and polyolefin resin, urethane-(meth)acrylic resin and polyolefin resin, urethane-(meth)acrylic resin and (meth)acrylic resin, and the like can be preferably selected. Thereamong, a combination including at least a (meth)acrylic resin is particularly preferably selected from among the above combinations because all of the above-described properties can be achieved together at a high level.

When the pretreatment liquid contains (meth)acrylic resin particles and resin particles selected from the group consisting of a urethane (urea) resin, urethane-meth(meth) acrylic resin, and polyolefin resin, the amount of the (meth) acrylic resin particles is, relative to the total amount of the resin (PP) in the pretreatment liquid, preferably 30 to 98% by mass and particularly preferably 50 to 95% by mass.

When resin particles selected from the group consisting of a urethane (urea) resin, urethane-(meth)acrylic resin, and (meth)acrylic resin are used as the resin particles and these resins contain an anionic functional group, such as a carboxyl group, sulfo group, or phospho group, the acid value of the resin particles containing the anionic functional group is preferably 1 to 50 mgKOH/g from the viewpoint of achieving adhesion, image quality, and rubbing resistance together. The acid value is more preferably 1 to 40 mgKOH/g and particularly preferably 2 to 30 mgKOH/g, from the viewpoints of improving the storage stability of the pretreatment liquid and maintaining preferable adhesion, rubbing resistance, and image quality even immediately after the coating of the pretreatment liquid and even after a long period of time after the coating. Note that the acid value of the resin particles is the number of mg of potassium hydroxide (KOH) required to neutralize an anionic functional group contained in 1 g of the resin particles, and can be measured through a potentiometric titration method using a conventionally known device. Specifically, the value is calculated from the result of titration using a KOH solution in an ethanol/toluene mixed solvent using, for example, an "Automatic Potentiometric Titrator AT-610" manufactured by Kyoto Electronics Manufacturing Co., Ltd.

The 50% diameter (D50) of the resin particles is preferably 20 to 350 nm. In addition, it is more preferably 30 to 300 nm and particularly preferably 50 to 250 nm, from the viewpoint of obtaining printed matters excellent in adhesion and rubbing resistance of printed matters, excellent in storage stability of the pretreatment liquid, and excellent in image quality by forming a film more rapidly and uniformly, thereby preventing the shapes of droplets of the aqueous ink to be printed later from becoming uneven. Note that "50% diameter" in the present disclosure is the cumulative 50% diameter (median diameter) measured using a dynamic light scattering method on a volume basis. For example, a NANOTRAC UPA-EX150 manufactured by MicrotracBEL Corp. can be used for the measurement.

The amount (solid fraction amount) of the resin (PP) contained in the pretreatment liquid (P) is, relative to the total amount of the pretreatment liquid, preferably 2% to 20% by mass, more preferably 3% to 18% by mass, and particularly preferably 4% to 16% by mass, from the viewpoints of adhesion, rubbing resistance, water resistance, and the like of printed matters.

In addition, from the viewpoint that all of adhesion, rubbing resistance, and image quality can be improved and further water resistance can be improved, when the amount of the cationic component contained in 100 g of the pretreatment liquid (when a salt of a polyvalent metal ion is used, the amount (mass) of a salt anhydride is used, and when a water-soluble cationic polymer is used, the amount (solid fraction mass) thereof is used) is C (g) and the amount (solid fraction mass) of the resin (PP) contained in 100 g of the pretreatment liquid is R (g), the value represented by R/C is preferably 0.3 to 10, even more preferably 0.5 to 8, and particularly preferably 0.7 to 5.

<Organic Solvent (PS)>

The pretreatment liquid (P) may further contain an organic solvent (note that the organic solvent contained in the pretreatment liquid is designated as "organic solvent (PS)"). By combined use of an organic solvent (PS), the affinity of the cationic component and the resin (PP) is improved, and the cationic component and the resin (PP) can be made uniformly present in the entirety of the pretreatment liquid layer, thereby improving the storage stability of the pretreatment liquid and the image quality, adhesion, and rubbing resistance of printed matters. Furthermore, it becomes possible to adjust the wet-spreadability and dryness of the pretreatment liquid, and thus it becomes also easy to apply the pretreatment liquid uniformly on substrates and improve productivity.

From the viewpoint that the above effect is more preferably exhibited, a water-soluble organic solvent can be preferably used as the above organic solvent (PS). Note that "water-soluble organic solvent" in the present disclosure refers to an organic compound that is liquid at 25° C. and has a solubility of 1% by mass or more relative to water at 25° C.

One kind of an organic solvent (PS) may be used alone, or two or more kinds thereof may be used in combination. In addition, there is no limit on the kind of organic solvent (PS) which can be used, and conventionally known ones can be optionally used. Thereamong, from the viewpoint of optimizing the wet-spreadability and dryness of the pretreatment liquid and improving the adhesion and image quality of printed matters, it is preferable to use an organic solvent having a static surface tension of 20 to 45 mN/m at 25° C., more preferable to use an organic solvent having a static surface tension of 24 to 40 mN/m, and particularly preferable to use an organic solvent having a static surface tension of 27 to 36 mN/m.

Note that the static surface tension in the present disclosure is a value measured using the Wilhelmy method in an environment of 25° C. Specifically, the measurement can be performed using a platinum plate in an environment of 25° C. using, for example, a "DY-300" manufactured by Kyowa Interface Science Co., Ltd.

From the viewpoint similar to the case of the static surface tension described above and in terms of improving the productivity of printed matters, it is preferable to use an organic solvent having a boiling point of 120 to 220° C. at 1 atmosphere, it is more preferable to use an organic solvent having a temperature of 130 to 210° C., it is even more preferable to use an organic solvent having a temperature of 140 to 200° C., and it is particularly preferable to use an organic solvent having a temperature of 145 to 195° C. Furthermore, when the pretreatment liquid contains two or more kinds of organic solvents, the weighted average value of the boiling points of the two or more kinds of organic solvents at 1 atmosphere is preferably 120 to 220° C., more preferably 130 to 210° C., even more preferably 140 to 200° C., and particularly preferably 145 to 195° C.

Note that the weighted average value of boiling points at 1 atmosphere is a value obtained by multiplying the boiling point at 1 atmosphere for each organic solvent by the mass percentage of that organic solvent relative to the total organic solvent, and then adding the values calculated for the organic solvents. The expression "boiling point (weighted average value) of an organic solvent" in the present disclosure refers to the boiling point of an organic solvent when only one kind of the organic solvent is contained in the target composition, and to the weighted average value of the boiling points of the two or more kinds of organic solvents when two or more kinds of organic solvents are contained in the target composition.

In the case where the pretreatment liquid contains two or more kinds of organic solvents, the amount of organic solvent having a boiling point of 220° C. or higher at 1 atmosphere is, relative to the total amount of the pretreatment liquid, preferably 10% by mass or less (may be even 0% by mass), more preferably 5% by mass or less (may be even 0% by mass), and particularly preferably 2% by mass or less (may be even 0% by mass), from the viewpoint of having a pretreatment liquid having the above-described preferable weighted average values of boiling points and obtaining printed matters having excellent adhesion and image quality.

In addition, the pretreatment liquid (P) preferably contains an organic solvent having a vapor pressure of 0.03 to 9.0 mmHg at 20° C. from the viewpoint of improving the adhesion and image quality of printed matters. In particular, it is preferable to set the amount of the organic solvent having the vapor pressure of 0.03 to 9.0 mmHg to 5% by mass or more and less than 30% by mass of the total amount of the pretreatment liquid (preferably 5% by mass or more and 20% by mass or less) from the viewpoint of obtaining printed matters particularly excellent in adhesion and rubbing resistance.

When the pretreatment liquid contains two or more kinds of organic solvents, it is preferable to set, relative to the total amount of the pretreatment liquid, the amount of an organic solvent having a vapor pressure of less than 0.03 mmHg at 20° C. to less than 10% by mass (may be 0% by mass) and particularly preferable to less than 5% by mass (may be 0% by mass), from the viewpoint of obtaining printed matters excellent in adhesion and image quality.

Note that the vapor pressure of an organic solvent in the present disclosure can be measured using a conventionally known method and device, for example, using a vapor pressure measuring device capable of measuring through the Knudsen effusion method.

Meanwhile, it is preferable to use a water-soluble organic solvent containing one or more hydroxyl groups in the molecular structure, and particularly preferable to use a water-soluble organic solvent containing two hydroxyl groups in the molecular structure, from the viewpoint of improving affinities of the cationic component and the resin (PP), and the aqueous white ink to be printed later, and improving image quality, adhesion, and rubbing resistance of printed matters. In this case, the amount of a water-soluble organic solvent containing one or more hydroxyl groups in the molecular structure (preferably, a water-soluble organic solvent containing two hydroxyl groups) is, relative to the total amount of the organic solvent (PS), preferably 50% to 100% by mass, more preferably 70% to 100% by mass, and particularly preferably 90% to 100% by mass, in order to more preferably exhibit the above effects.

In the pretreatment liquid (P), it is preferable to use 1,2-propanediol as the organic solvent (PS), which satisfies all of the above-described static surface tension, boiling point, and structural conditions. A specific example of a water-soluble organic solvent containing one or more hydroxyl groups in the molecular structure, which the organic solvent (PS) may contain, is the same as that of an aqueous white ink described below.

The total amount of the organic solvent (PS) in the pretreatment liquid is, relative to the total amount of the pretreatment liquid, preferably 5% to 50% by mass, more preferably 8% to 40% by mass, and particularly preferably 10% to 30% by mass. By keeping the amount of the organic solvent (PS) within the above ranges, affinities of the cationic component and the resin (PP), and the aqueous white ink to be printed later can be improved, and consequently image quality and rubbing resistance of printed matters can be improved. In addition, regardless of the method for applying the pretreatment liquid, stable and uniform application of the pretreatment liquid without causing printing defects over a long period is made possible, thereby particularly improving the adhesion of printed matters.

<Surfactant (PA)>

Since the pretreatment liquid (P) is applied stably and uniformly on the substrate, a surfactant may be contained (note that a surfactant contained in the pretreatment liquid is designated as "surfactant (PA)"). There are no limitations on the type of compound that can be used as the surfactant (PA), and conventionally known compounds can be used optionally. In particular, it is preferable to use a siloxane surfactant from the viewpoint that the above-described requirement of static surface tension can be easily realized, stable and uniform application on the substrate can be enhanced, and printed matters excellent in adhesion, image quality, and rubbing resistance can be obtained.

Note that specific examples of the siloxane surfactant are the same as those for the aqueous white ink described below.

For the surfactant (PA), a single compound may be used, or two or more kinds of compounds may be used together. In particular, it is preferable to use two or more different kinds of surfactants together. In this way, even when productivity is increased, properties and functions of the respective surfactants enable the pretreatment liquid to be wet-spread evenly on substrates and the adhesion and image quality of printed matters are particularly improved. Specifically, a combination of a siloxane surfactant and an acetylene diol surfactant, a combination of a siloxane surfactant and a polyoxyethylene alkyl ether surfactant, and the like can be preferably used.

Note that specific examples of the acetylene diol surfactant are the same as those of the aqueous white ink described below. Commercial products of polyoxyethylene alkyl ether surfactants include the EMULGEN (registered trademark) series manufactured by Kao Corporation, the Newcol (registered trademark) series manufactured by NIPPON NYUKAZAI CO., LTD., the Blaunon (registered trademark) series manufactured by AOKI OIL INDUSTRIAL Co., Ltd., and the Pegnol (registered trademark) series manufactured by TOHO Chemical Industry Co., Ltd.

The amount of the surfactant (PA) in the pretreatment liquid (P) is preferably 0.1% to 10% by mass, more preferably 0.2% to 8% by mass, particularly preferably 0.5% to 5% by mass, and, from the viewpoint of improving adhesion, most preferably 0.5% to 1.5% by mass.

<Water>

The amount of water contained in the pretreatment liquid (P) is, relative to the total amount of the pretreatment liquid, preferably 30% to 95% by mass, more preferably 40% to 85% by mass, and even more preferably 50% to 75% by mass. Water can enhance the mutual solubility of materials essential for the pretreatment liquid (P), such as the cationic component and the resin (PP), and is indispensable for improving storage stability of the pretreatment liquid and the image quality of printed matters.

<Other Materials>

Besides the above-described materials, materials such as a pH adjuster, a colorant, a viscosity adjuster, and a preservative may be added to the pretreatment liquid (P) as necessary.

(pH Adjuster)

For example, the pretreatment liquid (P) may include a pH adjuster from the viewpoints of reducing damage to the components included in the device used for applying the pretreatment liquid (pretreatment liquid applying device) and improving the storage stability of the pretreatment liquid by suppressing pH fluctuations over time. There are no limitations on materials which can be used as the pH adjuster, and one kind may be used alone or two or more kinds may be used in combination.

In the case of acidification of the pretreatment liquid, an inorganic acid including hydrochloric acid, sulfuric acid, phosphoric acid, and boric acid, and an organic acid including acetic acid, citric acid, maleic acid, maleic anhydride, succinic acid, tartaric acid, malic acid, fumaric acid, malonic acid, ascorbic acid, and glutamic acid can be used. In particular, when these materials are used and further a polyvalent metal ion is used as the cationic component, the solubility of the polyvalent metal ion and a salt composed of an inorganic acid and/or organic acid in 100 g of water at 20° C. is preferably 1 to 70 g, more preferably 2 to 55 g, even more preferably 4 to 40 g, and particularly preferably 8 to 25 g. However, for the above solubility, the value in a salt anhydride is used.

In the case of basification of the pretreatment liquid, examples used include an organic amine solvent such as monoethanolamine, diethanolamine, triethanolamine, N-methyldiethanolamine, dimethylaminoethanol, diethylaminoethanol, and aminomethylpropanol; ammonia water; an hydroxide of an alkali metal such as lithium hydroxide, sodium hydroxide, and potassium hydroxide; and a carbonate of an alkali metal such as lithium carbonate, sodium carbonate, sodium bicarbonate, and potassium carbonate. In particular, when the pretreatment liquid is printed on substrates using an inkjet method, a compound having a boiling point equal to or higher than the boiling point of water is preferable in order to suppress adverse effects on other materials due to a change in pH associated with drying of water in the vicinity of inkjet nozzles (and nozzle blockages and the like due to the adverse effects), to maintain high productivity, and to continuously exhibit the effects according to the embodiment of the present invention. Meanwhile, in order to enhance the rubbing resistance and water resistance of printed matters, it is preferable to use a compound which is unlikely to remain in printed matters. From these viewpoints, in the case of basification of the pretreatment liquid, monoethanolamine, N-methyldiethanolamine, dimethylaminoethanol, diethylaminoethanol, and aminomethylpropanol can be preferably used.

From the viewpoint of effectively exhibiting the above-described effects, the blending amount of the pH adjuster is, relative to the total amount of the pretreatment liquid, preferably 0.01% to 5% by mass and more preferably 0.05% to 3% by mass.

<Properties of Pretreatment Liquid>

The pretreatment liquid (P) preferably has a viscosity at 25° C. of 5 to 200 mPa·s, more preferably 5 to 180 mPa·s, even more preferably 8 to 160 mPa·s, and particularly preferably 10 to 150 mPa·s. The pretreatment liquid satisfying the above viscosity ranges can be applied evenly to non-permeable substrates, and thus printed matters are excellent in image quality, adhesion, and rubbing resistance. Note that as the viscosity of the pretreatment liquid, for example, when the viscosity of the pretreatment liquid measured using an E-type viscometer is 200 mPa·s or less, the value measured using an E-type viscometer (for example, a TVE25L type viscometer manufactured by Toki Sangyo Co., Ltd.) can be adopted, or when the viscosity of the pretreatment liquid measured using the E-type viscometer is more than 200 mPa·s or the pretreatment liquid has a viscosity exceeding the upper limit of the measurable value of the E-type viscometer, a value measured using a B-type viscometer (for example, a TVB10 type viscometer manufactured by Toki Sangyo Co., Ltd) can be adopted.

Meanwhile, the static surface tension of the pretreatment liquid (P) is smaller than that of the aqueous white ink used in combination, as described above. In addition, from the viewpoint of obtaining printed matters excellent in image quality, adhesion, and rubbing resistance by applying preferable wet-spreadability on a non-permeable substrate and forming a layer of the pretreatment liquid that is uniform and has no unevenness, 20 to 40 mN/m is preferable, 21 to 37 mN/m is more preferable, and 22 to 35 mN/m is particularly preferable. Note that the static surface tension in the present disclosure can be measured in the same manner as for the static surface tension of the organic solvent described above.

In addition, the pretreatment liquid (P) preferably contains substantially no colorant such as a pigment and dye. By using a pretreatment liquid that does not contain colorants and is substantially transparent, it is possible to obtain printed matters that take advantage of the color tones and transparency properties specific to substrates. Note that "contain substantially no" in the present disclosure means that the material is not allowed to be intentionally added to the extent that the effects of the embodiment of the present invention are prevented, and does not exclude, for example, unintentional contamination of impurities or by-products. Specifically, relative to the total amount of the composition (here, the pretreatment liquid), the material (here, a colorant such as a pigment and dye) is not contained at 2.0% by mass or more, preferably not contained at 1.0% by mass or more, more preferably not contained at 0.5% by mass or more, and particularly preferably not contained at 0.1% by mass or more.

<Method for Producing Pretreatment Liquid>

The pretreatment liquid (P) made from the components described above is produced by mixing, for example, a salt of a cationic component, a resin (PP), and, as necessary, a material described above such as an organic solvent (PS), a surfactant (PA), and a pH adjuster, followed by filtration as necessary. However, the method for producing the pretreatment liquid is not limited to the above method. Note that the mixing order of the above materials may be discretionary, and for example, the order described in the embodiment described below may be used. During stirring and mixing, the mixture may be heated in a range of 40 to 80° C. as necessary.

<<Aqueous White Inkjet Ink (Aqueous White Ink)>>

Next, regarding the aqueous white ink (also referred to as "aqueous white ink (W)" in the present disclosure) included in the recording liquid set according to the embodiment of the present invention, constituent materials and the like will be described in detail below.

<Organic Solvent (WS)>

The aqueous white ink (W) contains an organic solvent (WS). Conventionally known organic solvents can be optionally used as the organic solvent (WS).

Thereamong, it is preferable to use, as the organic solvent (WS), a water-soluble organic solvent containing one or more hydroxyl groups in the molecular structure from the viewpoint that the static surface tension of the aqueous white ink can be easily within a preferable range described below and that the adhesion and image quality of printed matters can be improved. Furthermore, it is preferable to use a water-soluble organic solvent containing two hydroxyl groups in the molecular structure from the viewpoint of improving the discharge stability of the aqueous white ink and further improving the image quality of printed matters. In particular, it is particularly preferable that the organic solvent (WS) contain 1,2-propanediol from the viewpoint that the affinity with the pretreatment liquid can be improved, and further, the static surface tension is easily within a preferable range described below.

Note that, in terms of exhibiting the above effects more preferably, the amount of the water-soluble organic solvent containing one or more hydroxyl groups in the molecular structure is, relative to the total amount of the organic solvent (WS), preferably 50% to 100% by mass, more preferably 70% to 100% by mass, and particularly preferably 90% to 100% by mass. For the same reason, the amount of the water-soluble organic solvent containing two hydroxyl groups in the molecular structure is, relative to the total amount of the organic solvent (WS), preferably 50% to 100% by mass, more preferably 70% to 100% by mass, and particularly preferably 90% to 100% by mass.

Examples of the water-soluble organic solvent containing one hydroxyl group in the molecular structure include a monohydric alcohol solvent such as methanol, ethanol, 1-propanol, 2-propanol, 1-butanol, 2-butanol, 2-pentanol, and 2-hexanol; a glycol monoalkyl ether solvent such as ethylene glycol monoethyl ether, ethylene glycol monopropyl ether, ethylene glycol monobutyl ether, ethylene glycol monohexyl ether, ethylene glycol mono-2-ethylhexyl ether, diethylene glycol monomethyl ether, diethylene glycol monoethyl ether, diethylene glycol monopropyl ether, diethylene glycol isopropyl ether, diethylene glycol monobutyl ether, diethylene glycol isobutyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monomethyl ether, propylene glycol monoethyl ether, propylene glycol monopropyl ether, propylene glycol isopropyl ether, propylene glycol monobutyl ether, propylene glycol isobutyl ether, propylene glycol monohexyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, 1,2-butylene glycol monomethyl ether, 3-methoxybutanol, and 3-methyl-3-methoxybutanol; and a hydroxyketone solvent such as monohydroxyacetone and diacetone alcohol.

Examples of the water-soluble organic solvent containing two hydroxyl groups in the molecular structure include an alkanediol solvent such as 1,2-ethanediol, 1,2-propanediol, 1,3-propanediol, 1,2-butanediol, 1,3-butanediol, 1,4-butanediol, 2,3-butanediol, 1,2-pentanediol, 1,5-pentanediol, 1,2-hexanediol, 1,6-hexanediol, 2-methyl-1,3-propanediol, 2,2-dimethyl-1,3-propanediol, 2-ethyl-2-methyl-1,3-propanediol, 2-methyl-2-propyl-1,3-propanediol, 3-methyl-1,3-butanediol, 3-methyl-1,5-pentanediol, 2-methyl-2,4-pentanediol, 2-ethyl-1,3-hexanediol; and a polyalkylene glycol solvent such as diethylene glycol, triethylene glycol, tetraethylene glycol, polyethylene glycol #200, polyethylene glycol #400, dipropylene glycol, tripropylene glycol, and dibutylene glycol.

Note that in the present disclosure, the above alkanediol solvent and the above polyalkylene glycol solvent are collectively referred to as "diol solvent".

Examples of a water-soluble organic solvent containing three or more hydroxyl groups in the molecular structure include a chain-like polyol solvent such as glycerin, trimethylolpropane, 1,2,4-butanetriol, 1,2,6-hexanetriol, diglycerin, and polyglycerin.

Other examples of organic solvents usable in embodiments of the present invention include a glycol dialkyl ether solvent such as diethylene glycol dimethyl ether, diethylene glycol methyl ethyl ether, diethylene glycol butyl methyl ether, diethylene glycol diethyl ether, triethylene glycol dimethyl ether, triethylene glycol methyl ethyl ether, triethylene glycol butyl methyl ether, triethylene glycol diethyl ether, tetraethylene glycol dimethyl ether, tetraethylene glycol methyl ethyl ether, tetraethylene glycol butyl methyl ether, and tetraethylene glycol diethyl ether; a chain-like nitrogen-containing solvent such as N,N-dimethyl-β-methoxypropionamide, N,N-dimethyl-β-ethoxypropionamide, N,N-dimethyl-β-butoxypropionamide, N,N-dimethyl-β-pentoxypropionamide, N,N-dimethyl-β-hexoxypropionamide, N,N-dimethyl-β-heptoxypropionamide, N,N-dimethyl-β-2-ethylhexoxypropionamide, N,N-dimethyl-β-octoxypropionamide, N,N-diethyl-β-butoxypropionamide, N,N-diethyl-β-pentoxypropionamide, N,N-diethyl-β-hexoxypropionamide, N,N-diethyl-β-heptoxypropionamide, and N,N-diethyl-β-octoxypropionamide; and a heterocyclic solvent such as 2-pyrrolidone, N-methylpyrrolidone, N-ethylpyrrolidone, γ-butyrolactone, δ-valerolactone, ε-caprolactone, γ-butyrolactam, δ-valerolactam, ε-caprolactam, 3-methyl-2-oxazolidinone, and 3-ethyl-2-oxazolidinone.

The total amount of the organic solvent (WS) contained in the aqueous white ink (W) is, relative to the total amount of the aqueous white ink, preferably 2% to 50% by mass, more preferably 3% to 45% by mass, and particularly preferably 5% to 40% by mass. By keeping the amount of the organic solvent (WS) within the above ranges, sufficient wet-spreadability and dryness can be ensured when combined with the above-described pretreatment liquid, and printed matters are particularly excellent in image quality.

For the same reason as in the case of the amount of the above-described organic solvent, the boiling point (weighted average value) of the organic solvent (WS) contained in the aqueous white ink (W) is preferably 120 to 200° C., more preferably 130 to 195° C., and particularly preferably 140 to 190° C.

In addition, for the same reason as in the case of the amount of the above-described organic solvent, that is, since printed matters having excellent adhesion and rubbing resistance can be obtained, it is preferable to use an organic solvent having a vapor pressure of 0.03 to 1.0 mmHg (preferably, 0.04 to 0.2 mmHg) at 20° C. as the organic solvent (WS). In particular, when an aqueous white ink containing an organic solvent having a vapor pressure of 0.03 to 1.0 mmHg (preferably, 0.04 to 0.2 mmHg) at 20° C. is printed on a pretreatment liquid layer in a wet (non-dry) state, the above aqueous white ink does not cause excessive volatilization such as boiling inside the above pretreatment liquid layer, or the aqueous white ink does not dry insufficiently, and thus there is no risk of deterioration in image quality due to drying and in rubbing resistance.

From the viewpoint described above, the amount of the organic solvent having a vapor pressure of 0.03 to 1.0 mmHg (preferably, 0.04 to 0.2 mmHg) is, relative to the total amount of the aqueous white ink, preferably 5% by mass or more and less than 30% by mass, and particularly preferably 10% by mass or more and 25% by mass or less. Similarly, the amount of the organic solvent having the above vapor pressure of 0.03 to 1.0 mmHg (preferably, 0.04 to 0.2 mmHg) is, in the total amount of the organic solvent (WS) contained in the aqueous white ink (W), preferably 50% to 100% by mass, more preferably 70% to 100% by mass, and particularly preferably 90% to 100% by mass.

In the case where the aqueous white ink contains two or more kinds of organic solvents, from the viewpoint of obtaining printed matters having excellent adhesion and image quality, the amount of the above organic solvent having a vapor pressure of less than 0.03 mmHg at 20° C. is, relative to the total amount of the aqueous white ink, preferably less than 10% by mass (may be 0% by mass) and particularly preferably less than 5% by mass (may be 0% by mass).

<Surfactant (WA)>

The aqueous white ink (W) preferably contains a surfactant for the purpose of adjusting static surface tension and improving image quality (note that a surfactant contained in the aqueous white ink is referred to as "surfactant (WA)").

There are no limitations on the type of surfactant that can be used as a surfactant (WA), and conventionally known surfactants can be optionally used. Thereamong, it is preferable to use an acetylene diol surfactant and/or a siloxane surfactant, and it is particularly preferable to include at least an acetylene diol surfactant, in terms of obtaining printed matters having excellent image quality, adhesion, and rubbing resistance by preventing complete miscibility between the pretreatment liquid and the aqueous white ink, and in terms of optimizing discharge stability from nozzles.

It is also preferable to use the same type of surfactant as the surfactant (PA) in the pretreatment liquid from the viewpoint of the affinity with the pretreatment liquid layer. For example, when the surfactant (PA) contains an acetylene diol surfactant, the surfactant (WA) also preferably contains an acetylene diol surfactant, respectively.

As the surfactant, one synthesized through a conventional method may be used, or a commercial product may be used. For example, commercial products of an acetylenediol surfactant include SURFYNOL 82, 104 series, 420, 440, 465, 485, and DF-110D, and Dynol 604 and 607 (manufactured by Air Products Limited).

As the siloxane surfactant, a compound represented by the following general formula 1 can be preferably used.

[Chemical formula 1]

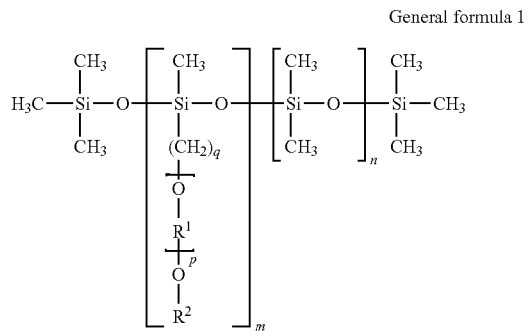

General formula 1

In general formula 1, m is an integer greater than or equal to 1, n is an integer greater than or equal to 0, p is an integer of 1 to 20, q is an integer of 1 to 6, and m+n is 1 to 8. R1 is an alkylene group having 2 to 4 carbon atoms, and R2 is a hydrogen atom or an alkyl group having 1 to 6 carbon atoms.

As the surfactant (WA), a single compound may be used, or two or more kinds may be used together. The total amount of the content is, relative to the total amount of the aqueous white ink, preferably 0.1% to 10% by mass, more preferably 0.2% to 8% by mass, and particularly preferably 0.5% to 5% by mass.

<White-Colored Colorant>

The aqueous white ink (W) contains a white-colored colorant. Note that "white color/white-colored" in the present disclosure refers to a color generally referred to as "white".

For example, "white color/white-colored" in the present disclosure is a color exhibited by an aqueous ink used to produce a coated product that has a lightness ($L^*$) of 70 or more and a chromaticity ($a^*$, $b^*$) of $-4.5 \leq a^* \leq 3$ and $-6 \leq b^* \leq 3$, respectively, as measured using the following method and conditions. "Aqueous ink having a color other than a white color" means an aqueous ink which exhibits a color other than the above white color.

As an example of the method for measuring the above-described lightness and chromaticity of a coated product, a substrate (for example, a biaxially-oriented polypropylene film "OPU-1" (20 μm thick) manufactured by Mitsui Chemicals Tohcello, Inc.) is coated with the aqueous ink to have a wet film thickness of 6 μm (for example, using a K control coater K202 with a wire bar No. 1 manufactured by Matsuo Sangyo Co., Ltd.), and then is dried in an oven at 80° C. for 1 minute or more to obtain the coated product. Then, the lightness and chromaticity of the above coated product placed on a white plate are measured using a spectral densitometer (for example, exact manufactured by X-Rite, Inc.) under the conditions of a D50 light source, a viewing angle of 2°, and a CIE color system.

For example, for a colorant, a color exhibited by a colorant having a lightness ($L^*$) of 70 or more and a chromaticity ($a^*$, $b^*$) of $-4.5 \leq a^* \leq 3$ and $-6 \leq b^* \leq 3$, respectively, as measured using the following method and conditions is a "white color" in the present disclosure. A colorant "having a color other than a white color" means a colorant which exhibits a color other than the above white color.

As an example of the method for measuring the above-described lightness and chromaticity of a colorant, a colorant is held on a substrate (for example, a biaxially-oriented polypropylene film "OPU-1" (20 μm thick) manufactured by Mitsui Chemicals Tohcello, Inc.) in such a manner that the amount of the colorant is about 1.0 g/m². As an example of the holding method, for example, when a colorant dispersion having a colorant concentration of 15% by mass and a density of 1.11 g/cm³ is used, the above colorant dispersion is coated to have a wet film thickness of 6 μm (for example, using a K control coater K202 with a wire bar No. 1 manufactured by Matsuo Sangyo Co., Ltd.), and then is dried in an oven at 80° C. for 1 minute or more to obtain a substrate on which the colorant is held. Then, the lightness and chromaticity of the colorant held on the substrate placed on a white plate are measured using a spectrodensitometer (for example, exact manufactured by X-Rite, Inc.) under the conditions of a D50 light source, a viewing angle of 2°, and a CIE color system.

A conventionally known organic pigment and/or an inorganic pigment can be optionally used as the white-colored colorant contained in the aqueous white ink, and one kind of pigment may be used alone, or for example, for adjusting hue and color development, two or more kinds of pigments may be used together.

Examples of the white-colored colorant which can be used in the aqueous white ink (W) include an inorganic pigment such as titanium oxide, zinc oxide, lithopone, and (hollow) silica, and an organic pigment such as (hollow) resin particles. Among these, titanium oxide and/or zinc oxide can be preferably used in terms of excellent concealability of obtained printed matters and improved rubbing resistance of printed matters.

Note that in the case of using titanium oxide and/or zinc oxide as the white-colored colorant, from the viewpoints that it can be uniformly present in the aqueous white ink layer and thus printed matters having high concealability and excellent image quality can be obtained and that the storage stability of the aqueous white ink is improved, the 50% diameter of the titanium oxide and/or zinc oxide is preferably 200 to 300 nm and particularly preferably 220 to 280 nm. In the case of printing the aqueous white ink on a pretreatment liquid layer in a wet state, in order to maximize the effect described above, the aqueous white ink needs to be moderately penetrated into the pretreatment liquid layer, and from this viewpoint, it is preferable that the 90% diameter of the titanium oxide and/or zinc oxide be 350 nm or less and the 10% diameter of the titanium oxide and/or zinc oxide be 100 nm or more.

Note that in the present disclosure, "90% diameter" and "10% diameter" are the cumulative 90% diameter and the cumulative 10% diameter on a volume basis, which are measured using a dynamic light scattering method. For example, a Nanotrack UPA-EX150 manufactured by MicrotracBEL Corp. can be used for the measurement.

As described above, the amount of the white-colored colorant (MWC) in the aqueous white ink is 15 to 100 times the amount of the cationic component (MPC) in the pretreatment liquid used in combination. In terms of obtaining printed matters having excellent image quality and excellent adhesion regardless of the pattern and the like of printed matters produced using a set of these, a ratio of the above amount (MWC/MPC) is preferably 20 to 95 and particularly preferably 25 to 90.

In addition, from the viewpoint of obtaining printed matters having high concealability and excellent image quality, from the viewpoint of improving the rubbing resistance, water resistance, light resistance, weather resistance, and the like of printed matters, and further from the viewpoint of causing the viscosity of the aqueous white ink (W) to be within a range preferable for inkjet printing and ensuring preferable discharge stability, it is preferable to blend a certain amount or more of the above-described colorant in the aqueous white ink. Specifically, the above MWC is preferably 13 to 25 (% by mass) and particularly preferably 15 to 23 (% by mass).

<Pigment Dispersing Resin>

When the above-described pigment is used as a white-colored colorant, examples of methods for stably dispersing and holding the pigment in the aqueous white ink (W) include (1) a method for coating at least part of the pigment surface with a pigment dispersing resin, (2) a method for causing a water-soluble and/or water-dispersible surfactant to be adsorbed to the pigment surface, and (3) a method for chemically and/or physically introducing a hydrophilic functional group onto the pigment surface and dispersing the hydrophilic functional group in the aqueous ink without a pigment dispersing resin or surfactant (self-dispersing pigment).

For the aqueous white ink (W), the method (1) among those listed above, that is, the method using a pigment dispersing resin, is preferably selected. This is because, by examining and selecting a composition and molecular weight of a polymerizable monomer forming the above pigment dispersing resin, the pigment surface can be sufficiently coated with the resin even after drying the aqueous white ink, and the rubbing resistance and water resistance of printed matters can be enhanced. In addition, this is because, by examining and selecting a composition and molecular weight of the above polymerizable monomer, the coating ability of the pigment dispersing resin relative to the pigment and the charge of the pigment dispersing resin can be easily adjusted, and thus it becomes possible to impart dispersion stability even when a fine pigment is used, and furthermore, it is possible to obtain printed matters having excellent discharge stability and concealability.

The types of the pigment dispersing resin usable in the aqueous white ink (W) are not limited, and examples thereof include a (meth)acrylic resin, a styrene-maleic anhydride resin, a urethane (urea) resin, a urethane-(meth)acrylic resin, and a polyester resin (polycondensate of a polyvalent carboxylic acid with a polyhydric alcohol), but they are not limited to these. Thereamong, it is preferable to use one or more selected from the group consisting of a (meth)acrylic resin and a styrene-maleic anhydride resin in terms of wide material selectivity and case of synthesis.

The pigment dispersing resin may be synthesized using a known method, or a commercial product can be used. There are no particular limitations on the structure, and for example, a resin having a random structure, a block structure, a comb structure, a star structure, or the like can be used. In addition, as the pigment dispersing resin, a water-soluble resin may be selected, or a water-insoluble resin may be selected.

When a water-soluble resin is used as the pigment dispersing resin, the acid value thereof is preferably 80 to 300 mgKOH/g and particularly preferably 100 to 250 mgKOH/g. By keeping the acid value within the above ranges, it becomes possible to maintain the dispersion stability of the pigment and to have stable jetting from inkjet heads. In addition, excellent discharge stability can be maintained over a long period of time. Furthermore, this is preferable in terms of ensuring the solubility of the pigment dispersing resin relative to water and obtaining printed matters having excellent image quality when used together with the pretreatment liquid (P).

In contrast, when a water-insoluble resin is used as the pigment dispersing resin, the acid value is preferably 0 to 100 mgKOH/g, more preferably 5 to 90 mgKOH/g, and even more preferably 10 to 80 mgKOH/g. When the acid value is within these ranges, printed matters excellent in dryness and rubbing resistance can be obtained.

In addition, it is preferable to introduce an aromatic ring structure into the pigment dispersing resin from the viewpoint of improving adsorption ability relative to the pigment and ensuring dispersion stability. Note that examples of the aromatic ring structure include a phenyl group, naphthyl group, anthryl group, tolyl group, xylyl group, mesityl group, and anisyl group, but the structure is not limited thereto. Thereamong, a phenyl group, naphthyl group, and tolyl group are preferable because they can sufficiently ensure dispersion stability.

The amount of the polymerizable monomer having an aromatic ring structure is preferably 20% to 80% by mass, more preferably 25% to 60% by mass, relative to the total amount of the polymerizable monomer making up the pigment dispersing resin. By keeping the amount of the polymerizable monomer having an aromatic ring structure within the above ranges, the effect of improving adhesion and image quality using a π-cation interaction and the effect of ensuring and improving the storage stability of the aqueous white ink are preferable.

Note that when a water-soluble resin is used as the pigment dispersing resin, it is preferable that acid radicals in the resin be neutralized with a base in order to improve the solubility in the aqueous white ink. Whether or not the amount of the base added is excessive can be confirmed by, for example, producing a 10% by mass aqueous solution of a pigment dispersing resin and measuring the pH of the aqueous solution. From the viewpoint of improving the dispersion stability of the aqueous white ink, the pH of the aqueous solution is preferably 7 to 11 and more preferably 7.5 to 10.5.

Examples of the above base for neutralizing the pigment dispersing resin include an organic amine solvent such as monoethanolamine, diethanolamine, triethanolamine, N-methyldiethanolamine, dimethylaminoethanol, diethylaminoethanol, and aminomethylpropanol; an alkali metal hydroxide such as ammonia water, lithium hydroxide, sodium hydroxide, and potassium hydroxide; and an alkali metal carbonate such as lithium carbonate, sodium carbonate, sodium bicarbonate, and potassium carbonate. However, in order to increase the water resistance of a coating film after drying, the base is preferably a compound that does not easily remain in the coating film, and further, in order to suppress nozzle blockages due to insolubilization of the dispersing resin caused by drying of water, a compound having a boiling point greater than or equal to the boiling point of water is preferable. From this viewpoint, monoethanolamine, N-methyldiethanolamine, dimethylaminoethanol, diethylaminoethanol, and aminomethylpropanol are preferable.

When a water-soluble resin is used as the pigment dispersing resin, the weight average molecular weight is preferably 1,000 to 500,000, more preferably in a range of 5,000 to 40,000, even more preferably in a range of 10,000 to 35,000, and particularly preferably in a range of 15,000 to 30,000. With the weight average molecular weight in these ranges, the pigment is stably dispersed in water, and it is easy to adjust the viscosity and the like when used in an aqueous ink. In particular, when the weight average molecular weight is 1,000 or more, the pigment dispersing resin is unlikely to dissolve in the organic solvent added in the aqueous white ink, and thus the adsorption of the pigment dispersing resin to the pigment is strengthened, and the dispersion stability is improved. When the weight average molecular weight is 50,000 or less, the viscosity at the time of dispersion is kept low, and the dispersion stability of the aqueous ink and the discharge stability from inkjet heads are improved, thereby enabling stable printing over a long period.

The blending amount of the pigment dispersing resin is preferably 3% to 80% by mass relative to the blending amount of the pigment. By making the blending amount of the pigment dispersing resin within the above range, the viscosity of the pigment dispersion is suppressed, and the dispersion stability and discharge stability of the aqueous white ink are improved. The blending amount of the pigment dispersing resin relative to the pigment is more preferably 5% to 60% by mass and particularly preferably 10% to 45% by mass.

<Binder Resin>

The aqueous white ink (W) preferably contains a binder resin. The binder resin may be either a water-soluble resin or resin particles, and a combination of two or more types may be used depending on properties required for the aqueous white ink or printed matters. For example, with resin particles, the viscosity of the aqueous white ink can be reduced and a larger amount of resin can be blended, and thus resin particles are preferable for enhancing the adhesion, rubbing resistance, water resistance, and the like of printed matters. The aqueous white ink using a water-soluble resin as a binder resin has excellent discharge stability, and excellent image quality of printed matters when combined with the pretreatment liquid (P).

Note that when the aqueous white ink contains a water-soluble resin as a pigment dispersing resin and a water-soluble resin is used as a binder resin, the method for discriminating between the pigment dispersing resin and the binder resin is, for example, a method described below which applies the method in JIS K 5101-1-4 mutatis mutandis.

An amount of 50 parts of titanium oxide (for example, "TIPAQUE CR-50" manufactured by ISHIHARA SANGYO KAISHA, LTD.) having a primary particle size of 250 nm and an oil absorption nitrogen adsorption specific surface area of 15 to 20 g/100 g, the surface of which being treated only with alumina, an amount of 5 parts of a water-soluble resin to be discriminated, and an amount of 45 parts of water are subjected to thorough mixing (premixing), and then dispersion is performed for 2 hours using a bead mill (for example, "DYNO-MILL" manufactured by SHIN-MARU ENTERPRISES CORPORATION) having a volume of 0.6 L filled with 1,800 parts of beads for grinding (for example, zirconia beads of 0.5 mm in diameter). Immediately after the dispersion, the viscosity of the obtained titanium oxide-dispersed solution at 25° C. is measured using an E-type viscometer (for example, a TVE25L type viscometer manufactured by Toki Sangyo Co., Ltd.), the titanium oxide-dispersed solution is then stored in a constant temperature machine at 60° C. for 1 week, and the viscosity is measured again. At this time, when the viscosity of the dispersed solution immediately after the dispersion is 100 mPa·s or less and the absolute value of the viscosity change rate of the titanium oxide-dispersed solution before and after the storage is 10% or less, the above water-soluble resin is determined to be a pigment dispersing resin.

The type of resin that can be used as a binder resin is the same as the type of resin that can be used as the resin (PP) contained in the pretreatment liquid. In particular, it is preferable to use a resin selected from the group consisting of a urethane (urea) resin, urethane-(meth)acrylic resin, and (meth)acrylic resin from the viewpoint of improving the storage stability of the aqueous white ink and the adhesion and rubbing resistance of printed matters when combined with the pretreatment liquid (P).

When a water-soluble resin is used as the binder resin, from the viewpoint of achieving both the discharge stability of the aqueous white ink and the adhesion and rubbing resistance of printed matters, the weight average molecular weight thereof is preferably in a range of 5,000 to 80,000, more preferably in a range of 8,000 to 60,000, and particularly preferably in a range of 10,000 to 50,000.

When resin particles are used as the binder resin, the 50% diameter thereof is preferably 20 to 300 nm. Furthermore, from the viewpoint that printed matters are excellent in adhesion and rubbing resistance and, in particular, are excellent in productivity, density, and concealability by preventing rapid film formation of resin particles, 30 to 250 nm is more preferable and 50 to 200 nm is particularly preferable.

In addition, for the same reason as in the case of the above weight average molecular weight, the acid value of the binder resin, regardless of whether it is a water-soluble resin or resin particles, is preferably 2 to 70 mgKOH/g, more preferably 5 to 50 mgKOH/g, and particularly preferably 10 to 40 mgKOH/g.

The amount (solid fraction amount) of the binder resin contained in the total amount of the aqueous white ink (W) is preferably 1% to 20% by mass, more preferably 2% to 15% by mass, and particularly preferably 3% to 10% by mass, of the total amount of the aqueous ink.

<Water>

The amount of water contained in the aqueous white ink (W) is, relative to the total amount of the aqueous white ink, preferably 45% to 80% by mass, more preferably 50% to 75% by mass, and even more preferably 55% to 70% by mass.

<Other Materials>

Besides the above-described materials, materials such as a pH adjuster, a viscosity adjuster, wax, a preservative, and the like may be added as necessary to the aqueous white ink (W). Note that specific examples and the preferable blending amount of the pH adjuster that can be used for the aqueous white ink (W) are the same as those for the pretreatment liquid described above.

<Properties of Aqueous White Ink>

For the aqueous white ink (W), the viscosity at 25° C. is preferably adjusted to 3 to 20 mPa·s. In this viscosity range, not only a head having a frequency of 4 to 10 KHz but also a head having a high frequency of 10 to 70 KHz exhibit stable discharge properties. In particular, by setting the viscosity at 25° C. to 4 to 10 mPa·s, stable discharge can be achieved even when used for an inkjet head having a design resolution of 600 dpi or more. Note that the above viscosity can be measured using an E-type viscometer (for example, a TVE25L type viscometer manufactured by Toki Sangyo Co., Ltd.) using 1 mL of the aqueous white ink.

In addition, in terms of obtaining an aqueous white ink that can be jetted stably and printed matters having excellent image quality, the static surface tension at 25° C. of the aqueous white ink (W) is 20 to 40 mN/m, preferably 20 to 35 mN/m, and particularly preferably 20 to 32 mN/m.

Meanwhile, as described above, the static surface tension of the aqueous white ink (W) is larger than that of the pretreatment liquid used in combination. At this time, the difference in the static surface tension between the above pretreatment liquid and the above aqueous white ink is preferably 0.5 to 15 mN/m, more preferably 1 to 10 mN/m, and particularly preferably 1.5 to 8 mN/m. When the aqueous white ink is printed on a pretreatment liquid layer in a dry state, it is preferable that the aqueous white ink that has landed on the pretreatment liquid layer be properly wet-spread, and when the aqueous white ink is printed on a pretreatment liquid layer in a wet state, it is preferable that the aqueous white ink be sufficiently penetrated into the pretreatment liquid layer. In order to realize these, having the above static surface tension difference is therefore preferable.

<Method for Producing Aqueous White Ink>

The aqueous white ink (W) containing the above-described components is produced, for example, through the following process. However, the method for producing the aqueous white ink is not limited to the following.

(1. Production of Pigment Dispersion)

When a pigment is used as a colorant and a water-soluble resin is used as a pigment dispersing resin, the water-soluble resin, water, and, as necessary, a water-soluble organic solvent are mixed and stirred to produce a pigment dispersing resin mixture. The pigment is added to the pigment dispersing resin mixture, subjected to mixing and stirring (pre-mixing), and then subjected to dispersion treatment using a dispersion device. Then, centrifugation, filtration, adjustment of the solid fraction concentration, and the like are performed as necessary, and a pigment dispersion is obtained.

When a dispersion of a pigment coated with a water-insoluble resin is produced, a water-insoluble resin solution is produced by dissolving a water-insoluble resin in an organic solvent such as methyl ethyl ketone in advance and, as necessary, neutralizing the water-insoluble resin. The pigment and water are added to the water-insoluble resin solution, and the mixture is subjected to mixing and stirring (pre-mixing) and then subjected to dispersion treatment using a disperser. Then, the above organic solvent is distilled off through vacuum distillation, and centrifugation, filtration, and adjustment of the solid fraction concentration are performed as necessary, thereby obtaining the pigment dispersion.

For the dispersion device used during the dispersion treatment of the pigment, a generally used dispersion device can be optionally used, and examples thereof include a ball mill, roll mill, sand mill, bead mill, and nanomizer. Among the above, a bead mill is preferably used and specifically is commercially available under product names such as a Super Mill, Sand Grinder, Agitator Mill, Glen Mill, Dyno Mill, Pearl Mill, and Cobol Mill. As the material of the grinding media, glass, zircon, zirconia, titania, and the like can be used.

(2. Preparation of Aqueous White Ink)

Next, an organic solvent, water, and as necessary, a surfactant, a binder resin, a pH adjuster, and other materials are added to the above pigment dispersion, and the mixture is stirred and mixed. Note that stirring and mixing may be performed while this mixture is heated in a range of 40 to 100° C. as necessary.

(3. Removal of Coarse Particles)

Coarse particles contained in the above mixture are removed through a method such as filtration separation or centrifugation to obtain the aqueous white ink. A known method may be used appropriately as the filtration separation method. The filter opening diameter is not particularly limited as long as it can remove coarse particles, dust, and the like, and is preferably 0.3 to 5 µm and more preferably 0.5 to 3 µm. When filtration is performed, a single type of a filter may be used, or multiple types of filters may be used together.

<Aqueous Coloring Ink>

The recording liquid set, which is an embodiment of the present invention, includes the above-described pretreatment liquid (P) and aqueous white ink (W), and may further include an aqueous inkjet ink (also referred to as "aqueous coloring ink" in the present disclosure) exhibiting a color other than a white color. The aqueous coloring ink contains, for example, a colorant having a color other than a white color, an organic solvent, and water. Also, it is preferable to further include a binder resin, a surfactant, and the like. Among these constituent materials, regarding materials other that the colorant having a color other than a white color, the same materials can be used as in the case of the above-described aqueous white ink.

Meanwhile, examples of a cyan organic pigment that can be used as the colorant having a color other than a white color include C. I. Pigment Blue 1, 2, 3, 15:3, 15:4, 15:6, 16, 22, 60, 64, and 66. Thereamong, in terms of its excellent color development and light resistance, one or more selected from the group consisting of C. I. Pigment Blue 15:3 and 15:4 can be preferably used.

Examples of a magenta organic pigment that can be used as the colorant having a color other than the above white color include C. I. Pigment Red 5, 7, 12, 22, 23, 31, 48, 49, 52, 53, 57(Ca), 57:1, 112, 122, 146, 147, 150, 185, 202, 209, 238, 242, 254, 255, 266, 269, and 282, and C.I. Pigment Violet 19, 23, 29, 30, 37, 40, 43, and 50. Thereamong, in terms of excellent color development and light resistance, one or more selected from the group consisting of C. I. Pigment Red 122, 150, 166, 185, 202, 209, 266, 269, and 282, and C. I. Pigment Violet 19 can be preferably used. From the viewpoint of further enhancing color development and obtaining printed matters having excellent image quality, it is also preferable to use a solid solution pigment containing a quinacridone pigment and/or naphthol pigment as a magenta organic pigment.

Examples of a yellow organic pigment that can be used as the colorant having a color other than the above white color include C. I. Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, and 213. Thereamong, in terms of excellent color development, one or more selected from the group consisting of C. I. Pigment Yellow 12, 13, 14, 74, 120, 180, 185, and 213 can be preferably used.

Examples of a black organic pigment that can be used as the colorant having a color other than the above white color include aniline black, Lumogen Black, and azomethine azo black. Note that it is also possible to mix multiple chromatic pigments such as the above cyan pigment, magenta pigment, yellow pigment, and the following orange pigment, green pigment, brown pigment, and the like and to use as a black pigment.

A special organic pigment such as an orange pigment, green pigment, brown pigment, and the like can also be used as the colorant having a color other than the above white color. Specific examples preferably used include C. I. Pigment Orange 16, 36, 43, 51, 55, 59, 61, 64, and 71, C. I. Pigment Green 7, 36, 43, and 58, and Pigment Brown 23, 25, and 26.

Meanwhile, an inorganic pigment can be used as the colorant having a color other than the above white color, and carbon black and/or iron oxide can be used as a black pigment, for example.

From the viewpoint of obtaining printed matters having a high density and excellent image quality, the aqueous coloring ink preferably contains a certain amount or more of a colorant described above. Specifically, the amount of the colorant having a color other than a white color relative to the total amount of the aqueous coloring ink is preferably 3.5% to 10% by mass, and particularly preferably 3.5% to 8% by mass.

[Method for Producing a Printed Matter]

Next, regarding the method for producing a printed matter using the above-described pretreatment liquid and aqueous white ink (preferably further an aqueous coloring ink), the processes and the like will be described in detail.

The method for producing printed matters according to the embodiment of the present invention preferably includes, in this order, step (1) of applying a pretreatment liquid on a substrate, and step (2) of printing an aqueous white ink using an inkjet method on the surface of the substrate obtained in step (1) on which the pretreatment liquid has been applied. As described above, in step (2), the aqueous white ink may be printed on a layer of the pretreatment liquid in a dry state or on a layer of the pretreatment liquid in a wet state. In particular, from the viewpoint of obtaining a printed matter particularly excellent in all of image quality, adhesion, and rubbing resistance, it is preferable that the aqueous white ink be printed on a layer of the pretreatment liquid in a wet state (that is, the aqueous white ink is for a wet-on-wet printing method). The method for producing a printed matter may include an optional step prior to step (1), between steps (1) and (2), and/or after step (2). For example, the method for producing a printed matter can include a drying step, a step of printing an aqueous coloring ink, and the like between the steps (1) and (2).

Note that in the present disclosure, "a pretreatment liquid is in a wet state" means that, in the state immediately before droplets of the aqueous white ink land, the total remaining amount of a volatile component contained in the pretreatment liquid on the substrate is 50% by mass or more relative to the total amount of the volatile component contained in the pretreatment liquid immediately after being applied to the substrate. Here, the pretreatment liquid in "a state immediately before droplets of the aqueous white ink land" may be a pretreatment liquid in a state where the step prior to step (2) has been already performed and in "a state between the 'point in time 5 seconds before the landing of aqueous white ink droplets' and the 'point in time of the landing of the aqueous white ink droplets'". The pretreatment liquid "immediately after being applied to the substrate" may be a pretreatment liquid in "a state where step (1) has been already performed and no step after step (1) has been performed yet".

In addition, "an aqueous white ink is for the wet-on-wet printing method" means that while a composition (in the case of the above-described preferred method for producing a printed matter, the pretreatment liquid) that has been applied on a substrate before the aqueous white ink is in a wet state, the aqueous white ink is printed on a layer of the composition. Note that from the viewpoint of obtaining a printed matter excellent in all of image quality, adhesion, and rubbing resistance, in step (2), the total remaining amount of the volatile component contained in the pretreatment liquid on the substrate immediately before droplets of the aqueous white ink land is more preferably 70% by mass or more, and particularly preferably 90% by mass or more, relative to the total amount of the volatile component contained in the pretreatment liquid immediately after being applied to the substrate.

Here, the total remaining amount of the volatile component contained in the pretreatment liquid on the substrate in the state immediately before droplets of the aqueous white ink land can be calculated, for example, using the following method.

(i) First, using a substrate for which the mass per unit area (w0 [g/m$^2$]) has been measured in advance, step (1) (and, in the case of performing a drying step or the like after step (1) and before step (2) in the actual producing method, that step or the like) is performed without performing step (2) and a subsequent step, and a printed matter is obtained in which only a layer of the pretreatment liquid is formed on the above substrate. Note that a substrate used in the actual producing method is used as the above substrate. The above pretreatment liquid is applied under the same conditions as in the actual producing method. The amount to be applied is set to the maximum amount to be applied to the substrate in the actual producing method. For example, in the case of printing the pretreatment liquid on a substrate using the inkjet method, when the maximum amount in the actual producing method is a coverage rate of 100%, the printing of the pretreatment liquid is performed at the coverage rate of 100%. Meanwhile, when the pretreatment liquid is coated on a substrate using, for example, roller coating, the above pretreatment liquid is coated to attain the maximum thickness of the pretreatment liquid layer in the actual producing method. After producing a printed matter on which only the pretreatment liquid layer is formed, the mass of the printed matter is measured and converted to a mass per unit area (w1 [g/m$^2$]). As the mass of the printed matter, for example, a value is adopted which is measured 30 to 60 seconds after the production of a printed matter in "the state between 'the point in time 5 seconds before the point of the landing of droplets of the aqueous white ink' and 'the point in time of the landing of droplets of the aqueous white ink'".

Alternatively, in the case where a printed matter immediately before the execution of step (2) in the actual producing method can be retrieved from a printer, the printed matter may be retrieved in the actual producing method and w1 may be determined from the printed matter.

(ii) Meanwhile, using the same kind of substrate as the substrate used for the measurement of the above w1 and the same application conditions, only step (1) is performed (in the case of performing a drying step or the like after step (1) and before step (2) in the actual producing method, the drying step or the like is not performed) to obtain a printed matter in which only a layer of the pretreatment liquid is formed on the substrate. The mass of the printed matter is measured and converted to a mass per unit area (w2 [g/m$^2$]). As the mass of the printed matter, for example, a value is adopted which is measured 30 to 60 seconds after the pretreatment liquid is applied to the substrate.

Alternatively, in the case where a printed matter immediately after the execution of step (1) in the actual producing method can be retrieved from a printer, the printed matter may be retrieved in the actual producing method and w2 may be determined from the printed matter.

Alternatively, w2 can be also determined from the density d [g/mL] of the pretreatment liquid, the volume per unit area [mL/m$^2$] of the pretreatment liquid, and the above-described w0 [g/m$^2$] using the formula w2=w0 [g/m$^2$]+d [g/mL]× (volume per unit area of the pretreatment liquid) [mL/m$^2$]. In the case of printing the pretreatment liquid on a substrate using an inkjet method, the volume per unit area [mL/m$^2$] of the pretreatment liquid may be calculated from, for example, the resolution [dpi] and the drop volume [pL] in the actual producing method. The density d of the pretreatment liquid may be measured using, for example, a relative-gravity bottle (pycnometer).

(iii) Then, a value obtained using the formula 100×(w10−w20×Nvp)/[w20×(1−Nvp)] is set as the total remaining amount (%) of the volatile component contained in the pretreatment liquid on the substrate in a state just before the aqueous white ink droplets land. However, in the above formula, w10=w1−w0, w20=w2−w0, and Nvp is the solid fraction ratio of the pretreatment liquid (solid fraction mass (g)/pretreatment liquid mass (g)).

Note that in the measurement of the total remaining amount of the volatile component described above, mass measurement is performed using a precision balance. The mass per unit area can be calculated by measuring the mass of a test piece cut to a certain size and dividing the mass by the area of the test piece.

<Step (1): Application of Pretreatment Liquid>

In step (1), the method for applying the pretreatment liquid (P) onto the substrate may be an application method in which a pretreatment liquid applying member does not come into contact with a substrate, or an application method in which a pretreatment liquid applying member is brought into contact with a substrate. The former method includes, for example, printing using an inkjet method. The latter method includes, for example, coating with a roller. In particular, in terms of controlling the amount of the pretreatment liquid applied and easily adjusting image quality according to the coverage rate of the aqueous white ink printed in step (2), and of making a pretreatment liquid applying device compact, a printing method in which a pretreatment liquid application member (inkjet nozzle) does not come into contact with a substrate, such as an inkjet method, is preferably used. Note that specific examples of the inkjet method will be described below.

When the aqueous white ink is printed on a pretreatment liquid layer in a wet state in step (2), from the viewpoint of preferably exhibiting the effect according to the embodiment of the present invention by sufficiently forming a layer of the aqueous white ink in the layer in the pretreatment liquid, it is preferable to apply the pretreatment liquid in such a manner that the thickness of the pretreatment liquid layer formed on a part where the aqueous white ink is to be printed is 2 to 8 μm, and it is particularly preferable to apply in such a manner that the thickness is 3 to 7 μm. The above thickness is the thickness immediately after the pretreatment liquid is applied to a substrate and a layer of the pretreatment liquid is formed.

Meanwhile, when a coating method in which the pretreatment liquid is brought into contact is selected as the method for applying the pretreatment liquid, a gravure coater, doctor coater, bar coater, blade coater, flexo coater, roll coater, and the like can be used. Thereamong, a gravure coater or flexo coater is preferable because application to a non-permeable substrate such as a plastic film can be easily performed, the amount of coating can be easily adjusted, and balancing between adhesion and image quality is easy.

<Drying Step after Applying Pretreatment Liquid>

As described above, in step (2), it is preferable to print the aqueous white ink on a pretreatment liquid layer in a wet state. Thus, in the method for producing a printed matter using the recording liquid set according to the embodiment of the present invention, it is preferable not to perform a step of drying the pretreatment liquid on the substrate after step (1) and before step (2).

Note that when the drying step is introduced after step (1) and before step (2), from the viewpoint of preventing excessive drying of the pretreatment liquid, a normal temperature air drying method, a visible light drying method, and the like can be preferably used, for example. In addition, an aqueous ink drying method described below may be used after adjusting the energy to be applied to printed matters. Furthermore, these drying methods may be used alone, or multiple methods may be used together.

<Step (2): Aqueous White Ink Printing>

In step (2), the aqueous white ink is printed on the substrate. Note that as described above, the aqueous white ink is preferably printed on a layer of the pretreatment liquid in a wet state (that is, the aqueous white ink is for the wet-on-wet printing method). In addition, in order to exhibit the effect described above, it is preferable that the aqueous white ink be printed in such a manner that at least part of the aqueous white ink overlaps the part on which the pretreatment liquid has been applied, and even more preferable that the aqueous white ink be printed in such a manner that the entirety of the aqueous white ink overlaps the part on which the pretreatment liquid has been applied.

Note that in one embodiment, from the viewpoint of enhancing the concealability of the aqueous white ink layer, the same aqueous white ink may be filled in multiple inkjet heads and printed on a substrate multiple times. In this case, an aqueous white ink to be printed later may be printed so as to overlap an aqueous white ink printed earlier.

Meanwhile, in another embodiment, multiple types of aqueous white inks may be prepared, filled in separate inkjet heads, and printed on a substrate. In this case, an aqueous white ink to be printed later is preferably printed on a part where a previously printed aqueous white ink has not been printed (that is, on the pretreatment liquid layer). In the case of using multiple types of aqueous white inks, each of them contains a white-colored colorant and an organic solvent (WS) (however, the type and amount of the organic solvent (WS) contained in the aqueous white ink may differ from each other), the static surface tension of which is 20 to 40 mN/m and is larger than the static surface tension of the pretreatment liquid used in combination, and the amount of the above white-colored colorant is 15 to 100 times the amount of the cationic component in the above pretreatment liquid. However, in some embodiments, the recording liquid set may include an aqueous white ink that does not satisfy the foregoing, or in some other embodiments, the recording liquid set does not include an aqueous white ink that does not satisfy the foregoing.

<Drying Step after Printing Aqueous White Ink>

After step (2), it is preferable to perform a step of drying the aqueous white ink on the substrate. At this time, there are no particular limitations on the method for drying the aqueous white ink, and conventionally known methods can be used such as a heat drying method, hot air drying method, infrared drying method, microwave drying method, drum drying method, and high frequency dielectric heating method. These drying methods may be used alone, or multiple methods thereof may be used together, but the hot air drying method and/or infrared drying method is preferably used to reduce damage to a non-permeable substrate and to dry efficiently.

Note that when the same aqueous white ink is filled in multiple inkjet heads and printed on a substrate multiple times, or when aqueous white inks different from each other are filled in multiple inkjet heads and printed on a substrate multiple times, the above-described drying step may be provided between the above multiple inkjet heads, or the aqueous white ink may be printed successively from the above multiple inkjet heads without providing the drying step.

<Printing Step of Aqueous Coloring Ink>

As described above, the recording liquid set according to the embodiment of the present invention may include an aqueous coloring ink. In this case, the aqueous coloring ink is preferably printed using an inkjet method on the aqueous white ink that has been printed on a pretreatment liquid layer in a wet state. This is because, when the aqueous white ink has been printed on a pretreatment liquid in a wet state, a layer of the aqueous white ink is formed inside or at a lower part of the pretreatment liquid layer, that is, the pretreatment liquid layer becomes the topmost layer when the aqueous coloring ink is printed, and thus the pattern or the like formed by the aqueous coloring ink is also excellent in image quality. In addition, this is because the interaction due to the cationic component in the pretreatment liquid occurs through a component in the aqueous coloring ink and the adhesion and rubbing resistance of printed matters are also improved.

Meanwhile, when an aqueous coloring ink is used, the above-described drying step after the aqueous white ink printing (and before the aqueous coloring ink printing) may or may not be performed. When the above drying step is performed, the aqueous coloring ink may be printed on a layer of the aqueous white ink in a wet state or on a layer of the aqueous white ink in a dry state.

In one embodiment, after step (2), it is preferable to completely dry the aqueous white ink on the substrate and then print the aqueous coloring ink. In this case, the aggregation of a solid component in the aqueous coloring ink and/or the thickening of the aqueous coloring ink proceeds preferably, and it becomes possible to obtain printed matters excellent in image quality. The density and productivity of printed matters are also improved.

As another preferred embodiment, after step (2), the aqueous coloring ink can be also printed without completely drying the pretreatment liquid layer and the aqueous white ink on the substrate. In this case, since the pretreatment liquid layer on the substrate in a wet state comes into contact with the aqueous coloring ink, it becomes possible to instantaneously cause the aggregation of the solid component in the aqueous coloring ink and/or the thickening of the aqueous coloring ink, and even when the productivity (printing speed) is increased, it is easy to obtain a printed matter particularly excellent in image quality. In addition, at least a part of the droplets of the aqueous coloring ink can penetrate into the pretreatment liquid layer in a wet state, and the adhesion of printed matters is improved.

Specifically, in the state immediately before droplets of the aqueous coloring ink land, the total remaining amount of the component contained in the pretreatment liquid and the aqueous white ink on the substrate is preferably 25% by mass or more, more preferably 35% by mass or more, and particularly preferably 50% by mass or more, relative to the total amount of the component contained in the pretreatment liquid and aqueous white ink immediately after having been applied to the substrate. Here, the pretreatment liquid and aqueous white ink "in the state immediately before droplets of the aqueous coloring ink land" may be a pretreatment liquid and aqueous white ink "in a state where the step prior to the printing step of the aqueous coloring ink has been performed" and "the state between 'the point in time 5 seconds before the point of the landing of droplets of the aqueous coloring ink' and 'the point in time of the landing of droplets of the aqueous coloring ink'". The pretreatment liquid and aqueous white ink "in a state immediately after being applied to the substrate" may be a pretreatment liquid "in a state where steps (1) and (2) are performed successively and no step after step (2) is performed".

Note that the method for calculating the total remaining amount of the component contained in the pretreatment liquid and aqueous white ink on the substrate may be calculated using the following method, for example.

(i) First, using a substrate for which the mass per unit area (w0 [g/m$^2$]) has been measured in advance, step (1) (in the case of performing a drying step or the like after step (1) and before step (2) in the actual producing method, that step or the like), and step (2) (and, in the case of performing the drying step or the like prior to the printing step of the aqueous coloring ink in the actual producing method, that step or the like) are performed to obtain a printed matter to which the pretreatment liquid and the aqueous white ink have been applied on the substrate in the state immediately before droplets of the aqueous coloring ink land. Note that a substrate used in the actual producing method is used as the above substrate. The above pretreatment liquid and the above aqueous white ink are applied under the same conditions as in the actual producing method. The amount to be applied is set to the maximum amount to be applied to the substrate in the actual producing method. For example, in the case of printing the pretreatment liquid on a substrate using the inkjet method and in the case of the aqueous white ink, when the maximum amount in the actual producing method is each a coverage rate of 100%, printing is performed each at the coverage rate of 100%. Meanwhile, when the pretreatment liquid is coated on a substrate using roller coating, the above pretreatment liquid is coated to attain the maximum thickness of the pretreatment liquid layer in the actual producing method. Then, the mass of the obtained printed matter is measured and converted to a mass per unit area (w1a [g/m$^2$]). As the mass of the printed matter, for example, a value is adopted which is measured 30 to 60 seconds after producing the printed matter of "a state between 'the point in time 5 seconds before the point of the landing of droplets of the aqueous coloring ink' and 'the point in time of the landing of droplets of the aqueous coloring ink'".

Alternatively, in the case where a printed matter immediately before printing of the aqueous coloring ink in the actual producing method can be retrieved from a printer, the printed matter may be retrieved in the actual producing method and w1a may be determined from the printed matter.

(ii) Meanwhile, using the same kind of substrate as the substrate used for the measurement of the above w1a and the same application conditions, only steps (1) and (2) are performed (in the case of performing a drying step after step (1) and before step (2), and/or after step (2) in the actual producing method, without performing that drying step) to obtain a printed matter in which the pretreatment liquid and the aqueous white ink are applied on the substrate and no drying step is performed. The mass of the printed matter is measured and converted to a mass per unit area (w2a [g/m$^2$]). As the mass of the printed matter, for example, a value is adopted which is measured 30 to 60 seconds after the pretreatment liquid and the aqueous white ink are applied to the substrate.

Alternatively, in the case where a printed matter immediately after the execution of step (2) in the actual producing method (however, a printed matter which has not been dried after step (1) and before step (2)) can be retrieved from a printer, the printed matter may be retrieved in the actual producing method and w2a may be determined from the printed matter.

Alternatively, w2a can be also determined from the density [g/mL] and the volume per unit area [mL/m$^2$] of each of the pretreatment liquid and the aqueous white ink, and the above w0 [g/m$^2$]. In the case of printing the pretreatment liquid on a substrate using an inkjet method and in the case of the aqueous white ink, each volume per unit area [mL/m$^2$] may be calculated from, for example, the resolution [dpi] and the drop volume [pL] in the actual producing method.

(iii) Then, a value obtained using the formula $100\times(w1a-w0)/(w2a-w0)$ is set as the total remaining amount (%) of the component contained in the pretreatment liquid and aqueous white ink on the substrate.

The aqueous coloring ink may include multiple aqueous inkjet inks. For example, the aqueous coloring ink may include a cyan ink, magenta ink, yellow ink, and black ink.

<Drying Step after Printing Aqueous Coloring Ink>

When the aqueous coloring ink is printed after the aqueous white ink, it is preferable to perform a step of drying a substrate to which the pretreatment liquid, the aqueous white ink, and the aqueous coloring ink are applied. Drying methods to be employed in this step and a preferred method thereof are the same as those in the above-described drying step after printing the aqueous white ink.

<Method for Printing Aqueous White Ink and the Like>

As described above, for the pretreatment liquid (P), a method for printing the pretreatment liquid to the substrate in a non-contact manner, such as an inkjet method, is preferably selected. The aqueous white ink (W) is printed on the substrate using the inkjet method.

As the inkjet method used for these printing, a single-pass method may be adopted in which the pretreatment liquid or the aqueous ink is jetted to a substrate only once, or a serial-type method may be adopted in which the pretreatment liquid or the aqueous ink is jetted while a short shuttle head is reciprocally scanned in a direction orthogonal to the transport direction of a substrate. Specific examples of the single-pass method include a method in which an inkjet head is scanned only once relative to a stopped substrate (also referred to as a "head-scanning single-pass method" in the present disclosure), and a method in which a substrate is made to pass only once under a fixed inkjet head for printing (also referred to as a "head-fixing single-pass method" in the present disclosure). In the case of the pretreatment liquid (P) and the aqueous ink, either of the above-described methods may be adopted, but the head-fixing single-pass method is preferably used from the viewpoint that the adjustment of the discharge timing of the pretreatment liquid and the aqueous ink in relation to the scanning of the inkjet head is unnecessary, and since the landing position is not likely to shift, a printed matter having excellent image quality can be obtained.

Note that the design resolution of the inkjet head used in the head-fixed single-pass method is preferably 600 dpi (dots per inch) or more, and more preferably 720 dpi or more, from the viewpoint of obtaining an image having excellent image quality.

<Printing Form and Printing Speed>

As described above, the recording liquid set according to the embodiment of the present invention can produce printed matters excellent in adhesion, rubbing resistance, image quality, density, and the like, with high productivity. From the viewpoint that this high productivity can be utilized, in the method for producing a printed matter according to the embodiment of the present invention, it is preferable that all of steps (1) and (2) described above, and if performed, the drying step after the application of the pretreatment liquid, the drying step after the printing of the aqueous white ink, the printing step of the aqueous coloring ink, and the drying step after the printing of the aqueous coloring ink be performed in an in-line form. Note that "performed in an in-line form" means that all of the devices for performing the steps described above are incorporated in a single system and that the respective steps can be performed consistently.

In addition, the implementation speed in each step (the application speed of the pretreatment liquid in step (1), the printing speed in step (2) and in the printing step of the aqueous coloring ink, and the transfer speed of a substrate in each of the above drying steps) included in the method for producing a printed matter, which is the embodiment of the present invention, is preferably 50 m/min or more and is particularly preferably 75 m/min or more. When the method is performed in the in-line form, the time required from the time of application of the pretreatment liquid in step (1) to the time of the landing of droplets of the aqueous white ink in step (2) is, for example, less than 5 seconds. When the method is performed in the in-line form, the time required from the time of the landing of droplets of the aqueous white ink in step (2) to the time of the landing of droplets of the aqueous coloring ink in the printing step of the aqueous coloring ink is, for example, less than 5 seconds.

<Substrate>

Although a printed matter produced according to the embodiment of the present invention can be obtained by preferably printing on a previously known substrate, it is preferable to use a non-permeable substrate as the substrate since a printed matter having excellent adhesion and rubbing resistance can be obtained. In the present disclosure, "non-permeable substrate" refers to a substrate into which water is not permeated or absorbed. Note that a substrate in which a vacant space exists inside but water does not penetrate into the vacant space (for example, when the substrate surface is coated or the like) corresponds to a non-permeable substrate in the present disclosure.

Specific examples of a non-permeable substrate include: a thermoplastic resin substrate such as a polyvinyl chloride sheet, polyethylene terephthalate (PET) film, polypropylene film, polyethylene film, nylon film, and polystyrene film; a metal substrate such as an aluminum foil; and a glass substrate. These substrates may have smooth or uneven surfaces, may be transparent, translucent, or opaque, but are preferably transparent or translucent because printing with the aqueous white ink improves the visibility of printed matters. In addition, two or more of the above listed substrates may be bonded together. A peeling adhesive layer or the like may be provided on the surface opposite to the printing surface of the pretreatment liquid and aqueous ink. Note that an adhesive layer or the like may be provided on the printing surface after the production of printed matters. In addition, the shape of the substrate used in the printing according to the embodiment of the present invention may be a roll or a leaf. Furthermore, from the viewpoints of applying the pretreatment liquid (P) evenly and uniformly and of especially improving the adhesion of printed matters, it is also preferable to apply a surface modification method such as corona treatment or plasma treatment to the non-permeable substrate exemplified as above before applying the pretreatment liquid.

EXAMPLES OF EMBODIMENTS

The invention includes the following embodiments. The invention is not limited to the following embodiments.

[1] A recording liquid set including a pretreatment liquid and an aqueous white inkjet ink (aqueous white ink), wherein:
the pretreatment liquid contains a cationic component, a resin (excluding water-soluble cationic polymers) (PP), and water,
the cationic component is a polyvalent metal ion and/or a water-soluble cationic polymer,
the aqueous white inkjet ink contains a white-colored colorant, an organic solvent (WS), and water,
the aqueous white inkjet ink has a static surface tension of 20 to 40 mN/m at 25° C.,
the aqueous white inkjet ink has a static surface tension at 25° C. that is greater than a
static surface tension at 25° C. of the pretreatment liquid, and when an amount of the white-colored colorant in the aqueous white inkjet ink is MWC (% by mass) and an amount of the cationic component in the pretreatment liquid is MPC (% by mass), a value represented by MWC/MPC is 15 to 100.

[2] The recording liquid set according to [1], wherein the aqueous white inkjet ink is for a wet-on-wet printing method.

[3] The recording liquid set according to [1] or [2], wherein the cationic component contains a calcium ion.

[4] The recording liquid set according to any one of [1]-[3], wherein an amount of the white-colored colorant is 13% to 25% by mass of a total amount of the aqueous white inkjet ink.

[5] The recording liquid set according to any one of [1]-[4] wherein the pretreatment liquid further contains 1,2-propanediol, and the organic solvent contained in the pretreatment liquid has a boiling point (weighted average value) of 120 to 220° C.

[6] The recording liquid set according to any one of [1]-[5], wherein the organic solvent (WS) contains 1,2-propanediol, and the organic solvent (WS) has a boiling point (weighted average value) of 120 to 200° C.

[7] A method for producing a printed matter using the recording liquid set according to any one of [1]-[6], the method including, in this order:
step (1) of applying the pretreatment liquid on a substrate; and
step (2) of printing the aqueous white inkjet ink using an inkjet method on a surface of the substrate obtained in step (1) on which the pretreatment liquid is applied.

[8] The method for producing a printed matter according to [7], wherein the aqueous white inkjet ink is printed on the pretreatment liquid in a wet state.

[9] A printed matter that is produced using the method for producing a printed matter according to [7] or [8].

The disclosure of the present application relates to the subject matter described in Japanese Application No. 2022-063223 filed on Apr. 6, 2022, and the contents of which are incorporated by reference herein.

EXAMPLES

Next, the present invention will be described more concretely with examples and comparative examples. Note that in the following description, "parts" and "%" are based on mass unless otherwise specified.
<Production and Preparation of Resin>
(Production of (Meth)Acrylic Resin P1)
An amount of 124 parts of ion exchanged water and an amount of 1.2 parts of sodium polyoxyethylene lauryl ether sulfate ("LATEMUL E-150" manufactured by Kao Corporation) were put in a reaction container equipped with a gas inlet tube, a thermometer, a condenser, and a stirrer. Meanwhile, 20 parts of butyl acrylate, 30 parts of methyl methacrylate, 48 parts of butyl methacrylate, 2 parts of acrylic acid, 64 parts of ion exchanged water, and 0.8 parts of sodium polyoxyethylene lauryl ether sulfate ("LATEMUL E-150" manufactured by Kao Corporation) were put in another mixing container equipped with a stirrer and subjected to thorough stirring and mixing, and a emulsion was produced.

An amount of eight parts of the emulsion was separated and added into the above reaction container, and the inside was sufficiently replaced with nitrogen. Then, after raising the internal temperature of the reaction container to 80° C., 4 parts of 5% aqueous solution of potassium persulfate and 8 parts of 1% aqueous solution of anhydrous sodium bisulfite were added, and a polymerization reaction was started. After starting the polymerization reaction, while keeping the internal temperature at 80° C., the remainder of the above emulsion (156.8 parts), 1.2 parts of 5% aqueous solution of potassium persulfate, and 2.5 parts of 1% aqueous solution of anhydrous sodium bisulfite were added dropwise over a period of 1.5 hours. Stirring was continued after the dropwise addition, and the reaction was continued for 2 hours. Then, the internal temperature of the reaction container was cooled to 30° C., and diethylaminoethanol was further added to make the pH of the mixture be 8.5. Then, the solid fraction was adjusted to 30% using ion exchanged water to make a water-based solution of a (meth) acrylic resin P1 (solvent:water). Note that the (meth)acrylic resin P1 had an acid value of 16 mgKOH/g and a 50% diameter of 100 nm. In the present disclosure, "water-based solution" refers to a liquid containing a solvent including water and a component dispersed and/or dissolved in the solvent.
<Production of Methacrylic Resin P2>
A water-based solution of a methacrylic resin (solvent: water, solid fraction 30%) was produced using the same raw materials and method as for the binder resin 28 produced in the embodiment of JP 2020-180178A, and used as the water-based solution of a methacrylic resin P2.
<Production of Pretreatment Liquid>
Each raw material was put in a mixing container equipped with a stirrer to obtain the blending formulation described in each column of Table 1 below. Thereafter, mixing was continued for 1 hour at room temperature (25° C.), and the mixture was warmed to 50° C. and mixed for another 1 hour. Then, after the mixture was cooled to room temperature, filtration was performed with a nylon mesh having a pore size of 100 μm, and filtration was further performed with a membrane filter having a pore size of 1.2 μm to produce pretreatment liquids 1 to 21. Note that while the mixture was stirred in the mixing container, each raw material was put therein. At such time, the order in which the raw materials were added was ion exchanged water, a cationic component (or its salt), a resin (PP), and other raw materials. However, when a treatment liquid not containing any of these components is produced, the following components were added according to the order described above without adding said components. For a component containing two or more kinds of raw materials, the order in which these are added within the component is discretionary.

<Production of Pigment Dispersion>
(Production of White Pigment Dispersions 1 and 2)

An amount of 50 parts of titanium oxide ("TIPAQUE CR-60" manufactured by ISHIHARA SANGYO KAISHA, LTD.), 5 parts of a styrene-acrylic resin (a random polymer of styrene/acrylic acid/behenyl acrylate=45/30/25 (mass ratio), all acid groups being neutralized with dimethylaminoethanol, acid value 230 mgKOH/g, weight average molecular weight 20,000), and 45 parts of water were put in a mixing container equipped with a stirrer, and premixing was performed for 1 hour. Then, using a DYNO-MILL (capacity 0.6 L) manufactured by SHINMARU ENTERPRISES CORPORATION filled with 1,800 g of 0.5 mm diameter zirconia beads, a white pigment dispersion 1 was produced by performing circulation dispersion until the 50% diameter of the titanium oxide reached about 230 nm and the 90% diameter thereof reached about 350 nm.

A white pigment dispersion 2 was produced using the same method as the white pigment dispersion 1 described above, except that 50 parts of titanium oxide ("TIPAQUE CR-50" manufactured by ISHIHARA SANGYO KAISHA, LTD.), 12.5 parts of a water-based solution of a styrene-maleic acid resin ("BYK-190" manufactured by BYK Japan KK, solid fraction 40%, acid value 10 mgKOH/g), and 37.5 parts of water were used as raw materials and that circulation dispersion was performed until the 50% diameter reached about 240 nm and the 90% diameter reached about 350 nm.

(Production of Black Pigment Dispersion)

An amount of 15 parts of carbon black ("PrinteX85" manufactured by Orion Engineered Carbons S.A.), 3 parts of a styrene-acrylic resin (a random polymer of styrene/acrylic acid/behenyl acrylate=45/30/25 (mass ratio), all acid groups being neutralized with dimethylaminoethanol, acid value 230 mgKOH/g, weight average molecular weight 20,000), and 82 parts of water were put in a mixing container equipped with a stirrer, and premixing was performed for 1 hour. Then, using a DYNO-MILL (capacity 0.6 L) manufactured by SHINMARU ENTERPRISES CORPORATION filled with 1,800 g of 0.5 mm diameter zirconia beads, a black pigment dispersion was produced by performing circulation dispersion until the 50% diameter of the carbon black reached about 100 nm.

(Production of Cyan Pigment Dispersion, Magenta Pigment Dispersion, and Yellow Pigment Dispersion)

A cyan pigment dispersion, a magenta pigment dispersion, and a yellow pigment dispersion were produced using the same raw materials and methods as the black pigment dispersion, except that the following pigments were used as pigments and circulation dispersion was performed until the following 50% diameters were each achieved.

Cyan pigment dispersion: LIONOL BLUE 7358G (C.I. Pigment Blue 15:3) manufactured by TOYOCOLOR CO., LTD., 50% diameter=150 nm Magenta pigment dispersion: Toshiki Red 150TR (C.I. Pigment Red 150) manufactured by TOKYO SHIKIZAI INDUSTRY CO., LTD., 50% diameter=200 nm Yellow pigment dispersion: LIONOL YELLOW TT1405G (C.I. Pigment Yellow 14) manufactured by TOYOCOLOR CO., LTD., 50% diameter=150 nm <Production of Aqueous White Inks and Aqueous Coloring Ink Sets>

Using the white pigment dispersions 1 and 2, each raw material was put in a mixing container equipped with a stirrer to obtain the blending formulation described in each column of Table 2 below. After putting, the mixture was warmed to 50° C. and mixed for another 1 hour, and then filtration was performed with a membrane filter having a pore size of 1.2 μm to produce aqueous white inks 1 W to 20 W. Each raw material was put in a mixing container equipped with a stirrer to obtain the blending formulation described in each column of Table 3 below. After putting, the mixture was warmed to 50° C. and subjected to mixing for another 1 hour, and then filtration was performed with a membrane filter having a pore size of 1.2 μm to produce aqueous coloring ink sets 1 to 14. Note that each set includes a black ink (K), cyan ink (C), magenta ink (M), and yellow ink (Y), and the black pigment dispersion, cyan pigment dispersion, magenta pigment dispersion, and yellow pigment dispersion were respectively used in the production of these inks.

In the production of the aqueous white inks and aqueous coloring ink sets, each raw material was added while the mixture was stirred in a mixing container. In each of the columns of Tables 2 and 3, raw materials were added in order from those listed in the upper row. However, when a an aqueous white ink or aqueous coloring ink not containing any of these components is produced, the following components were added according to the order described above without adding said components. For a component containing two or more kinds of raw materials, the order in which these are added within the component is discretionary.

TABLE 1

| Pretreatment liquid No. | | | | 1 | 2 | 3 | 4 | 5 | 6 | 7 |
|---|---|---|---|---|---|---|---|---|---|---|
| (Salts of) cationic component | Salts of polyvalent metal ion | Calcium formate | | 1.0 | | | 2.0 | 0.5 | | |
| | | Calcium lactate | | | 1.7 | 1.7 | 2.0 | 1.5 | | |
| | Water-soluble cationic polymers | Catiomaster PE-30 | Nv = 50% | | | | | | 2.0 | |
| | | PAS-H-1L | Nv = 28% | | | | | | | 3.6 |
| Resin (PP) | Resin particles | Mowinyl6940 | Nv = 48% | | | | 10.4 | | | |
| | Water-soluble resin | (Meth)acrylic resin P1 | Nv = 30% | 16.7 | 16.7 | | | 16.7 | 16.7 | 16.7 |
| | | (Meth)acrylic resin P2 | Nv = 30% | | | 16.7 | | | | |
| Organic solvent (PS) | Diol solvent | 1,2-PD | Boiling point = 188° C. vp = 0.080 mmHg | 20.0 | 20.0 | 20.0 | 20.0 | 20.0 | 20.0 | 20.0 |
| | | 1,2-BD | Boiling point = 191° C. vp = 0.075 mmHg | | | | | | | |

TABLE 1-continued

| | | | | | | | | | | |
|---|---|---|---|---|---|---|---|---|---|---|
| | | EG | Boiling point = 198° C. vp = 0.049 mmHg | | | | | | | |
| | | 1,4-BD | Boiling point = 228° C. vp < 0.007 mmHg | | | | | | | |
| Surfactant (PA) | Acetylene diol surfactant | | SF440 | | | | | | | |
| | Siloxane surfactant | | TW280 | 0.5 | 0.5 | 0.5 | 0.5 | 0.5 | 0.5 | 0.5 |
| | | | BYK-3451 | 1.0 | 1.0 | 1.0 | 1.0 | 1.0 | 1.0 | 1.0 |
| Other materials | pH adjuster | | AMP | 0.2 | 0.2 | 0.2 | 0.2 | 0.2 | 0.2 | 0.2 |
| | Preservative | | BITaq | 5.0 | 5.0 | 5.0 | 5.0 | 5.0 | 5.0 | 5.0 |
| Water | | | Ion exchanged water | 55.6 | 54.9 | 54.9 | 58.9 | 54.6 | 54.6 | 53.1 |
| | | Amount of cationic component (MPC)(%) | | 0.31 | 0.31 | 0.31 | 0.98 | 0.43 | 1.00 | 0.89 |
| | | Static surface tension (mN/m) | | 23.0 | 23.0 | 23.2 | 23.0 | 23.0 | 23.0 | 22.7 |
| | | Boiling point of organic solvent (PS) (weighted average value) (° C.) | | 188 | 188 | 188 | 188 | 188 | 188 | 188 |

| | | Pretreatment liquid No. | | 8 | 9 | 10 | 11 | 12 | 13 | 14 |
|---|---|---|---|---|---|---|---|---|---|---|
| (Salts of) cationic component | Salts of polyvalent metal ion | | Calcium formate | | | | | | | |
| | | | Calcium lactate | 1.7 | 1.7 | 1.7 | 1.7 | 1.7 | 1.7 | |
| | Water-soluble cationic polymers | Catiomaster PE-30 | Nv = 50% | | | | | | | |
| | | PAS-H-1L | Nv = 28% | | | | | | | |
| Resin (PP) | Resin particles | Mowiny16940 | Nv = 48% | | | | | | | |
| | | (Meth)acrylic resin P1 | Nv = 30% | 16.7 | 16.7 | 23.3 | 16.7 | 16.7 | 16.7 | 23.3 |
| | Water-soluble resin | (Meth)acrylic resin P2 | Nv = 30% | | | | | | | |
| Organic solvent (PS) | Diol solvent | 1,2-PD | Boiling point = 188° C. vp = 0.080 mmHg | | | | 10.0 | 20.0 | 20.0 | 10.0 |
| | | 1,2-BD | Boiling point = 191° C. vp = 0.075 mmHg | 20.0 | | | | | | |
| | | EG | Boiling point = 198° C. vp = 0.049 mmHg | | | | | | | |
| | | 1,4-BD | Boiling point = 228° C. vp < 0.007 mmHg | | 20.0 | | | | | |
| Surfactant (PA) | Acetylene diol surfactant | | SF440 | | | | | 0.5 | 0.5 | 0.5 |
| | Siloxane surfactant | | TW280 | 0.5 | 0.5 | 0.5 | | 0.5 | | 0.5 |
| | | | BYK-3451 | 1.0 | 1.0 | 1.0 | 1.0 | | | 1.0 |
| Other materials | pH adjuster | | AMP | 0.2 | 0.2 | 0.2 | 0.2 | 0.2 | 0.2 | 0.2 |
| | Preservative | | BITaq | 5.0 | 5.0 | 5.0 | 5.0 | 5.0 | 5.0 | 5.0 |
| Water | | | Ion exchanged water | 54.9 | 54.9 | 58.3 | 54.9 | 55.4 | 55.9 | 60.0 |
| | | Amount of cationic component (MPC)(%) | | 0.31 | 0.31 | 0.31 | 0.31 | 0.31 | 0.31 | 0.00 |
| | | Static surface tension (mN/m) | | 23.1 | 23.3 | 22.2 | 22.4 | 24.8 | 30.3 | 23.3 |
| | | Boiling point of organic solvent (PS) (weighted average value) (° C.) | | 188 | 188 | 188 | 188 | 188 | 188 | 188 |

| | | Pretreatment liquid No. | | 15 | 16 | 17 | 18 | 19 | 20 | 21 |
|---|---|---|---|---|---|---|---|---|---|---|
| (Salts of) cationic component | Salts of polyvalent metal ion | | Calcium formate | | | | 0.7 | | | |
| | | | Calcium lactate | 1.7 | | 1.7 | | 1.0 | 1.7 | 1.7 |
| | Water-soluble cationic polymers | Catiomaster PE-30 | Nv = 50% | | 10.0 | 10.0 | | | | |
| | | PAS-H-1L | Nv = 28% | | | | | | | |
| Resin (PP) | Resin particles | Mowiny16940 | Nv = 48% | | | | | | | |
| | | (Meth)acrylic resin P1 | Nv = 30% | | | | 16.7 | 16.7 | 16.7 | 16.7 |
| | Water-soluble resin | (Meth)acrylic resin P2 | Nv = 30% | | | | | | | |
| Organic solvent (PS) | Diol solvent | 1,2-PD | Boiling point = 188° C. vp = 0.080 mmHg | 20.0 | 20.0 | 20.0 | 20.0 | 20.0 | 10.0 | 20.0 |
| | | 1,2-BD | Boiling point = 191° C. vp = 0.075 mmHg | | | | | | | |
| | | EG | Boiling point = 198° C. vp = 0.049 mmHg | | | | | | 10.0 | |
| | | 1,4-BD | Boiling point = 228° C. vp < 0.007 mmHg | | | | | | | |
| Surfactant) (PA) | Acetylene diol surfactant | | SF440 | | | | | | | |
| | Siloxane surfactant | | TW280 | 0.5 | 0.5 | 0.5 | 0.5 | 0.5 | 0.5 | |
| | | | BYK-3451 | 1.0 | 1.0 | 1.0 | 1.0 | 1.0 | 1.0 | 1.0 |
| Other materials | pH adjuster | | AMP | 0.2 | 0.2 | 0.2 | 0.2 | 0.2 | 0.2 | 0.2 |
| | Preservative | | BITaq | 5.0 | 5.0 | 5.0 | 5.0 | 5.0 | 5.0 | 5.0 |
| Water | | | Ion exchanged water | 71.6 | 63.3 | 61.6 | 55.9 | 55.6 | 54.9 | 54.9 |
| | | Amount of cationic component (MPC)(%) | | 0.31 | 5.00 | 5.31 | 0.22 | 0.18 | 0.31 | 0.31 |
| | | Static surface tension (mN/m) | | 23.0 | 23.0 | 23.3 | 23.1 | 22.8 | 23.0 | 23.0 |
| | | Boiling point of organic solvent (PS) (weighted average value) (° C.) | | 188 | 188 | 188 | 188 | 188 | 193 | 188 |

TABLE 2

| Aqueous white ink No. | | | | 1W | 2W | 3W | 4W | 5W |
|---|---|---|---|---|---|---|---|---|
| White-colored pigment dispersion | White pigment dispersion 1 | | | 33.3 | 33.3 | 33.3 | 33.3 | 33.3 |
| | White pigment dispersion 2 | | | | | | | |
| Organic solvent (WS) | Diol solvent | 1,2-PD | Boiling point = 188° C. vp = 0.080 mmHg | 15.0 | | | 15.0 | 15.0 |
| | | 1,2-BD | Boiling point = 191° C. vp = 0.075 mmHg | | 15.0 | | | |
| | | 1,3-PD | Boiling point = 214° C. vp = 0.042 mmHg | | | | | |
| | | 1,4-BD | Boiling point = 228° C. vp < 0.007 mmHg | | | 15.0 | | |
| | Glycol monoalkyl ether solvent | MP | Boiling point = 121° C. vp = 9.0 mmHg | 5.0 | 5.0 | 5.0 | | |
| | | EDG | Boiling point = 196° C. vp = 0.12 mmHg | | | | 5.0 | |
| | | BDG | Boiling point = 231° C. vp = 0.022 mmHg | | | | | 5.0 |
| Surfactant (WA) | Acetylene diol surfactant | SF465 | | 0.5 | 0.5 | 0.5 | 0.5 | 0.5 |
| | Siloxane surfactant | TW280 | | 0.5 | 0.5 | 0.5 | 0.5 | 0.5 |
| Binder resin | Water-soluble resin | Methacrylic resin P2 | Nv = 30% | 13.4 | 13.4 | 13.4 | 13.4 | 13.4 |
| Other materials | pH adjuster | AMP | | 0.5 | 0.5 | 0.5 | 0.5 | 0.5 |
| | Wax | AQ515 | Nv = 35% | 3.0 | 3.0 | 3.0 | 3.0 | 3.0 |
| | Preservative | BITaq | | 1.0 | 1.0 | 1.0 | 1.0 | 1.0 |
| | Water | Ion exchanged water | | 27.8 | 27.8 | 27.8 | 27.8 | 27.8 |
| | Amount of white-colored colorant (MWC)(%) | | | 16.7 | 16.7 | 16.7 | 16.7 | 16.7 |
| | Static surface tension (mN/m) | | | 26.6 | 27.0 | 26.8 | 26.6 | 26.7 |
| | Boiling point of organic solvent (PS) (weighted average value) (° C.) | | | 171 | 174 | 201 | 190 | 199 |

| Aqueous white ink No. | | | | 6W | 7W | 8W | 9W | 10W |
|---|---|---|---|---|---|---|---|---|
| White-colored pigment dispersion | White pigment dispersion 1 | | | 33.3 | 30.0 | 33.3 | 33.3 | |
| | White pigment dispersion 2 | | | | | | | 33.3 |
| Organic solvent (WS) | Diol solvent | 1,2-PD | Boiling point = 188° C. vp = 0.080 mmHg | 15.0 | 25.0 | 25.0 | 10.0 | 15.0 |
| | | 1,2-BD | Boiling point = 191° C. vp = 0.075 mmHg | | | | | |
| | | 1,3-PD | Boiling point = 214° C. vp = 0.042 mmHg | | | | | |
| | | 1,4-BD | Boiling point = 228° C. vp < 0.007 mmHg | | | | | |
| | Glycol monoalkyl ether solvent | MP | Boiling point = 121° C. vp = 9.0 mmHg | | | | | 5.0 |
| | | EDG | Boiling point = 196° C. vp = 0.12 mmHg | | | | | |
| | | BDG | Boiling point = 231° C. vp = 0.022 mmHg | 10.0 | | | | |
| Surfactant (WA) | Acetylene diol surfactant | SF465 | | 0.5 | 0.5 | 0.5 | 0.5 | 0.5 |
| | Siloxane surfactant | TW280 | | 0.5 | 0.5 | 0.5 | 0.5 | 0.5 |
| Binder resin | Water-soluble resin | Methacrylic resin P2 | Nv = 30% | 13.4 | 13.4 | 13.4 | 13.4 | 13.4 |
| Other materials | pH adjuster | AMP | | 0.5 | 0.5 | 0.5 | 0.5 | 0.5 |
| | Wax | AQ515 | Nv = 35% | 3.0 | 3.0 | 3.0 | 3.0 | 3.0 |
| | Preservative | BITaq | | 1.0 | 1.0 | 1.0 | 1.0 | 1.0 |
| | Water | Ion exchanged water | | 22.8 | 26.1 | 22.8 | 37.8 | 27.8 |
| | Amount of white-colored colorant (MWC)(%) | | | 16.7 | 15.0 | 16.7 | 16.7 | 16.7 |
| | Static surface tension (mN/m) | | | 27.0 | 27.4 | 27.3 | 26.8 | 26.6 |
| | Boiling point of organic solvent (PS) (weighted average value) (° C.) | | | 205 | 188 | 188 | 188 | 171 |

| Aqueous white ink No. | | | | 11W | 12W | 13W | 14W | 15W |
|---|---|---|---|---|---|---|---|---|
| White-colored pigment dispersion | White pigment dispersion 1 | | | 40.0 | 36.0 | 26.0 | 24.0 | 33.3 |
| | White pigment dispersion 2 | | | | | | | |
| Organic solvent (WS) | Diol solvent | 1,2-PD | Boiling point = 188° C. vp = 0.080 mmHg | 15.0 | 15.0 | 15.0 | 15.0 | 15.0 |
| | | 1,2-BD | Boiling point = 191° C. vp = 0.075 mmHg | | | | | |
| | | 1,3-PD | Boiling point = 214° C. vp = 0.042 mmHg | | | | | |
| | | 1,4-BD | Boiling point = 228° C. vp < 0.007 mmHg | | | | | |
| | Glycol monoalkyl ether solvent | MP | Boiling point = 121° C. vp = 9.0 mmHg | 5.0 | 5.0 | 5.0 | 5.0 | 5.0 |
| | | EDG | Boiling point = 196° C. vp = 0.12 mmHg | | | | | |

TABLE 2-continued

| | | | | | | | | |
|---|---|---|---|---|---|---|---|---|
| | | BDG | Boiling point = 231° C. vp = 0.022 mmHg | | | | | |
| Surfactant (WA) | Acetylene diol surfactant | SF465 | | 0.5 | 0.5 | 0.5 | 0.5 | 0.5 |
| | Siloxane surfactant | TW280 | | 0.5 | 0.5 | 0.5 | 0.5 | 1.5 |
| Binder resin | Water-soluble resin | Methacrylic resin P2 | Nv = 30% | 13.4 | 13.4 | 13.4 | 13.4 | 13.4 |
| Other materials | pH adjuster | AMP | | 0.5 | 0.5 | 0.5 | 0.5 | 0.5 |
| | Wax | AQ515 | Nv = 35% | 3.0 | 3.0 | 3.0 | 3.0 | 3.0 |
| | Preservative | BITaq | | 1.0 | 1.0 | 1.0 | 1.0 | 1.0 |
| Water | | Ion exchanged water | | 21.1 | 25.1 | 35.1 | 37.1 | 26.8 |
| Amount of white-colored colorant (MWC)(%) | | | | 20.0 | 18.0 | 13.0 | 12.0 | 16.7 |
| Static surface tension (mN/m) | | | | 27.0 | 26.8 | 26.4 | 26.3 | 22.8 |
| Boiling point of organic solvent (WS) (weighted average value) (° C.) | | | | 188 | 188 | 171 | 171 | 171 |

| | | | | | | | | |
|---|---|---|---|---|---|---|---|---|
| Aqueous white ink No. | | | | 16W | 17W | 18W | 19W | 20W |
| White-colored pigment dispersion | | White pigment dispersion 1 | | 33.3 | 33.3 | 33.3 | 33.3 | 33.3 |
| | | White pigment dispersion 2 | | | | | | |
| Organic solvent (WS) | Diol solvent | 1.2-PD | Boiling point = 188° C. vp = 0.080mmHg | 15.0 | 15.0 | 13.0 | | |
| | | 1.2-BD | Boiling point = 191° C. vp = 0.075 mmHg | | | | | |
| | | 1,3-PD | Boiling point = 214° C. vp = 0.042 mmHg | | | | 16.0 | 10.0 |
| | | 1.4-BD | Boiling point = 228° C. vp < 0.007 mmHg | | | | | |
| | Glycol monoalkyl ether solvent | MP | Boiling point = 121° C. vp = 9.0 mmHg | | 5.0 | 7.0 | 4.0 | 10.0 |
| | | EDG | Boiling point = 196° C. vp = 0.12 mmHg | | | | | |
| | | BDG | Boiling point = 231° C. vp = 0.022 mmHg | 5.0 | | | | |
| Surfactant (WA) | Acetylene diol surfactant | SF465 | | 0.5 | 0.5 | 0.5 | 0.5 | 0.5 |
| | Siloxane surfactant | TW280 | | | 0.7 | 0.5 | 0.5 | 0.5 |
| Binder resin | Water-soluble resin | Methacrylic resin P2 | Nv = 30% | 13.4 | 13.4 | 13.4 | 13.4 | 13.4 |
| Other materials | pH adjuster | AMP | | 0.5 | 0.5 | 0.5 | 0.5 | 0.5 |
| | Wax | AQ515 | Nv = 35% | 3.0 | 3.0 | 3.0 | 3.0 | 3.0 |
| | Preservative | BITaq | | 1.0 | 1.0 | 1.0 | 1.0 | 1.0 |
| Water | | Ion exchanged water | | 28.3 | 27.6 | 27.8 | 27.8 | 27.8 |
| Amount of white-colored colorant (MWC)(%) | | | | 16.7 | 16.7 | 16.7 | 16.7 | 16.7 |
| Static surface tension (mN/m) | | | | 32.0 | 25.9 | 26.4 | 26.9 | 26.5 |
| Boiling point of organic solvent (WS) (weighted average value) (° C.) | | | | 199 | 171 | 165 | 195 | 168 |

TABLE 3

| | | | | | | | | | | |
|---|---|---|---|---|---|---|---|---|---|---|
| Aqueous coloring ink set No. | | | | 1 | 2 | 3 | 4 | 5 | 6 | 7 |
| Pigment dispersion (black, cyan, magenta, yellow) | | | | 33.3 | 33.3 | 33.3 | 33.3 | 33.3 | 33.3 | 33.3 |
| Organic solvent | Diol solvent | 1.2-PD | Boiling point = 188° C. vp = 0.080 mmHg | 15.0 | | | 15.0 | 15.0 | 10.0 | 25.0 |
| | | 1.2-BD | Boiling point = 191° C. vp = 0.075 mmHg | | 15.0 | | | | | |
| | | 1.4-BD | Boiling point = 228° C. vp < 0.007 mmHg | | | 15.0 | | | | |
| | Glycol monoalkyl ether solvent | MP | Boiling point = 121° C. vp = 9.0 mmHg | | | | | 5.0 | | |
| | | EDG | Boiling point = 196° C. vp = 0.12 mmHg | | | | | | 5.0 | |
| | | BDG | Boiling point = 231° C. vp = 0.022 mmHg | 5.0 | 5.0 | 5.0 | | | 15.0 | |
| Surfactant | Acetylene diol surfactant | SF104 | | | | | | | | |
| | | SF440 | | | | | | | | |
| | | SF465 | | 0.5 | 0.5 | 0.5 | 0.5 | 0.5 | 0.5 | 0.5 |
| | Siloxane surfactant | TW280 | | 1.0 | 1.0 | 1.0 | 1.0 | 1.0 | 1.0 | 1.0 |
| | | BYK3451 | | | | | | | | |
| Binder resin | Water-soluble resin | Methacrylic resin P2 | Nv = 30% | 20.0 | 20.0 | 20.0 | 20.0 | 20.0 | 20.0 | 20.0 |
| Other materials | pH adjuster | AMP | | 0.5 | 0.5 | 0.5 | 0.5 | 0.5 | 0.5 | 0.5 |
| | Wax | AQ515 | Nv = 35% | 3.0 | 3.0 | 3.0 | 3.0 | 3.0 | 3.0 | 3.0 |
| | Preservative | BITaq | | 1.0 | 1.0 | 1.0 | 1.0 | 1.0 | 1.0 | 1.0 |
| Water | | Ion exchanged water | | 20.7 | 20.7 | 20.7 | 20.7 | 20.7 | 15.7 | 15.7 |
| Static surface tension (mN/m) | | | | 24.5 | 24.9 | 24.8 | 24.5 | 24.6 | 25.2 | 24.2 |
| Boiling point of organic solvent (weighted average value) (° C.) | | | | 199 | 201 | 229 | 171 | 190 | 214 | 188 |

TABLE 3-continued

| Aqueous coloring ink set No. | | | | | 8 | 9 | 10 | 11 | 12 | 13 | 14 |
|---|---|---|---|---|---|---|---|---|---|---|---|
| | Pigment dispersion (black, cyan, magenta, yellow) | | | | 33.3 | 25.0 | 20.0 | 33.3 | 33.3 | 33.3 | 33.3 |
| Organic solvent | Diol solvent | 1.2-PD | Boiling point = 188° C. vp = 0.080 mmHg | | 10.0 | 15.0 | 15.0 | 15.0 | 15.0 | 15.0 | 15.0 |
| | | 1.2-BD | Boiling point = 191° C. vp = 0.075 mmHg | | | | | | | | |
| | | 1.4-BD | Boiling point = 228° C. vp < 0.007 mmHg | | | | | | | | |
| | Glycol monoalkyl ether solvent | MP | Boiling point = 121° C. vp = 9.0 mmHg | | | | | | | | |
| | | EDG | Boiling point = 196° C. vp = 0.12 mmHg | | | 5.0 | 5.0 | 5.0 | 5.0 | 5.0 | |
| | | BDG | Boiling point = 231° C. vp = 0.022 mmHg | | | | | | | | 5.0 |
| Surfactant | Acetylene diol surfactant | SF104 | | | | | | | 0.5 | | |
| | | SF440 | | | | | | 0.5 | | | |
| | | SF465 | | | 0.5 | 0.5 | 0.5 | | | 0.5 | 0.5 |
| | Siloxane surfactant | TW280 | | | 1.0 | 1.0 | 1.0 | 1.0 | 1.0 | | |
| | | BYK3451 | | | | | | | | 1.0 | |
| Binder resin | Water-soluble resin | Methacrylic resin P2 | Nv = 30% | | 20.0 | 20.0 | 20.0 | 20.0 | 20.0 | 20.0 | 20.0 |
| Other materials | pH adjuster | AMP | | | 0.5 | 0.5 | 0.5 | 0.5 | 0.5 | 0.5 | 0.5 |
| | Wax | AQ515 | Nv = 35% | | 3.0 | 3.0 | 3.0 | 3.0 | 3.0 | 3.0 | 3.0 |
| | Preservative | BITaq | | | 1.0 | 1.0 | 1.0 | 1.0 | 1.0 | 1.0 | 1.0 |
| | Water | Ion exchanged water | | | 30.7 | 29.0 | 34.0 | 20.7 | 20.7 | 20.7 | 21.7 |
| | Static surface tension (mN/m) | | | | 24.0 | 24.2 | 24.0 | 24.5 | 24.4 | 25.0 | 30.6 |
| | Boiling point of organic solvent (weighted average value) (° C.) | | | | 188 | 190 | 190 | 190 | 190 | 190 | 199 |

Details of the product names and abbreviations listed in Tables 1 to 3 above are as follows. Note that in Tables 1 to 3, "vp" means "vapor pressure at 20° C.". The blending amounts of polyvalent metal salts in Table 1 are all amounts as anhydrides. Note that in Tables 1 to 3, a raw material with "Nv (%)" refers to an amount as a solution or dispersion containing a solvent.

Catiomaster PE-30: a water-soluble cationic polymer (a dimethylamine-ethylenediamine-epichlorohydrin condensate) manufactured by Yokkaichi Chemical Company Limited, an aqueous solution with a solid fraction of 50%, a weight average molecular weight of 9,000

PAS-H-1L: a water-soluble cationic polymer (a polymer of diallyldimethylammonium hydrochloride) manufactured by NITTOBO MEDICAL CO., LTD., an aqueous solution with a solid fraction of 28%, a weight average molecular weight of 8,500

Mowinyl6940: cationic resin particles manufactured by Japan Coating Resin Corporation, an aqueous dispersion with a solid fraction of 48%

1,2-PD: 1,2-propanediol (boiling point at 1 atmosphere=188° C., vapor pressure at 20° C.=0.080 mmHg)

1,2-BD: 1,2-butanediol (boiling point at 1 atmosphere=191° C., vapor pressure at 20° C.=0.075 mmHg)

EG: ethylene glycol (boiling point at 1 atmosphere=198° C., vapor pressure at 20° C.=0.049 mmHg)

1,3-PD: 1,3-propanediol (boiling point at 1 atmosphere=214° C., vapor pressure at 20° C.=0.042 mmHg)

1,4-BD: 1,4-butanediol (boiling point at 1 atmosphere=228° C., vapor pressure at 20° C.=less than 0.007 mmHg)

MP: propylene glycol monomethyl ether (boiling point at 1 atmosphere=121° C., vapor pressure at 20° C.=9.0 mmHg)

EDG: diethylene glycol monoethyl ether (boiling point at 1 atmosphere=196° C., vapor pressure at 20° C.=0.12 mmHg)

BDG: diethylene glycol monobutyl ether (boiling point at 1 atmosphere=231° C., vapor pressure at 20° C.=0.022 mmHg)

SF440: SURFYNOL 440 (an acetylene diol surfactant manufactured by Evonik Industries AG)

TW280: TEGO Wet 280 (a polyether modified siloxane surfactant manufactured by Evonik Industries AG)

BYK-3451: (a polyether modified siloxane surfactant manufactured by BYK-Chemie Japan K.K.)

SF465: SURFYNOL 465 (an acetylene diol surfactant manufactured by Evonik Industries AG)

SF104: SURFYNOL 104 (an acetylene diol surfactant manufactured by Evonik Industries AG)

AMP: aminomethylpropanol

AQ515: AQUACER515 (an aqueous dispersion of oxidized high-density polyethylene wax manufactured by BYK-Chemie Japan K.K., 35% solid fraction)

BITaq: 1% aqueous solution of 1,2-benzisothiazoline-3-one

Examples 1 to 50 and Comparative Examples 1 to 8

First, adhesion, rubbing resistance, and image quality were evaluated for a printed matter using the above pretreatment liquid and aqueous white ink without using the aqueous coloring ink (white printed matter), and a printed matter using the above pretreatment liquid, aqueous white ink, and aqueous coloring ink (layered printed matter). The results of these evaluations are shown in Table 4 below. However, since the combinations of the pretreatment liquid and the aqueous white ink in examples 32 to 44 have the same results as the combination in example 1, the results of these examples are not shown in Table 4.

<Production of Printed Matter I>

An inkjet ejector was prepared in which six inkjet heads KJ4B-1200 (design resolution 1,200 dpi, nozzle diameter 20 μm) manufactured by KYOCERA Corporation were installed side by side along the transport direction of substrates, and the pretreatment liquid, aqueous white ink, and aqueous coloring ink were filled in the order shown in Table 4 from the upstream side in the transport direction. On the conveyor, a biaxially-oriented polypropylene film "OPU-1" (20 μm thick) manufactured by Mitsui Chemicals Tohcello, Inc., which was previously cut into A4 size (21 cm wide×30 cm long), was fixed. After that, the conveyor was driven at a constant speed, and when the film substrate passed under the installation part of the inkjet heads, the pretreatment liquid and aqueous white ink (and aqueous coloring ink) were respectively jetted under the condition of a drop volume of 2 pL, and the image was printed. The printed substrate was immediately put in an air oven at 70° C. and dried for 3 minutes to produce a printed matter.

Note that in the method for producing a printed matter, the total remaining amount of the volatile component contained in the pretreatment liquid layer on the substrate just before printing the aqueous white ink was calculated using the method described above to be 98% to 100% by mass.

The specific method for calculating the above total remaining amount is as follows. First, a solid image (15 cm wide×30 cm long) with a 100% coverage rate of the pretreatment liquid was printed on the above polypropylene film of A4 size for which the mass (w0' [g]) was previously calculated, and then the mass of the polypropylene film after printing was measured (w1' [g]). From the above measured value, w1 was calculated using $w1=[w1'-w0'\times\{1-(15/21)\}]/(0.15\times0.3)$, and further, w10 was calculated using $w10=w1-w0$.

Meanwhile, w20 in the above-described formula for calculating the total remaining amount of the volatile component was calculated using the following method. First, the amount of the pretreatment liquid printed on the above polypropylene film was calculated to be $1200\times1200\times2=2.88\times10^6$ [pL/inch$^2$] under the conditions of a resolution of 1,200 dpi and a drop volume of 2 pL. Then, the unit of the value was converted to mL/m$^2$, and 4.46[mL/m$^2$] was calculated. From this value, w20 was calculated using $w20=d\times4.46$. Here, the above d is the density [g/mL] of the pretreatment liquid used for printing, which is a value that can be measured, for example, using a relative-gravity bottle (pycnometer).

Then, the total remaining amount of the volatile component was calculated using w10 and w20, which were measured and calculated using the above method, and using the above-described formula.

Note that Nvp used in the above-described formula was measured using the following method. First, about 1 g of the pretreatment liquid was put in a flat-bottomed can with a metal lid (what is called a mentum can) having an outer diameter of about 40 mm and an edge height of about 15 mm, whose mass was previously measured (wc [g]). After the mass of the flat-bottomed can with the lid closed was weighed (ws [g]), the lid of the flat-bottomed can was opened and the can was placed in a 150° C. air oven for 30 minutes. After 30 minutes, the flat-bottomed can removed from the air oven was quickly covered with the lid, allowed to be cooled at room temperature, and weighed again (we [g]). Nvp was calculated from the above measured values and the formula of $Nvp=(we-wc)/(ws-wc)$.

The following five types of images were prepared for printing.

White solid image: an image (15 cm wide×30 cm long, the aqueous coloring ink is not used) with a 100% coverage rate of the pretreatment liquid and aqueous white ink.

White gradient image: an image printed with the aqueous white ink while the coverage rate is continuously changed between 5% and 80% (10 cm wide×30 cm long) on a solid image (15 cm wide×30 cm long) with a 100% coverage rate of the pretreatment liquid (aqueous coloring ink is not used).

White text image: an image in which 20 characters of 6-point MS Mincho typeface mixed with hiragana and kanji are printed using the aqueous white ink on a solid image with a 100% coverage rate of the pretreatment liquid (aqueous coloring ink is not used).

Layered solid image: an image obtained by printing a cyan ink, magenta ink, yellow ink, and black ink without overlapping each other at a coverage rate of 100% (3 cm wide and 30 cm long in each color) on a solid image with a 100% coverage rate of the pretreatment liquid and aqueous white ink (15 cm wide×30 cm long).

Layered gradient image: an image obtained by printing a cyan ink, magenta ink, yellow ink, and black ink without overlapping each other while the coverage rate is continuously changed between 5% and 80% (3 cm wide and 30 cm long in each color) on a solid image with a 100% coverage rate of the pretreatment liquid and aqueous white ink (15 cm wide×30 cm long).

For each combination of the pretreatment liquid, aqueous white ink, and aqueous coloring ink shown in Table 4 below, the above five types of images were printed on a polypropylene film using the method described above, and then the following evaluation was performed using these printed matters. Note that the evaluation results were as shown in Table 4.

<Evaluation 1A: Adhesion Evaluation A>

On the surface of a printed matter of the white solid image produced by driving a conveyor at 50 m/min, one hundred 1-mm$^2$ squares were made which were surrounded by cuts made with a box cutter at 1 mm intervals vertically and horizontally. Then, a cellophane tape (18 mm wide) manufactured by Nichiban Co., Ltd. was firmly attached to the surface of the printed matter having the above square cuts, and the edge of the cellophane tape was held and pulled off instantaneously while maintaining an angle of 60 degrees. Then, the adhesion was determined by visually observing the surface of the printed matter after the cellophane tape had been removed and the adhesive surface of the cellophane tape, and by evaluating the degree of peeling of the printed matter. The evaluation criteria were as follows, and ⊚, ⊚—, ○, and Δ were considered to be practically usable.

⊚: The area of a peeled part was less than 2% of the area to which the cellophane tape was attached.

⊚—: The area of a peeled part was 2% or more and less than 5% of the area to which the cellophane tape was attached.

○: The area of a peeled part was 5% or more and less than 10% of the area to which the cellophane tape was attached.

Δ: The area of a peeled part was 10% or more and less than 15% of the area to which the cellophane tape was attached.

x: The area of a peeled part was 15% or more of the area to which the cellophane tape was attached.

<Evaluation 2A: Evaluation of Rubbing Resistance A>

A printed matter of the white solid image produced by driving a conveyor at 50 m/min was cut out and set in an AB-301 Color Fastness Rubbing Tester manufactured by TESTER SANGYO CO., LTD. Then, a black cotton cloth was attached to a rubbing element (own weight 200 g), the load applied to the rubbing element was changed, and after mechanical rubbing was performed a predetermined number of times, the rubbing resistance was evaluated by visually checking the condition of the printed matter surface and the degree of coloring of the cotton cloth. The evaluation criteria are as follows, and ⊚, ⊚—, ○, and Δ were considered to be practically usable.

⊚: No abrasion marks were on the printing surface and no coloring was observed on the cotton cloth even after performing mechanical rubbing 75 times with a 300 g weight on the rubbing element (500 g in total).

⊚—: No abrasion marks were on the printing surface and no coloring was observed on the cotton cloth even after performing mechanical rubbing 50 times with a 300 g weight on the rubbing element (500 g in total). However, there were abrasion marks on the printing surface and/or coloring was observed on the cotton cloth after performing mechanical rubbing 75 times under the same load condition.

○: No abrasion marks were on the printing surface and no coloring was observed on the cotton cloth even after performing mechanical rubbing 25 times with a 300 g weight on the rubbing element (500 g in total). However, there were abrasion marks on the printing surface and/or coloring was observed on the cotton cloth after performing mechanical rubbing 50 times under the same load condition.

Δ: No abrasion marks were on the printing surface and no coloring was observed on the cotton cloth after performing mechanical rubbing 25 times with no weight on the rubbing element (load 200 g). However, there were abrasion marks on the printing surface and/or coloring was observed on the cotton cloth after performing mechanical rubbing 25 times with a 300 g weight on the rubbing element (500 g in total).

x: There were abrasion marks on the printing surface and/or coloring was observed on the cotton cloth after performing mechanical rubbing 25 times with no weight on the rubbing element (load 200 g).

<Evaluation 3A: Evaluation of Image Quality A>

Printed matters of the white solid image produced at different conveyor driving speeds were visually observed from the printing surface side, and the degree of voids was confirmed. Using printed matters of the white gradient image produced at different conveyor driving speeds, the dot shape at a part with a coverage rate of 10% to 20% was enlarged from the printing surface side by 200 times using an optical microscope. Furthermore, printed matters of the white text image produced at different conveyor driving speeds were visually checked from the printing surface side as to whether all characters were legible. Then, the image quality was comprehensively determined from the degree of voids, dot shape, and legibility of characters. The evaluation criteria are as follows, and ⊚, ⊚—, ○, and Δ were considered to be practically usable.

⊚: In the printed matters printed at a conveyor driving speed of 75 m/min, none of voids, dot shape disturbance, and illegible characters were confirmed.

⊚—: In the printed matters printed at a conveyor driving speed of 75 m/min, one or more of voids, dot shape disturbance, and illegible characters were confirmed in a total of 1 to 5 places. However, in the printed matter printed at a conveyor driving speed of 50 m/min, none of voids, dot shape disturbance, and illegible characters were confirmed.

○: In the printed matters printed at a conveyor driving speed of 75 m/min, one or more of voids, dot shape disturbance, and illegible characters were confirmed in a total of 6 places or more. However, in the printed matters printed at a conveyor driving speed of 50 m/min, none of voids, dot shape disturbance, and illegible characters were confirmed.

Δ: In the printed matters printed at a conveyor driving speed of 50 m/min, one or more of voids, dot shape disturbance, and illegible characters were confirmed. However, in the printed matters printed at a conveyor driving speed of 25 m/min, none of voids, dot shape disturbance, and illegible characters were confirmed.

x: In the printed matters printed at a conveyor driving speed of 25 m/min, one or more of voids, dot shape disturbance, and illegible characters were confirmed.

<Evaluation 1B: Adhesion Evaluation B>

Except that printed matters of the layered solid image produced by driving the conveyor at 50 m/min were used, adhesion of the printed matters was evaluated using the same method and evaluation criteria as in the case of evaluation 1A described above.

<Evaluation 2B: Rubbing Resistance Evaluation B>

Except that the cyan ink printing part, magenta ink printing part, yellow ink printing part, and black ink printing part were each cut out from printed matters of the layered solid image produced by driving the conveyor at 50 m/min and were used as test pieces, adhesion was evaluated for each of the four color test pieces using the same method and evaluation criteria as in evaluation 2A described above. Note that Table 4 shows the evaluation results of the color with the lowest evaluation among the four colors.

<Evaluation 3B: Image Quality Evaluation B>

Printed matters of the layered solid image produced at different conveyor driving speeds were visually observed from the printing surface side, and the degree of voids was confirmed. Using printed matters of the layered gradient image produced at different conveyor driving speeds, the dot shape at a part with a coverage rate of 10% to 20% was enlarged from the printing surface side by 200 times using an optical microscope. Then, the image quality of printed matters produced using the recording liquid set including the aqueous coloring ink was comprehensively determined from the degree of voids and the dot shape. The evaluation criteria were as follows, and ⊚, ⊚—, ○, and Δ were considered to be practically usable.

⊚: In the printed matters printed at the conveyor driving speed of 75 m/min, neither voids nor dot shape disturbance were confirmed.

⊚—: In the printed matters printed at the conveyor driving speed of 75 m/min, voids and/or dot shape disturbance were confirmed in a total of 1 to 5 places. However, in the printed matters printed at the conveyor driving speed of 50 m/min, neither voids nor dot shape disturbance were confirmed.

○: In the printed matters printed at the conveyor driving speed of 75 m/min, voids and/or dot shape disturbance were confirmed in a total of 6 places or more. However, in the printed matters printed at the conveyor driving speed of 50 m/min, neither voids nor dot shape disturbance were confirmed.

Δ: In the printed matters printed at the conveyor driving speed of 50 m/min, voids and/or dot shape disturbance were confirmed. However, in the printed matters printed at the conveyor driving speed of 25 m/min, neither voids nor dot shape disturbance were confirmed.

x: In the printed matters printed at the conveyor driving speed of 25 m/min, voids and/or dot shape disturbance were confirmed.

TABLE 4

| Example/comparative example No. | Combination of pretreatment liquid and inks Upstream↔Downstream | | | | | |
|---|---|---|---|---|---|---|
| | Filled furthest upstream | Filled second furthest upstream | Filled third furthest upstream | Filled fourth furthest upstream | Filled fifth furthest upstream | Filled furthest downstream |
| Example 1 | Pretreatment liquid 1 | 1W | 1K | 1C | 1M | 1Y |
| Example 2 | Pretreatment liquid 2 | 1W | 1K | 1C | 1M | 1Y |
| Example 3 | Pretreatment liquid 3 | 1W | 1K | 1C | 1M | 1Y |
| Example 4 | Pretreatment liquid 4 | 1W | 1K | 1C | 1M | 1Y |
| Example 5 | Pretreatment liquid 5 | 1W | 1K | 1C | 1M | 1Y |
| Example 6 | Pretreatment liquid 6 | 1W | 1K | 1C | 1M | 1Y |
| Example 7 | Pretreatment liquid 7 | 1W | 1K | 1C | 1M | 1Y |
| Example 8 | Pretreatment liquid 8 | 1W | 1K | 1C | 1M | 1Y |
| Example 9 | Pretreatment liquid 9 | 1W | 1K | 1C | 1M | 1Y |
| Example 10 | Pretreatment liquid 10 | 1W | 1K | 1C | 1M | 1Y |
| Example 11 | Pretreatment liquid 11 | 1W | 1K | 1C | 1M | 1Y |
| Example 12 | Pretreatment liquid 12 | 1W | 1K | 1C | 1M | 1Y |
| Example 13 | Pretreatment liquid 20 | 1W | 1K | 1C | 1M | 1Y |
| Example 14 | Pretreatment liquid 21 | 1W | 1K | 1C | 1M | 1Y |
| Comparative example 1 | Pretreatment liquid 13 | 1W | 1K | 1C | 1M | 1Y |
| Comparative example 2 | Pretreatment liquid 14 | 1W | 1K | 1C | 1M | 1Y |
| Comparative example 3 | Pretreatment liquid 15 | 1W | 1K | 1C | 1M | 1Y |
| Comparative example 4 | Pretreatment liquid 16 | 1W | 1K | 1C | 1M | 1Y |
| Comparative example 5 | Pretreatment liquid 17 | 1W | 1K | 1C | 1M | 1Y |
| Example 15 | Pretreatment liquid 1 | 2W | 1K | 1C | 1M | 1Y |
| Example 16 | Pretreatment liquid 1 | 3W | 1K | 1C | 1M | 1Y |
| Example 17 | Pretreatment liquid 1 | 4W | 1K | 1C | 1M | 1Y |
| Example 18 | Pretreatment liquid 1 | 5W | 1K | 1C | 1M | 1Y |
| Example 19 | Pretreatment liquid 1 | 6W | 1K | 1C | 1M | 1Y |
| Example 20 | Pretreatment liquid 1 | 7W | 1K | 1C | 1M | 1Y |
| Example 21 | Pretreatment liquid 1 | 8W | 1K | 1C | 1M | 1Y |
| Example 22 | Pretreatment liquid 1 | 9W | 1K | 1C | 1M | 1Y |
| Example 23 | Pretreatment liquid 1 | 10W | 1K | 1C | 1M | 1Y |
| Example 24 | Pretreatment liquid 1 | 11W | 1K | 1C | 1M | 1Y |
| Example 25 | Pretreatment liquid 1 | 12W | 1K | 1C | 1M | 1Y |
| Example 26 | Pretreatment liquid 1 | 13W | 1K | 1C | 1M | 1Y |
| Example 27 | Pretreatment liquid 1 | 14W | 1K | 1C | 1M | 1Y |
| Example 28 | Pretreatment liquid 1 | 17W | 1K | 1C | 1M | 1Y |
| Example 29 | Pretreatment liquid 1 | 18W | 1K | 1C | 1M | 1Y |
| Example 30 | Pretreatment liquid 1 | 19W | 1K | 1C | 1M | 1Y |
| Example 31 | Pretreatment liquid 1 | 20W | 1K | 1C | 1M | 1Y |
| Comparative example 6 | Pretreatment liquid 1 | 15W | 1K | 1C | 1M | 1Y |
| Example 32 | Pretreatment liquid 1 | 1W | 2K | 2C | 2M | 2Y |
| Example 33 | Pretreatment liquid 1 | 1W | 3K | 3C | 3M | 3Y |
| Example 34 | Pretreatment liquid 1 | 1W | 4K | 4C | 4M | 4Y |
| Example 35 | Pretreatment liquid 1 | 1W | 5K | 5C | 5M | 5Y |
| Example 36 | Pretreatment liquid 1 | 1W | 6K | 6C | 6M | 6Y |
| Example 37 | Pretreatment liquid 1 | 1W | 7K | 7C | 7M | 7Y |
| Example 38 | Pretreatment liquid 1 | 1W | 8K | 8C | 3M | 8Y |
| Example 39 | Pretreatment liquid 1 | 1W | 9K | 9C | 9M | 9Y |
| Example 40 | Pretreatment liquid 1 | 1W | 10K | 10C | 10M | 10Y |
| Example 41 | Pretreatment liquid 1 | 1W | 11K | 1C | 11M | 11Y |
| Example 42 | Pretreatment liquid 1 | 1W | 12K | 12C | 12M | 12Y |
| Example 43 | Pretreatment liquid 1 | 1W | 13K | 13C | 13M | 13Y |
| Example 44 | Pretreatment liquid 1 | 1W | 14K | 14C | 14M | 14Y |
| Example 45 | Pretreatment liquid 1 | 16W | 14K | 4C | 14M | 14Y |
| Example 46 | Pretreatment liquid 8 | 6W | 2K | 2C | 2M | 2Y |
| Example 47 | Pretreatment liquid 10 | 16W | 1K | 1C | 1M | 1Y |
| Example 48 | Pretreatment liquid 13 | 16W | 1K | 1C | 1M | 1Y |
| Example 49 | Pretreatment liquid 18 | 11W | 1K | 1C | 1M | 1Y |
| Example 50 | Pretreatment liquid 12 | 17W | 1K | 1C | 1M | 1Y |
| Comparative example 7 | Pretreatment liquid 19 | 11W | 1K | 1C | 1M | 1Y |
| Comparative example 8 | Pretreatment liquid 7 | 13W | 1K | 1C | 1M | 1Y |

| Example/comparative example No. | Static surface tension | | | Ratio between cationic component amount and white-colored colorant amount | | |
|---|---|---|---|---|---|---|
| | Pretreatment liquid | Aqueous white ink | Difference between aqueous white ink and pretreatment liquid | Cationic component amount (MPC) | White-colored colorant amount (MPC) | MWC/MPC |
| Example 1 | 23.0 | 26.6 | 3.6 | 0.31 | 16.7 | 54.2 |
| Example 2 | 23.0 | 26.6 | 3.6 | 0.31 | 16.7 | 53.4 |
| Example 3 | 23.2 | 26.6 | 3.4 | 0.31 | 16.7 | 53.4 |

TABLE 4-continued

| | | | | | | |
|---|---|---|---|---|---|---|
| Example 4 | 23.0 | 26.6 | 3.6 | 0.98 | 16.7 | 17.0 |
| Example 5 | 23.0 | 26.6 | 3.6 | 0.43 | 16.7 | 38.8 |
| Example 6 | 23.0 | 26.6 | 3.6 | 1.00 | 16.7 | 16.7 |
| Example 7 | 22.7 | 26.6 | 3.9 | 0.89 | 16.7 | 18.6 |
| Example 8 | 23.1 | 26.6 | 3.5 | 0.31 | 16.7 | 53.4 |
| Example 9 | 23.3 | 26.6 | 3.3 | 0.31 | 16.7 | 53.4 |
| Example 10 | 22.2 | 26.6 | 4.4 | 0.31 | 16.7 | 53.4 |
| Example 11 | 22.4 | 26.6 | 4.2 | 0.31 | 16.7 | 53.4 |
| Example 12 | 24.8 | 26.6 | 1.8 | 0.31 | 16.7 | 53.4 |
| Example 13 | 23.0 | 26.6 | 3.6 | 0.31 | 16.7 | 53.4 |
| Example 14 | 23.0 | 26.6 | 3.6 | 0.31 | 16.7 | 53.4 |
| Comparative example 1 | 30.3 | 26.6 | −3.7 | 0.31 | 16.7 | 53.4 |
| Comparative example 2 | 22.8 | 26.6 | 3.8 | 0.00 | 16.7 | — |
| Comparative example 3 | 23.0 | 26.6 | 3.6 | 0.31 | 16.7 | 53.4 |
| Comparative example 4 | 23.0 | 26.6 | 3.6 | 5.00 | 16.7 | 3.3 |
| Comparative example 5 | 23.3 | 26.6 | 3.3 | 5.31 | 16.7 | 3.1 |
| Example 15 | 23.0 | 27.0 | 4.0 | 0.31 | 16.7 | 54.2 |
| Example 16 | 23.0 | 26.8 | 3.8 | 0.31 | 16.7 | 54.2 |
| Example 17 | 23.0 | 26.6 | 3.6 | 0.31 | 16.7 | 54.2 |
| Example 18 | 23.0 | 26.7 | 3.7 | 0.31 | 16.7 | 54.2 |
| Example 19 | 23.0 | 27.0 | 4.0 | 0.31 | 16.7 | 54.2 |
| Example 20 | 23.0 | 27.4 | 4.4 | 0.31 | 15.0 | 48.8 |
| Example 21 | 23.0 | 27.3 | 4.3 | 0.31 | 16.7 | 54.2 |
| Example 22 | 23.0 | 26.8 | 3.8 | 0.31 | 16.7 | 54.2 |
| Example 23 | 23.0 | 26.6 | 3.6 | 0.31 | 16.7 | 54.2 |
| Example 24 | 23.0 | 27.0 | 4.0 | 0.31 | 20.0 | 65.1 |
| Example 25 | 23.0 | 26.8 | 3.8 | 0.31 | 18.0 | 58.6 |
| Example 26 | 23.0 | 26.4 | 3.4 | 0.31 | 13.0 | 42.3 |
| Example 27 | 23.0 | 26.3 | 3.3 | 0.31 | 12.0 | 39.0 |
| Example 28 | 23.0 | 25.9 | 2.9 | 0.31 | 16.7 | 53.4 |
| Example 29 | 23.0 | 26.4 | 3.4 | 0.31 | 16.7 | 53.4 |
| Example 30 | 23.0 | 26.9 | 3.9 | 0.31 | 16.7 | 53.4 |
| Example 31 | 23.0 | 26.5 | 3.5 | 0.31 | 16.7 | 53.4 |
| Comparative example 6 | 23.0 | 22.8 | −0.2 | 0.31 | 16.7 | 54.2 |
| Example 32 | 23.0 | 26.6 | 3.6 | 0.31 | 16.7 | 54.2 |
| Example 33 | 23.0 | 26.6 | 3.6 | 0.31 | 16.7 | 54.2 |
| Example 34 | 23.0 | 26.6 | 3.6 | 0.31 | 16.7 | 54.2 |
| Example 35 | 23.0 | 26.6 | 3.6 | 0.31 | 16.7 | 54.2 |
| Example 36 | 23.0 | 26.6 | 3.6 | 0.31 | 16.7 | 54.2 |
| Example 37 | 23.0 | 26.6 | 3.6 | 0.31 | 16.7 | 54.2 |
| Example 38 | 23.0 | 26.6 | 3.6 | 0.31 | 16.7 | 54.2 |
| Example 39 | 23.0 | 26.6 | 3.6 | 0.31 | 16.7 | 54.2 |
| Example 40 | 23.0 | 26.6 | 3.6 | 0.31 | 16.7 | 54.2 |
| Example 41 | 23.0 | 26.6 | 3.6 | 0.31 | 16.7 | 54.2 |
| Example 42 | 23.0 | 26.6 | 3.6 | 0.31 | 16.7 | 54.2 |
| Example 43 | 23.0 | 26.6 | 3.6 | 0.31 | 16.7 | 54.2 |
| Example 44 | 23.0 | 26.6 | 3.6 | 0.31 | 16.7 | 54.2 |
| Example 45 | 23.0 | 32.5 | 9.5 | 0.31 | 16.7 | 54.2 |
| Example 46 | 23.1 | 27.0 | 3.9 | 0.31 | 16.7 | 53.4 |
| Example 47 | 22.2 | 32.0 | 9.8 | 0.31 | 16.7 | 53.4 |
| Example 48 | 30.3 | 32.0 | 1.7 | 0.31 | 16.7 | 53.4 |
| Example 49 | 23.1 | 27.0 | 3.9 | 0.22 | 20.0 | 92.9 |
| Example 50 | 24.8 | 25.9 | 1.1 | 0.31 | 16.7 | 53.4 |
| Comparative example 7 | 23.3 | 27.0 | 3.7 | 0.18 | 20.0 | 111.1 |
| Comparative example 8 | 22.7 | 26.4 | 3.7 | 0.89 | 13.0 | 14.6 |

| | Evaluation | | | | | |
|---|---|---|---|---|---|---|
| | White printed matters used | | | Layered printed matters used | | |
| Example/comparative example No. | Evaluation 1A Adhesion | Evaluation 2A Rubbing resistance | Evaluation 3A Image quality | Evaluation 1B Adhesion | Evaluation 2B Rubbing resistance | Evaluation 3B Image quality |
| Example 1 | ⊚ | ⊚ | ⊚ | ⊚ | ○ | ○ |
| Example 2 | ⊚ | ⊚ | ⊚ | ⊚ | ○ | ○ |
| Example 3 | ○ | ⊚ | ⊚ | ○ | ○ | ○ |
| Example 4 | ○ | ⊚ | ⊚ | ○ | ○ | ⊚ |
| Example 5 | ⊚ | ⊚ | ⊚ | ⊚ | ○ | ⊚ |
| Example 6 | ⊚ | ⊚ | ○ | ⊚ | ○ | Δ |
| Example 7 | ⊚ | ⊚ | ⊚ | ⊚ | ○ | ○ |
| Example 8 | ⊚ | ⊚ | ⊚ | ⊚ | ○ | ○ |
| Example 9 | ⊚— | ⊚— | ⊚— | ⊚— | ○ | ○ |
| Example 10 | ⊚ | ⊚ | ⊚ | ⊚ | ○ | ○ |
| Example 11 | ⊚ | ⊚ | ⊚ | ⊚ | ○ | ○ |
| Example 12 | ⊚ | ⊚ | ⊚ | ⊚ | ○ | ○ |
| Example 13 | ⊚ | ⊚ | ⊚ | ⊚ | ○ | ○ |
| Example 14 | ⊚ | ⊚— | ⊚— | ⊚ | ○ | ○ |

TABLE 4-continued

| | | | | | | |
|---|---|---|---|---|---|---|
| Comparative example 1 | ○ | ◎ | X | ○ | ○ | X |
| Comparative example 2 | ◎ | ◎ | X | ◎ | ○ | X |
| Comparative example 3 | X | X | ○ | X | X | ○ |
| Comparative example 4 | X | X | Δ | X | X | Δ |
| Comparative example 5 | X | X | Δ | X | X | ◎ |
| Example 15 | ◎ | ◎ | ◎ | ◎ | ○ | ○ |
| Example 16 | ◎— | ◎ | ◎— | ◎— | ○ | ○ |
| Example 17 | ◎ | ◎ | ◎ | ◎ | ○ | ○ |
| Example 18 | ◎ | ◎ | ◎ | ◎ | ○ | ○ |
| Example 19 | ◎— | ◎ | ◎— | ◎— | ○ | ○ |
| Example 20 | ◎ | ◎ | ◎ | ◎ | ○ | ○ |
| Example 21 | ◎ | ◎ | ◎ | ◎ | ○ | ○ |
| Example 22 | ◎ | ◎ | ◎ | ◎ | ○ | ○ |
| Example 23 | ◎ | ◎ | ◎ | ◎ | ○ | ○ |
| Example 24 | ◎ | ◎ | ◎ | ◎ | ○ | ○ |
| Example 25 | ◎ | ◎ | ◎ | ◎ | ○ | ○ |
| Example 26 | ◎ | ◎ | ◎ | ◎ | ○ | ○ |
| Example 27 | ◎ | ◎ | ◎ | ◎ | ○ | ○ |
| Example 28 | ◎ | ◎ | ◎ | ◎ | ○ | ○ |
| Example 29 | ◎ | ◎ | ○ | ◎— | ○ | ○ |
| Example 30 | ◎ | ◎ | ◎— | ◎ | ○ | ○ |
| Example 31 | ◎ | ◎ | ○ | ◎— | ○ | Δ |
| Comparative example 6 | ◎ | ◎ | X | ◎ | ○ | X |
| Example 32 | (Description omitted since same | | | ◎ | ○ | ○ |
| Example 33 | combination as in example 1) | | | ◎ | ○ | ○ |
| Example 34 | | | | ◎ | ○ | ○ |
| Example 35 | | | | ◎ | ○ | ○ |
| Example 36 | | | | ◎ | ○ | ○ |
| Example 37 | | | | ◎ | ○ | ○ |
| Example 38 | | | | ◎ | ○ | ○ |
| Example 39 | | | | ◎ | ○ | ○ |
| Example 40 | | | | ◎ | ○ | ○ |
| Example 41 | | | | ◎ | ○ | ○ |
| Example 42 | | | | ◎ | ○ | ○ |
| Example 43 | | | | ◎ | ○ | ○ |
| Example 44 | | | | ◎ | ○ | ○ |
| Example 45 | ○ | ◎ | ◎ | ○ | ○ | ○ |
| Example 46 | ◎— | ◎ | ◎— | ◎— | ○ | ○ |
| Example 47 | ○ | ◎ | ◎ | ○ | ○ | ○ |
| Example 48 | ◎ | ◎ | ◎ | ◎ | ○ | ○ |
| Example 49 | ○ | ◎ | ◎ | ○ | ○ | ○ |
| Example 50 | ◎ | ◎ | ◎— | ○ | ○ | ○ |
| Comparative example 7 | X | ○ | X | X | Δ | X |
| Comparative example 8 | Δ | X | Δ | Δ | X | X |

As is apparent from Table 4, in examples 1 to 50, which are embodiments of the present invention, it was possible to obtain a printed matter excellent in adhesion, rubbing resistance, and image quality with both recording liquid sets without and with the aqueous coloring ink.

In contrast, in the combination of a pretreatment liquid 13 and an aqueous white ink 1 W used in comparative example 1, and the combination of a pretreatment liquid 1 and an aqueous white ink 15 W used in comparative example 6, the aqueous white ink could not penetrate into the pretreatment liquid layer because the static surface tension of the pretreatment liquid was higher, and was spread on the surface of the pretreatment liquid layer, resulting in a printed matter inferior in dot shape and character legibility. In addition, since the above aqueous white ink was present on the surface of the pretreatment liquid layer, the cationic component in the above pretreatment liquid could not reach the aqueous coloring ink to be printed afterwards, and it is thought that the image quality deteriorated greatly also in the layered printed matter. In contrast, even when the static surface tension was lower than that of the aqueous white ink, deterioration in the image quality (in particular, dot shape disturbance and deterioration of character legibility) of printed matters was observed in the pretreatment liquid containing no cationic component (comparative example 2), and the deterioration of adhesion and rubbing resistance was confirmed in the pretreatment liquid containing no resin (PP) (comparative examples 3 to 5).

Furthermore, in the combination of comparative example 7 in which the value represented by MWC/MPC was greater than 100, that is, the amount of the white-colored colorant in the aqueous white ink was significantly large relative to the amount of the cationic component in the pretreatment liquid, the deterioration of character legibility due to the shortage of the above cationic component and the deterioration of adhesion were observed. On the contrary, in the combination of comparative example 8 in which the value represented by MWC/MPC was less than 15, that is, the amount of the cationic component in the pretreatment liquid was significantly large relative to the amount of the white-colored colorant in the aqueous white ink, the above white-colored colorant aggregated before the penetration of the aqueous white ink into the pretreatment liquid layer and wet-spreading thereon, and thus voids in the white solid printed matter were likely to occur and the deterioration of rubbing resistance was also observed.

Examples 51 to 81

Subsequently, the evaluation of high-speed productivity, concealability, and density was performed using some of the pretreatment liquid, aqueous white ink, and aqueous coloring ink produced with the method described above. The results of these evaluations were as shown in Table 6 below.
<Evaluation 4: High-Speed Productivity Evaluation>

An inkjet ejector was prepared in which four inkjet heads KJ4B-1200 (design resolution 1,200 dpi, nozzle diameter 20 μm) manufactured by KYOCERA Corporation were installed side by side along the transport direction of substrates, and the pretreatment liquid and aqueous white ink, and cyan ink and yellow aqueous ink from among the aqueous coloring inks, were each filled from the upstream side in the transport direction. In addition, a biaxially-oriented polypropylene film "OPU-1" (20 μm thick) manufactured by Mitsui Chemicals Tohcello, Inc., which was cut into A4 size (21 cm wide×30 cm long), was fixed on the conveyor. After that, the conveyor was driven at a speed of 50 m/min, and when the film passed under the installation part of the inkjet heads, the pretreatment liquid, aqueous white ink, cyan ink, and yellow ink were each jetted under conditions of a drop volume of 2 pL and a coverage rate of 100%, and printed so as to overlap each other on the film (the first sheet). The first substrate was immediately left standing in a 70° C. oven for 90 seconds. While left standing, a new polypropylene film was placed on the conveyor and printing of the second sheet was started in the same manner as for the first sheet, and after completion, the second sheet was left standing in a 70° C. oven for 90 seconds. In the same manner, printing and drying of the third to tenth sheets were performed successively to produce 10 sheets of printed matters on polypropylene films.

The high speed productivity of the 10 sheets of printed matters obtained in this way was comprehensively determined by finger touch confirmation of a feeling of tackiness (stickiness) and visual confirmation of beading and banding (streak-like misfires caused by poor discharge, etc.). The evaluation criteria were as follows, and ○ and Δ were considered to be practically usable.

○: In all of the 10 sheets of printed matters, none of the tackiness, beading, and banding was recognized.

Δ: In 1 to 2 sheets of the 10 sheets of printed matters, one or more of tackiness, beading, and banding were recognized.

x: In 3 or more sheets of the 10 sheets of printed matters, one or more of tackiness, beading, and banding were recognized.

<Evaluation 5-1A: Concealability Evaluation A>

Concealability was evaluated by measuring the optical density (OD value) of a printed matter of the white solid image produced by driving a conveyor at 50 m/min using the method described in "production of printed matter I" above, by attaching a black backing paper to the non-printed surface. Note that an eXact spectrodensitometer manufactured by X-Rite Inc. was used to measure the above optical density. The evaluation criteria were as follows, and ○ and Δ were considered to be practically usable.

○: The OD value of the white solid image printed matter is less than 0.35.

Δ: The OD value of the white solid image printed matter is 0.35 or more and less than 0.50.

x: The OD value of the white solid image printed matter is 0.50 or more.

<Evaluation 5-2: Density Evaluation>

Density was evaluated by measuring the optical density (OD value) of the cyan ink printing part, magenta ink printing part, yellow ink printing part, and black ink printing part of a layered solid image printed matter produced by driving the conveyor at 50 m/min using the method described in "production of printed matter I" above, by attaching a white backing paper to the non-printed surface. Note that an exact spectrodensitometer manufactured by X-Rite Inc. was used to measure the above optical density. The evaluation criteria were as shown in Table 5 below, and ○ and Δ were considered to be practically usable. Table 6, which shows evaluation results, describes the lowest evaluation among the four colors.

[Table 5]

TABLE 5

| Evaluation criteria | Cyan ink printing part | Magenta printing part | Yellow printing part | Black printing part |
|---|---|---|---|---|
| ○ | 1.90 or more | 1.65 or more | 1.40 or more | 2.10 or more |
| Δ | 1.80 or more and less than 1.90 | 1.55 or more and less than 1.65 | 1.30 or more and less than 1.40 | 1.90 or more and less than 2.10 |
| x | Less than 1.80 | Less than 1.55 | Less than 1.30 | Less than 1.90 |

TABLE 6

| Example No. | Combination of pretreatment liquid and inks (evaluation 4 uses only cyan ink and yellow ink from among aqueous coloring inks) Upstream↔Downstream | | | | | | Evaluation results | | |
|---|---|---|---|---|---|---|---|---|---|
| | Filled furthest upstream | Filled second furthest upstream | Filled third furthest upstream | Filled fourth furthest upstream | Filled fifth furthest upstream | Filled furthest downstream | Evaluation 4 High-speed productivity | White printed matters used Evaluation 5-1A Concealability | Layered printed matters used Evaluation 5-2 Density |
| Example 51 | Pretreatment liquid 1 | 1W | 1K | 1C | 1M | 1Y | ○ | ○ | ○ |
| Example 52 | Pretreatment liquid 2 | 1W | 1K | 1C | 1M | 1Y | ○ | ○ | ○ |
| Example 53 | Pretreatment liquid 3 | 1W | 1K | 1C | 1M | 1Y | ○ | ○ | ○ |
| Example 54 | Pretreatment liquid 4 | 1W | 1K | 1C | 1M | 1Y | ○ | ○ | ○ |
| Example 55 | Pretreatment liquid 6 | 1W | 1K | 1C | 1M | 1Y | ○ | ○ | ○ |
| Example 56 | Pretreatment liquid 7 | 1W | 1K | 1C | 1M | 1Y | ○ | ○ | ○ |
| Example 57 | Pretreatment liquid 8 | 1W | 1K | 1C | 1M | 1Y | ○ | ○ | ○ |

TABLE 6-continued

| | Combination of pretreatment liquid and inks (evaluation 4 uses only cyan ink and yellow ink from among aqueous coloring inks) Upstream↔Downstream | | | | | | Evaluation results | | |
|---|---|---|---|---|---|---|---|---|---|
| | | | | | | | | White printed matters | Layered printed matters |
| Example No. | Filled furthest upstream | Filled second furthest upstream | Filled third furthest upstream | Filled fourth furthest upstream | Filled fifth furthest upstream | Filled furthest downstream | Evaluation 4 High-speed productivity | used Evaluation 5-1A Concealability | used Evaluation 5-2 Density |
| Example 58 | Pretreatment liquid 9 | 1W | 1K | 1C | 1M | 1Y | Δ | ○ | ○ |
| Example 59 | Pretreatment liquid 10 | 1W | 1K | 1C | 1M | 1Y | ○ | ○ | ○ |
| Example 60 | Pretreatment liquid 11 | 1W | 1K | 1C | 1M | 1Y | ○ | ○ | ○ |
| Example 61 | Pretreatment liquid 12 | 1W | 1K | 1C | 1M | 1Y | ○ | ○ | ○ |
| Example 62 | Pretreatment liquid 1 | 2W | 1K | 1C | 1M | 1Y | ○ | ○ | ○ |
| Example 63 | Pretreatment liquid 1 | 3W | 1K | 1C | 1M | 1Y | Δ | ○ | ○ |
| Example 64 | Pretreatment liquid 1 | 4W | 1K | 1C | 1M | 1Y | ○ | ○ | ○ |
| Example 65 | Pretreatment liquid 1 | 5W | 1K | 1C | 1M | 1Y | Δ | ○ | ○ |
| Example 66 | Pretreatment liquid 1 | 6W | 1K | 1C | 1M | 1Y | Δ | ○ | ○ |
| Example 67 | Pretreatment liquid 1 | 7W | 1K | 1C | 1M | 1Y | ○ | ○ | ○ |
| Examle 68 | Pretreatment liquid 1 | 8W | 1K | 1C | 1M | 1Y | ○ | ○ | ○ |
| Examle 69 | Pretreatment liquid 1 | 9W | 1K | 1C | 1M | 1Y | ○ | ○ | ○ |
| Examle 70 | Pretreatment liquid 1 | 10W | 1K | 1C | 1M | 1Y | ○ | ○ | ○ |
| Examle 71 | Pretreatment liquid 1 | 13W | 1K | 1C | 1M | 1Y | ○ | Δ | ○ |
| Examle 72 | Pretreatment liquid 1 | 1W | 2K | 2C | 2M | 2Y | ○ | ○ | ○ |
| Examle 73 | Pretreatment liquid 1 | 1W | 4K | 4C | 4M | 4Y | ○ | ○ | ○ |
| Examle 74 | Pretreatment liquid 1 | 1W | 5K | 5C | 5M | 5Y | ○ | ○ | ○ |
| Examle 75 | Pretreatment liquid 1 | 1W | 6K | 6C | 6M | 6Y | Δ | ○ | ○ |
| Examle 76 | Pretreatment liquid 1 | 1W | 7K | 7C | 7M | 7Y | ○ | ○ | ○ |
| Examle 77 | Pretreatment liquid 1 | 1W | 8K | 8C | 8M | 8Y | ○ | ○ | ○ |
| Examle 78 | Pretreatment liquid 1 | 1W | 9K | 9C | 9M | 9Y | ○ | ○ | Δ |
| Examle 79 | Pretreatment liquid 1 | 1W | 11K | 11C | 11M | 11Y | ○ | ○ | ○ |
| Examle 80 | Pretreatment liquid 1 | 1W | 12K | 12C | 12M | 12Y | ○ | ○ | ○ |
| Examle 81 | Pretreatment liquid 1 | 1W | 13K | 13C | 13M | 13Y | ○ | ○ | ○ |

Examples 82 to 94

Subsequently, the evaluation of adhesion, image quality, and concealability was performed using some of the pretreatment liquid, aqueous white ink, and aqueous coloring ink produced with the method described above and changing the printing conditions. The results of these evaluations were as shown in Table 7 below.

<Production of Printed Matter II>

An inkjet ejector was prepared in which two inkjet heads KJ4B-1200 (design resolution 1,200 dpi, nozzle diameter 20 μm) manufactured by KYOCERA Corporation were installed side by side along the transport direction of substrates, and the pretreatment liquid and aqueous white ink were filled in the order shown in Table 7 from the upstream side in the transport direction. On the conveyor, a biaxially-oriented polypropylene film "OPU-1" (20 μm thick) manufactured by Mitsui Chemicals Tohcello, Inc., which was previously cut into A4 size (21 cm wide×30 cm long) and whose mass per unit area was calculated, was fixed. Then, the conveyor was driven at 50 m/min, and when the film substrate passed under the installation part of the inkjet heads, only the pretreatment liquid was jetted at a drop volume of 2 pL, a drop speed of 5 m/s, and a coverage rate of 100% to form a layer of the pretreatment liquid. Immediately thereafter, the mass of the polypropylene film on which the pretreatment liquid layer was formed was measured, and the film was placed on a digital hot plate (manufactured by AS ONE CORPORATION) with the plate temperature set at 50 to 55° C. The substrate was then left standing on the digital hot plate until the total remaining amount of the volatile component in the pretreatment liquid layer, which was calculated using the above-described formula, reached a predetermined value ±1%. The calculation formula used the mass obtained by converting the measured mass into the mass per unit area.

Then, the polypropylene film after standing was fixed again on the conveyor, the conveyor was driven at a constant speed, and when the film substrate on which the pretreatment liquid was printed passed under the installation part of the inkjet heads, the aqueous white ink was respectively jetted under the condition of a drop volume of 2 pL to form an image. The printed substrate was immediately put in an air oven at 70° C. and dried for 3 minutes to produce a printed matter.

Note that as the images to be printed, three kinds of images, white solid image, white gradient image, and white text images, were prepared, and printed matters of these images were produced using each of the combinations of the pretreatment liquid and aqueous white ink shown in Table 7.

<Evaluation 1C: Adhesion Evaluation C>

Printed matters of the white solid image were produced using the method described in "production of printed matter II" above, the combinations of the pretreatment liquid and aqueous white ink described in Table 7, and the total remaining amount of the volatile component described in Table 7. Except that the printed matters of the white solid image were used, the adhesion of the printed matters was evaluated using the same method and evaluation criteria as in the case of evaluation 1A described above. Note that the driving speed of the conveyor during printing of the aqueous white ink was set to 50 m/min.

<Evaluation 2C: Rubbing Resistance Evaluation C>

Printed matters of the white solid image were produced using the method described in "production of printed matter II" above, the combinations of the pretreatment liquid and aqueous white ink described in Table 7, and the total remaining amount of the volatile component described in Table 7. Except that the printed matters of the white solid image were used, the rubbing resistance of the printed matters was evaluated using the same method and evaluation criteria as in the case of evaluation 2A described above. Note that the driving speed of the conveyor during printing of the aqueous white ink was set to 50 m/min.

<Evaluation 3C: Image Quality Evaluation C>

Printed matters of the white solid image, printed matter of the white gradient image, and printed matter of the white text image were produced using the method described in "production of printed matter II" above, the combinations of the pretreatment liquid and aqueous white ink described in Table 7, and the total remaining amount of the volatile component described in Table 7. Then, the image quality was comprehensively determined from the degree of voids in the printed matters of the above white color solid image, the dot shape in the printed matters of the above white gradient image, and the character legibility in the printed matters of the above white color text image. Note that the evaluation criteria were the same as those in evaluation 3A.

<Evaluation 5-1B: Concealability Evaluation B>

Printed matters of the white solid image were produced using the method described in "production of printed matter II" above, the combinations of the pretreatment liquid and aqueous white ink described in Table 7, and the total remaining amount of the volatile component described in Table 7. Except that the printed matters of the white solid image were used, the concealability of the printed matters was evaluated using the same method and evaluation criteria as in the case of evaluation 5-1A described above. Note that the driving speed of the conveyor during printing of the aqueous white ink was set to 50 m/min.

TABLE 7

| Example/ comparative example No. | Combination of pretreatment liquid and inks | | Total remaining amount of volatile component in pretreatment liquid layer before aqueous white ink printing | Static surface tension | | Difference between aqueous white ink and pretreatment liquid | Ratio between cationic component amount and white-colored colorant amount Cationic component amount (MPC) |
|---|---|---|---|---|---|---|---|
| | Filled upstream | Filled downstream | | Pre-treatment liquid | Aqueous white ink | | |
| Example 82 | Pretreatment liquid 1 | 1W | 90% | 23.0 | 26.6 | 3.6 | 0.31 |
| Example 83 | | | 75% | | | | |
| Example 84 | | | 55% | | | | |
| Example 85 | | | 40% | | | | |
| Example 86 | | | 15% | | | | |
| Example 87 | Pretreatment liquid 3 | 1W | 90% | 23.2 | 26.6 | 3.4 | 0.31 |
| Example 88 | | | 75% | | | | |
| Example 89 | | | 55% | | | | |
| Example 90 | | | 40% | | | | |
| Example 91 | | | 15% | | | | |
| Example 92 | Pretreatment liquid 4 | 1W | 15% | 23.0 | 26.6 | 3.6 | 0.98 |
| Example 93 | Pretreatment liquid 10 | 16W | 15% | 22.2 | 32.0 | 9.8 | 0.31 |
| Example 94 | Pretreatment liquid 18 | 11W | 15% | 23.1 | 27.0 | 3.9 | 0.22 |

TABLE 7-continued

| Example/comparative example No. | Ration between cationic component amount and white-colored colorant amount | | Evaluation results | | | |
|---|---|---|---|---|---|---|
| | | | White printed matters used | | | |
| | White-colored colorant amount (MWC) | MWC/MPC | Evaluation 1C Adhesion | Evaluation 2C Rubbing resistance | Evaluation 3C Image quality | Evaluation 5-1B Conceal ability |
| Example 82 | 16.7 | 54.2 | ⊚ | ⊚ | ⊚ | ○ |
| Example 83 | | | ⊚ | ⊚ | ⊚ | ○ |
| Example 84 | | | ○ | ○ | ○ | ○ |
| Example 85 | | | △ | ○ | ○ | ○ |
| Example 86 | | | △ | ○ | ○ | ○ |
| Example 87 | 16.7 | 53.4 | ○ | ⊚ | ⊚ | ○ |
| Example 88 | | | ○ | ○ | ⊚ | ○ |
| Example 89 | | | △ | ○ | ○ | ○ |
| Example 90 | | | △ | ○ | ○ | ○ |
| Example 91 | | | △ | ○ | ○ | ○ |
| Example 92 | 16.7 | 17.0 | △ | △ | △ | ○ |
| Example 93 | 16.7 | 53.4 | △ | △ | △ | △ |
| Example 94 | 20.0 | 92.9 | △ | ○ | △ | △ |

As it is obvious from Table 7, it became possible to obtain a printed matter more excellent in all of adhesion, rubbing resistance, and image quality by making the pretreatment liquid layer on the substrate wet just before printing of the aqueous white ink, that is, by making the total remaining amount of the volatile component contained in the pretreatment liquid layer 50% by mass or more. The effect thereof was particularly notable when the above total remaining amount was 75% by mass or more.

Examples 95 to 116

Subsequently, printed matters of the layered solid image and the layered gradient image were produced using some of the pretreatment liquid and aqueous white ink produced with the method described above and changing the printing conditions, and the evaluation of adhesion and concealability was performed. The results of these evaluations were as shown in Table 8 below.

<Production of Printed Matter III>

An inkjet ejector was prepared in which two inkjet heads KJ4B-1200 (design resolution 1,200 dpi, nozzle diameter 20 μm) manufactured by KYOCERA Corporation were installed side by side along the transport direction of substrates, and the pretreatment liquid, aqueous white ink, and aqueous coloring ink were filled in the order shown in Table 7 from the upstream side in the transport direction. On the conveyor, a biaxially-oriented polypropylene film "OPU-1" (20 μm thick) manufactured by Mitsui Chemicals Tohcello, Inc., which was previously cut into A4 size (21 cm wide×30 cm long) and whose mass per unit area was calculated, was fixed. Then, the conveyor was driven at 50 m/min, and when the film substrate passed under the installation part of the inkjet heads, only the pretreatment liquid was jetted at a drop volume of 2 pL, a drop speed of 5 m/s, and a coverage rate of 100% to form a layer of the pretreatment liquid. Immediately thereafter, the mass of the polypropylene film on which the pretreatment liquid layer was formed was measured, and the film was placed on a digital hot plate (manufactured by AS ONE CORPORATION) with the plate temperature set at 50 to 55° C. The substrate was left standing on the digital hot plate until the total remaining amount of the volatile component in the pretreatment liquid layer, which was calculated using the above-described formula, reached a predetermined value ±1%. The calculation formula used the mass obtained by converting the measured mass into the mass per unit area.

Then, the polypropylene film after standing was fixed again on the conveyor, the conveyor was driven at a constant speed, and when the polypropylene film on which the pretreatment liquid was printed passed under the installation part of the inkjet heads, only the aqueous white ink was jetted under the condition of a drop volume of 2 pL to form a solid image with a coverage rate of 100%. Immediately thereafter, the mass of the polypropylene film on which the pretreatment liquid and aqueous white ink were printed was measured, and the film was placed on a digital hot plate (manufactured by AS ONE CORPORATION) with the plate temperature set at 50 to 55° C. The substrate was then left standing on the above digital hot plate until the total remaining amount of the component contained in the pretreatment liquid and aqueous white ink on the substrate reached a predetermined value+5%. The calculation formula used the mass obtained by converting the measured mass into the mass per unit area.

Note that, separately, the pretreatment liquid and aqueous white ink were respectively jetted on the above polypropylene film under the condition of a drop volume of 2 pL, and the white solid image was printed. Immediately after that, the printed polypropylene film printed matter was retrieved from the ejector, the mass was measured, and a value converted to the mass per unit area of the pretreatment liquid and aqueous white ink on the polypropylene film was used to calculate the total remaining amount of the component contained in the above pretreatment liquid and aqueous white ink.

Thereafter, in order to calculate the accurate total remaining amount of the component contained in the pretreatment liquid and aqueous white ink, the mass of the above polypropylene film was measured again, and then the polypropylene film was fixed on the conveyor again. Then, the conveyor was driven at a constant speed, and when the polypropylene film printed with the pretreatment liquid and aqueous white ink passed under the installation part of the inkjet heads, only the aqueous coloring ink was respectively jetted under the condition of a drop volume of 2 pL to form an image. The printed substrate was immediately put in an air oven at 70° C. and dried for 3 minutes to produce a printed matter.

Note that as images to be printed, two types of images, the layered solid image and layered gradient image, were prepared, and printed matters of these images were produced using each of the combinations of the pretreatment liquid and aqueous white ink shown in Table 8.

<Evaluation 1D: Adhesion Evaluation D>

Printed matters of the layered solid image were produced using the method described in "production of printed matter III" above, the combinations of the pretreatment liquid, aqueous white ink, and aqueous coloring ink described in Table 8, and the total remaining amount of the volatile component and the component derived from the pretreatment liquid and aqueous white ink described in Table 8. Except that the printed matters of the layered solid image were used, the adhesion of the printed matters was evaluated using the same method and evaluation criteria as in the case of evaluation 1B described above. Note that the driving speed of the conveyor during printing of the aqueous white ink and aqueous coloring ink was set to 50 m/min.

<Evaluation 3D: Image Quality Evaluation D>

Printed matters of the layered solid image and layered gradient image were produced using the method described in "production of printed matter III" above, the combinations of the pretreatment liquid, aqueous white ink, and coloring ink described in Table 8, and the total remaining amount of the volatile component and the component derived from the pretreatment liquid and aqueous white ink described in Table 8. Except that the printed matters of the layered solid image and layered gradient image were used, the image quality of the printed matters was evaluated using the same method and evaluation criteria as in the case of evaluation 3B described above.

TABLE 8

| Example/comparative example No. | Combination of pretreatment liquid and inks Upstream↔Downstream | | | | | | Total remaining amount of volatile component derived from pretreatment liquid contained in printed matter before aqueous white ink printing | Total remaining amount of component derived from pretreatment liquid and aqueous white ink contained in printed matter before aqueous coloring ink printing |
|---|---|---|---|---|---|---|---|---|
| | Filled furthest upstream | Filled second furthest upstream | Filled third furthest upstream | Filled fourth furthest upstream | Filled fifth furthest upstream | Filled furthest downstream | | |
| Example 95 | Pretreatment liquid 5 | 1W | 1K | 1C | 1M | 1Y | 90% | 86.0% |
| Example 96 | | | | | | | | 74.1% |
| Example 97 | | | | | | | | 57.5% |
| Example 98 | | | | | | | | 46.5% |
| Example 99 | | | | | | | | 37.8% |
| Example 100 | | | | | | | | 31.5% |
| Example 101 | | | | | | | | 75% | 80.6% |
| Example 102 | | | | | | | | 70.5% |
| Example 103 | | | | | | | | 56.8% |
| Example 104 | | | | | | | | 43.1% |
| Example 105 | | | | | | | | 33.8% |
| Example 106 | | | | | | | | 55% | 74.4% |
| Example 107 | | | | | | | | 61.2% |
| Example 108 | | | | | | | | 51.1% |
| Example 109 | | | | | | | | 39.1% |
| Example 110 | Pretreatment liquid 7 | 1W | 1K | 1C | 1M | 1Y | 75% | 77.1% |
| Example 111 | | | | | | | | 58.9% |
| Example 112 | | | | | | | | 43.8% |
| Example 113 | | | | | | | | 34.2% |
| Example 114 | | | | | | | | 55% | 72.5% |
| Example 115 | | | | | | | | 53.7% |
| Example 116 | | | | | | | | 42.1% |

| Example/comparative example No. | Static surface tension | | Difference between aqueous white ink and pretreatment liquid | Ratio between cationic component amount white-colored colorant | | | Evaluation results Layer printed matters used | |
|---|---|---|---|---|---|---|---|---|
| | Pretreatment liquid | Aqueous white ink | | Cationic component amount (MPC) | White-colored colorant amount (MWC) | MWC/MPC | Evaluation 1D Adhesion | Evaluation 3D Image quality |
| Example 95 | 23.0 | 26.6 | 3.6 | 0.43 | 16.7 | 38.8 | ◎ | ◎ |
| Example 96 | | | | | | | ◎ | ◎ |
| Example 97 | | | | | | | ◎ | ◎ |
| Example 98 | | | | | | | ◎ | ◎— |
| Example 99 | | | | | | | ◎ | ◎— |

TABLE 8-continued

| | | | | | | | | |
|---|---|---|---|---|---|---|---|---|
| Example 100 | | | | | | | ○ | ○ |
| Example 101 | | | | | | | ◎ | ◎ |
| Example 102 | | | | | | | ◎ | ◎ |
| Example 103 | | | | | | | ◎ | ◎ |
| Example 104 | | | | | | | ◎ | ◎— |
| Example 105 | | | | | | | ○ | ○ |
| Example 106 | | | | | | | ○ | ○ |
| Example 107 | | | | | | | ○ | ○ |
| Example 108 | | | | | | | ○ | ○ |
| Example 109 | | | | | | | ○ | Δ |
| Example 110 | 22.7 | 26.6 | 3.9 | 0.89 | 16.7 | 18.6 | ◎— | ○ |
| Example 111 | | | | | | | ◎— | ○ |
| Example 112 | | | | | | | ○ | Δ |
| Example 113 | | | | | | | Δ | Δ |
| Example 114 | | | | | | | ○ | Δ |
| Example 115 | | | | | | | ○ | Δ |
| Example 116 | | | | | | | Δ | Δ |

As a result of the evaluation, it was confirmed that a printed matter with particularly excellent adhesion and image quality could be obtained by setting the pretreatment liquid layer on the substrate to a wet state (the total remaining amount of the volatile component contained in the pretreatment liquid layer is set to 50% by mass or more, preferably 75% by mass or more) immediately before printing of the aqueous white ink, and further setting the total remaining amount of the component contained in the pretreatment liquid and aqueous white ink on the substrate to 25% by mass or more (preferably 50% by mass or more) immediately before printing of the aqueous coloring ink.

The invention claimed is:

1. A recording liquid set, comprising:
   a pretreatment liquid; and
   an aqueous white inkjet ink, wherein
   the pretreatment liquid contains a cationic component, a resin (excluding water-soluble cationic polymers) (PP), and water,
   the cationic component is a polyvalent metal ion and/or a water-soluble cationic polymer,
   the aqueous white inkjet ink contains a white-colored colorant, an organic solvent (WS), and water,
   the aqueous white inkjet ink has a static surface tension of 20 to 40 mN/m at 25° C.,
   the aqueous white inkjet ink has a static surface tension at 25° C. that is greater than a static surface tension at 25° C. of the pretreatment liquid, and
   when an amount of the white-colored colorant in the aqueous white inkjet ink is MWC (% by mass) and an amount of the cationic component in the pretreatment liquid is MPC (% by mass), a value represented by MWC/MPC is 15 to 100.

2. The recording liquid set according to claim 1, wherein the aqueous white inkjet ink is for a wet-on-wet printing method.

3. The recording liquid set according to claim 1, wherein the cationic component contains a calcium ion.

4. The recording liquid set according to claim 1, wherein an amount of the white-colored colorant is 13% to 25% by mass of a total amount of the aqueous white inkjet ink.

5. The recording liquid set according to claim 1, wherein
   the pretreatment liquid further contains 1,2-propanediol, and
   the organic solvent contained in the pretreatment liquid has a boiling point (weighted average value) of 120 to 220° C.

6. The recording liquid set according to claim 1, wherein
   the organic solvent (WS) contains 1,2-propanediol, and
   the organic solvent (WS) has a boiling point (weighted average value) of 120 to 200° C.

7. A method for producing a printed matter using the recording liquid set according to claim 1, the method comprising, in this order:
   step (1) of applying the pretreatment liquid on a substrate; and
   step (2) of printing the aqueous white inkjet ink using an inkjet method on a surface of the substrate obtained in step (1) on which the pretreatment liquid is applied.

8. The method for producing a printed matter according to claim 7, wherein
   the aqueous white inkjet ink is printed on the pretreatment liquid in a wet state.

9. A printed matter that is produced using the method for producing a printed matter according to claim 7.

10. The recording liquid set according to claim 5, wherein
    the organic solvent (WS) contains 1,2-propanediol, and
    the organic solvent (WS) has a boiling point (weighted average value) of 120 to 200° C.

* * * * *